United States Patent
Penilla et al.

(10) Patent No.: US 10,714,955 B2
(45) Date of Patent: Jul. 14, 2020

(54) METHODS AND SYSTEMS FOR AUTOMATIC ELECTRIC VEHICLE IDENTIFICATION AND CHARGING VIA WIRELESS CHARGING PADS

(71) Applicant: Emerging Automotive, LLC, Los Altos, CA (US)

(72) Inventors: Angel A. Penilla, Sacramento, CA (US); Albert S. Penilla, Sunnyvale, CA (US)

(73) Assignee: Emerging Automotive, LLC, Los Altos, CA (US)

( * ) Notice: Subject to any disclaimer, the term of this patent is extended or adjusted under 35 U.S.C. 154(b) by 7 days.

(21) Appl. No.: 15/841,721

(22) Filed: Dec. 14, 2017

(65) Prior Publication Data

US 2018/0111494 A1   Apr. 26, 2018

Related U.S. Application Data

(63) Continuation-in-part of application No. 15/384,314, filed on Dec. 19, 2016, and a continuation-in-part of
(Continued)

(51) Int. Cl.
*H02J 7/00* (2006.01)
*H02J 7/02* (2016.01)
(Continued)

(52) U.S. Cl.
CPC ............ *H02J 7/0045* (2013.01); *B60L 1/003* (2013.01); *B60L 1/06* (2013.01); *B60L 50/52* (2019.02);
(Continued)

(58) Field of Classification Search
CPC ...... B60L 11/1842; B60L 53/12; B60L 55/00; B60L 53/14; B60L 53/665; B60L 58/13;
(Continued)

(56) References Cited

U.S. PATENT DOCUMENTS 3,690,397 A   9/1972   Parker
3,799,063 A   3/1974   Reed
(Continued)

*Primary Examiner* — Zixuan Zhou

(57) ABSTRACT

A cloud system is configured to execute method operations for communicating with connected vehicles of users having user accounts with the cloud system. One example method includes receiving a signal from of an electric vehicle that is associated to a user account. The signal of the electric vehicle is received in response to the electric vehicle parking over a charging pad of a charging unit, and the charging unit is one of a plurality of charging units located in various geo-locations. The method includes sending instructions to the charging unit to enable initiation of charge transfer to a battery of the electric vehicle upon the cloud system confirming that the user account for the electric vehicle is enabled for automatic charging upon parking over said charging pad of the charging unit. The method includes receiving data from the charging unit indicative of a discontinuing of the charge transfer by the charging pad responsive to detecting that the electric vehicle is no longer parked over said charging pad.

19 Claims, 24 Drawing Sheets

Related U.S. Application Data application No. 15/290,430, filed on Oct. 11, 2016, now Pat. No. 10,223,134, said application No. 15/384,314 is a continuation of application No. 14/281,892, filed on May 20, 2014, now Pat. No. 9,545,853, said application No. 15/290,430 is a continuation of application No. 14/275,569, filed on May 12, 2014, now Pat. No. 9,467,515, said application No. 14/281,892 is a continuation of application No. 13/797,974, filed on Mar. 12, 2013, now Pat. No. 9,180,783, which is a continuation-in-part of application No. 13/452,882, filed on Apr. 22, 2012, now Pat. No. 9,123,035.

(60) Provisional application No. 61/745,729, filed on Dec. 24, 2012, provisional application No. 61/478,436, filed on Apr. 22, 2011.

(51) Int. Cl.

| | |
|---|---|
| *H04W 4/40* | (2018.01) |
| *G01C 21/34* | (2006.01) |
| *G06Q 10/00* | (2012.01) |
| *G06Q 20/18* | (2012.01) |
| *G06Q 30/00* | (2012.01) |
| *G06Q 30/06* | (2012.01) |
| *B60L 1/00* | (2006.01) |
| *B60L 1/06* | (2006.01) |
| *B60L 55/00* | (2019.01) |
| *B60L 53/14* | (2019.01) |
| *B60L 58/21* | (2019.01) |
| *B60L 50/52* | (2019.01) |
| *B60L 53/30* | (2019.01) |
| *B60L 53/66* | (2019.01) |
| *B60L 53/31* | (2019.01) |
| *B60L 53/80* | (2019.01) |
| *B60L 58/13* | (2019.01) |
| *B60L 53/65* | (2019.01) |
| *H02J 50/10* | (2016.01) |
| *B60L 53/12* | (2019.01) |
| *G06Q 30/04* | (2012.01) |
| *G06Q 20/12* | (2012.01) |
| *H02J 5/00* | (2016.01) |
| *H04L 29/08* | (2006.01) |
| *G07F 15/00* | (2006.01) |
| *H04W 68/00* | (2009.01) |
| *G06Q 20/10* | (2012.01) |
| *G06Q 10/02* | (2012.01) |
| *G06Q 20/14* | (2012.01) |
| *H04W 4/44* | (2018.01) |
| *G01C 21/36* | (2006.01) |
| *H01M 10/42* | (2006.01) |
| *H04W 4/02* | (2018.01) |
| *H04W 84/12* | (2009.01) |

(52) U.S. Cl.
CPC ............ *B60L 53/12* (2019.02); *B60L 53/14* (2019.02); *B60L 53/30* (2019.02); *B60L 53/305* (2019.02); *B60L 53/31* (2019.02); *B60L 53/65* (2019.02); *B60L 53/665* (2019.02); *B60L 53/80* (2019.02); *B60L 55/00* (2019.02); *B60L 58/13* (2019.02); *B60L 58/21* (2019.02); *G01C 21/3469* (2013.01); *G06Q 10/02* (2013.01); *G06Q 10/20* (2013.01); *G06Q 20/102* (2013.01); *G06Q 20/127* (2013.01); *G06Q 20/145* (2013.01); *G06Q 20/18* (2013.01); *G06Q 30/00* (2013.01); *G06Q 30/04* (2013.01); *G06Q 30/0643* (2013.01); *G06Q 30/0645* (2013.01); *G07F 15/005* (2013.01); *H02J 5/00* (2013.01); *H02J 7/00* (2013.01); *H02J 7/0021* (2013.01); *H02J 7/0027* (2013.01); *H02J 7/0047* (2013.01); *H02J 7/02* (2013.01); *H02J 50/10* (2016.02); *H04L 67/04* (2013.01); *H04L 67/10* (2013.01); *H04L 67/12* (2013.01); *H04L 67/125* (2013.01); *H04L 67/18* (2013.01); *H04L 67/22* (2013.01); *H04W 4/40* (2018.02); *H04W 68/00* (2013.01); *B60L 2240/12* (2013.01); *B60L 2240/34* (2013.01); *B60L 2240/547* (2013.01); *B60L 2240/622* (2013.01); *B60L 2240/72* (2013.01); *B60L 2240/80* (2013.01); *B60L 2250/10* (2013.01); *B60L 2250/12* (2013.01); *B60L 2250/16* (2013.01); *B60L 2250/20* (2013.01); *G01C 21/3679* (2013.01); *G06Q 2240/00* (2013.01); *H01M 10/4257* (2013.01); *H02J 7/00034* (2020.01); *H02J 7/00045* (2020.01); *H02J 7/0048* (2020.01); *H04L 67/306* (2013.01); *H04W 4/023* (2013.01); *H04W 4/44* (2018.02); *H04W 84/12* (2013.01); *Y02E 60/721* (2013.01); *Y02T 10/7005* (2013.01); *Y02T 10/7044* (2013.01); *Y02T 10/7055* (2013.01); *Y02T 10/7061* (2013.01); *Y02T 10/7088* (2013.01); *Y02T 10/7291* (2013.01); *Y02T 90/12* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/169* (2013.01); *Y04S 10/126* (2013.01); *Y04S 30/14* (2013.01); *Y04S 50/10* (2013.01); *Y04S 50/12* (2013.01)

(58) Field of Classification Search
CPC .......... B60L 53/30; B60L 53/65; B60L 1/003; B60L 1/06; H02J 50/10; H02J 5/00; H02J 7/0027; H02J 7/0047; H02J 7/0052; H02J 7/02; G01C 21/3469; G01C 21/3484; G01C 21/3679; G06Q 10/20; G06Q 20/145; G06Q 20/18; G06Q 30/00; G06Q 30/04; G06Q 30/0643; G06Q 30/0645; G07F 15/005; H04L 67/04; H04L 67/10; H04L 67/12; H04L 67/125; H04L 67/18; H04L 67/22; H04W 4/046; H04W 68/00; H04W 4/44
USPC ................. 320/108, 109; 307/104; 705/14.1
See application file for complete search history.

(56) References Cited

U.S. PATENT DOCUMENTS

| | | |
|---|---|---|
| 3,867,682 A | 2/1975 | Ohya |
| 4,052,655 A | 10/1977 | Vizza |
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |

(56) References Cited

U.S. PATENT DOCUMENTS

| | | | |
|---|---|---|---|
| 5,121,112 A | 6/1992 | Nakadozono |
| 5,132,666 A | 7/1992 | Fahs |
| 5,184,058 A | 2/1993 | Hesse |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,343,970 A | 9/1994 | Severinsky |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diller et al. |
| 5,488,283 A | 1/1996 | Dougherty et al. |
| 5,492,190 A | 2/1996 | Yoshida |
| 5,548,200 A | 8/1996 | Nor et al. |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Knor |
| 5,595,271 A | 1/1997 | Tseng |
| 5,596,258 A | 1/1997 | Kimura et al. |
| 5,612,606 A | 3/1997 | Guimarin et al. |
| 5,627,752 A | 5/1997 | Buck et al. |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,892,598 A | 4/1999 | Asakawa et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,301,531 B1 | 10/2001 | Pierro |
| 6,307,349 B1 | 10/2001 | Koenck et al. |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,416,209 B1 | 7/2002 | Abbott |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestmanm et al. |
| 6,498,454 B1 | 12/2002 | Pinlam |
| 6,511,192 B1 | 1/2003 | Henion |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova |
| 6,794,849 B2 | 9/2004 | Mori et al. |
| 6,850,898 B1 | 2/2005 | Murakami |
| 6,915,869 B2 | 7/2005 | Botti |
| 6,922,629 B2 | 7/2005 | Yoshikawa et al. |
| 6,937,140 B1 | 8/2005 | Outslay |
| 6,940,254 B2 | 9/2005 | Nagamine |
| 7,013,205 B1 | 3/2006 | Hafner |
| 7,039,389 B2 | 5/2006 | Johnson, Jr. |
| 7,084,781 B2 | 8/2006 | Chuey |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |
| 7,402,978 B2 | 7/2008 | Pryor |
| 7,532,965 B2 | 5/2009 | Robillard |
| 7,565,396 B2 | 7/2009 | Hoshina |
| 7,630,802 B2 | 12/2009 | Breed |
| 7,650,210 B2 | 1/2010 | Breed |
| 7,674,536 B2 | 3/2010 | Chipchase |
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,751,945 B2 | 7/2010 | Obata |
| 7,778,746 B2 | 8/2010 | McLeod |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |

(56) References Cited

U.S. PATENT DOCUMENTS

| | | |
|---|---|---|
| 8,836,281 B2 | 9/2014 | Ambrosio et al. |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0044245 A1 | 2/2005 | Hoshina |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea et al. |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1* | 1/2010 | Fincham ............... B60L 3/12 705/412 |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichal et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032110 A1 | 2/2011 | Taguchi |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | nakashima |
| 2012/0091959 A1* | 4/2012 | Martin ............... B60L 11/1833 320/109 |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Trucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0181669 A1* | 7/2013 | Kawasaki ............ B60L 11/182 320/108 |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300362 A1* | 11/2013 | Turner ............... G06Q 30/02 320/109 |
| 2013/0300554 A1 | 11/2013 | Braden |
| 2013/0317693 A1 | 11/2013 | Jefferies et al. |

(56) References Cited

U.S. PATENT DOCUMENTS

| | | |
|---|---|---|
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1* | 1/2014 | McCool ............ B60L 11/182 320/108 |
| 2014/0042968 A1 | 2/2014 | hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |
| 2016/0075249 A1* | 3/2016 | Grabar ............ B60L 11/1846 320/108 |

* cited by examiner

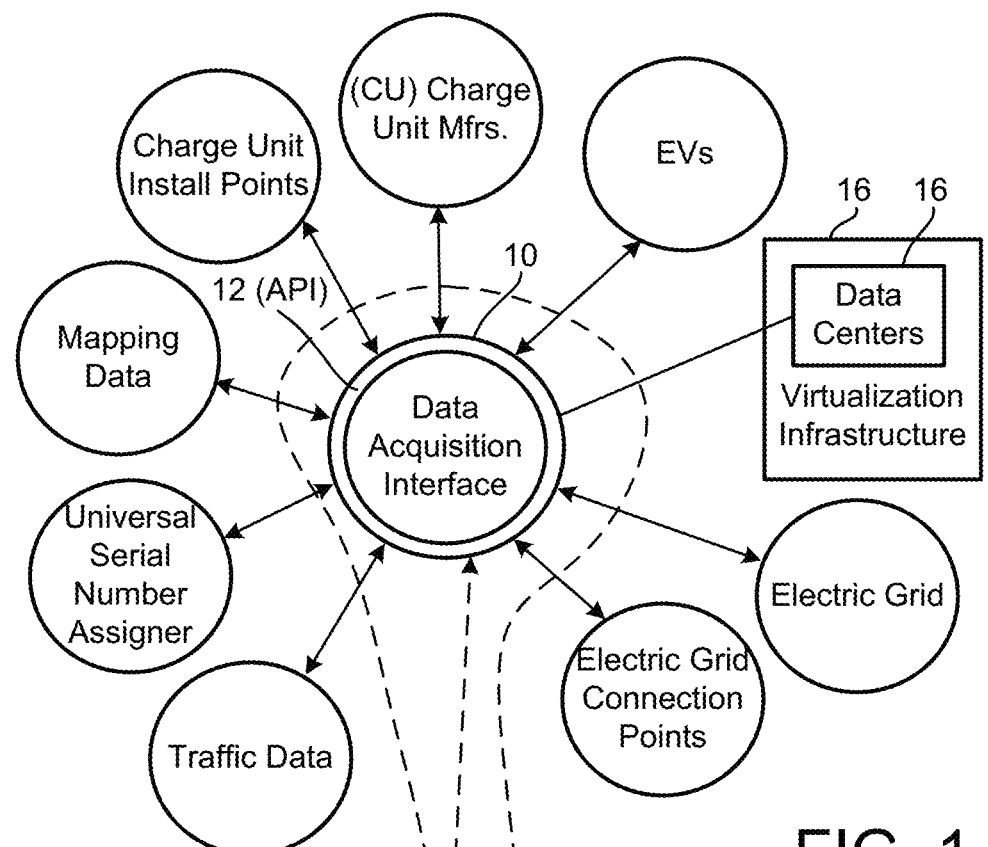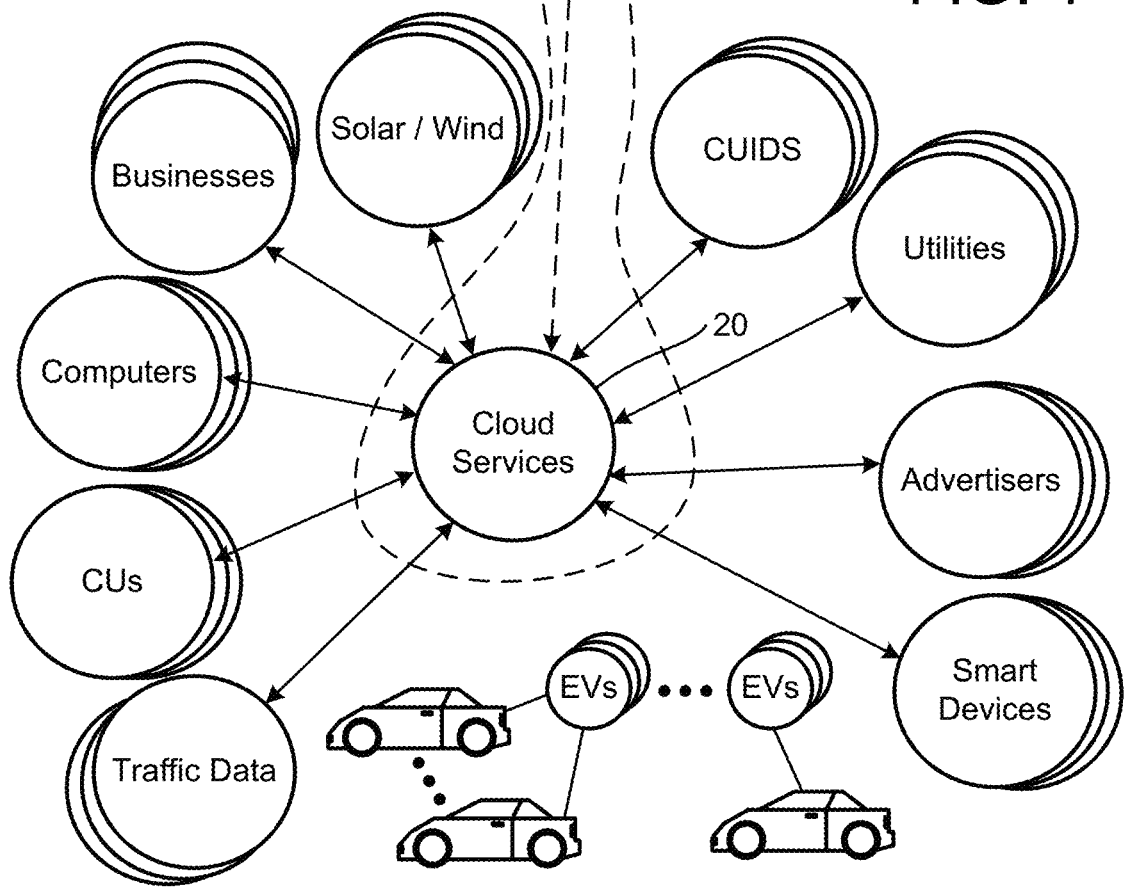
FIG. 1

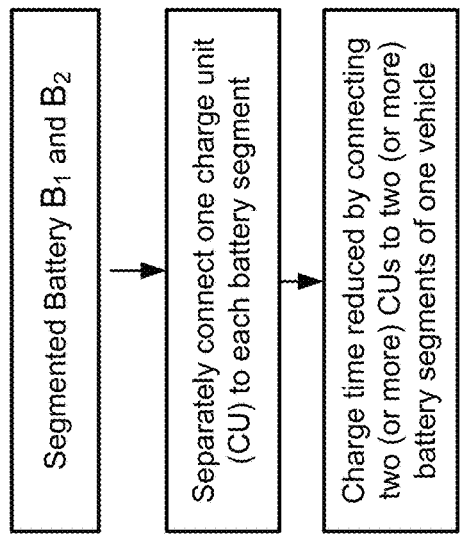
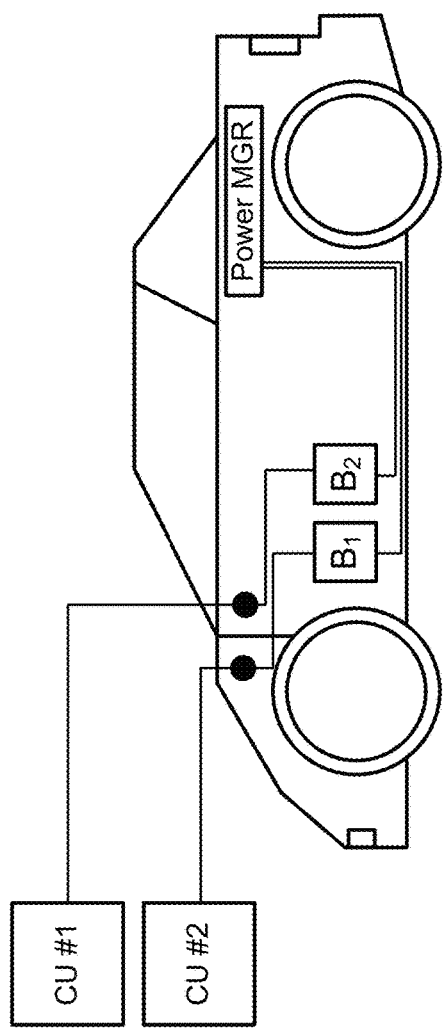
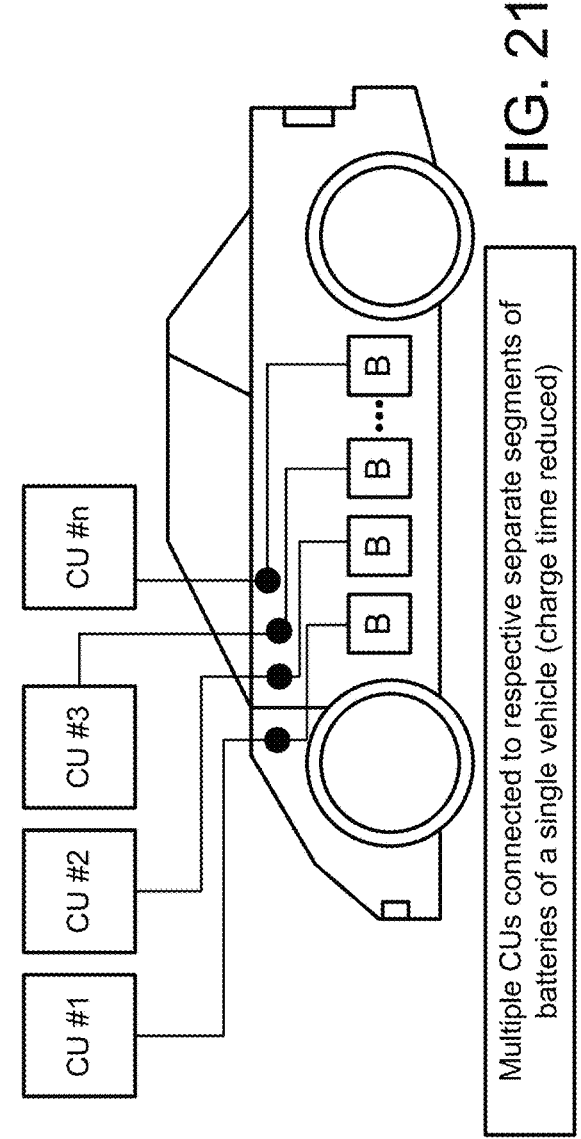

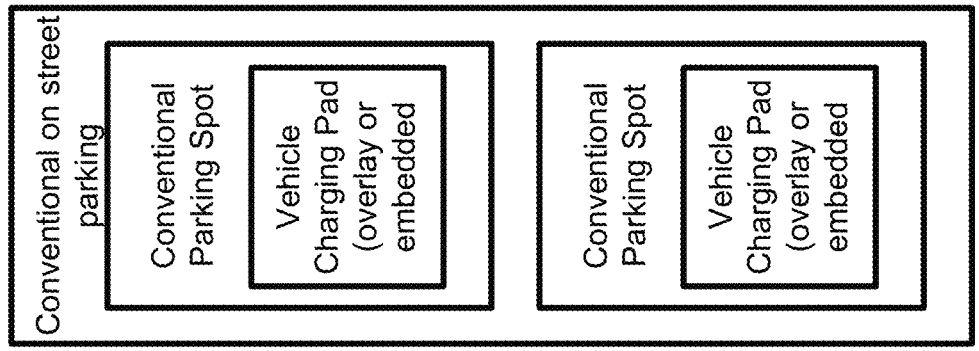
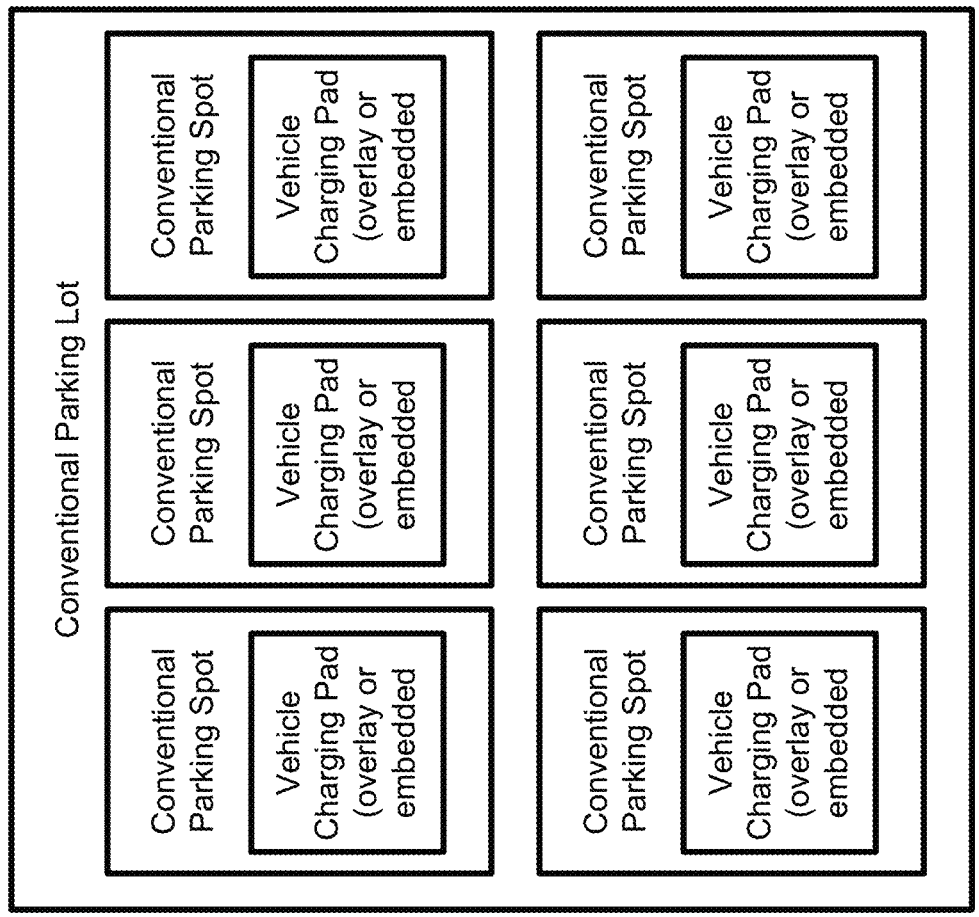
FIG. 23A

METHODS AND SYSTEMS FOR AUTOMATIC ELECTRIC VEHICLE IDENTIFICATION AND CHARGING VIA WIRELESS CHARGING PADS

CLAIM OF PRIORITY

This is a continuation-in-part of U.S. patent application Ser. No. 15/384,314, filed on Dec. 19, 2016 entitled "Methods And Systems For Electric Vehicle (EV) Charge Units And Systems For Processing Connections To Charge Units After Charging Is Complete," which is a continuation of U.S. patent application Ser. No. 14/281,892, filed on May 20, 2014 (now U.S. Pat. No. 9,545,853, issued on Jan. 17, 2017) entitled "Methods for Finding Electric Vehicle (EV) charge units, Status Notifications and Discounts Sponsored by Merchants Local to Charge Units," which is a continuation of U.S. application Ser. No. 13/797,974, filed on Mar. 12, 2013 (now U.S. Pat. No. 9,180,783, issued on Nov. 10, 2015), entitled "Methods and Systems for Electric Vehicle (EV) Charge Location Color-Coded Charge State Indicators, Cloud Applications and User Notifications," which claims priority to U.S. Provisional Patent Application No. 61/745,729, filed on Dec. 24, 2012, and entitled "Methods And Systems For Electric Vehicle (EV) Charging, Charging Systems, Internet Applications And User Notifications," which are all herein incorporated by reference.

U.S. application Ser. No. 13/797,974, filed on Mar. 12, 2013 (now U.S. Pat. No. 9,180,783, issued on Nov. 10, 2015) is a continuation-in-part of U.S. application Ser. No. 13/452,882, filed Apr. 22, 2012 (now U.S. Pat. No. 9,123,035, issued on Sep. 1, 2015), and entitled "Electric Vehicle (EV) Range Extending Charge Systems, Distributed Networks Of Charge Kiosks, And Charge Locating Mobile Apps", which claims priority to U.S. Provisional Application No. 61/478,436, filed on Apr. 22, 2011, all of which are incorporated herein by reference.

This Application is a continuation-in-part of Ser. No. 15/290,430, filed on Oct. 11, 2016, entitled "Methods and Systems for Sending Contextual Relevant Content to Connected Vehicles and Cloud Processing for Filtering said Content Based on Characteristics of the User," which is a continuation of U.S. patent application Ser. No. 14/275,569, filed on May 12, 2014, (now U.S. Pat. No. 9,467,515, issued on Oct. 11, 2016), entitled "Methods and Systems for Sending Contextual Content to Connected Vehicles and Configurable Interaction Modes for Vehicle Interfaces," which are all herein incorporated by reference.

FIELD OF THE EMBODIMENTS

The present invention relates to connected vehicles and methods for charging connected vehicles that use electricity for power, such as electric vehicles (EVs) or hybrids, and methods for finding charge and automatic charging.

BACKGROUND

Electric vehicles have been utilized for transportation purposes and recreational purposes for quite some time. Electric vehicles require a battery that powers an electric motor, and in turn propels the vehicle in the desired location. The drawback with electric vehicles is that the range provided by batteries is limited, and the infrastructure available to users of electric vehicles is substantially reduced compared to fossil fuel vehicles. For instance, fossil fuel vehicles that utilize gasoline and diesel to operate piston driven motors represent a majority of all vehicles utilized by people around the world. Consequently, fueling stations are commonplace and well distributed throughout areas of transportation, providing for easy refueling at any time. For this reason, fossil fuel vehicles are generally considered to have unlimited range, provided users refuel before their vehicles reach empty.

On the other hand, owners of electric vehicles must carefully plan their driving routes and trips around available recharging stations. For this reason, many electric vehicles on the road today are partially electric and partially fossil fuel burning. For those vehicles that are pure electric, owners usually rely on charging stations at their private residences, or specialty recharging stations. However specialty recharging stations are significantly few compared to fossil fuel stations. In fact, the scarcity of recharging stations in and around populated areas has caused owners of electric vehicles to coin the phrase "range anxiety," to connote the possibility that their driving trips may be limited in range, or that the driver of the electric vehicle will be stranded without recharging options. It is this problem of range anxiety that prevents more than electric car enthusiasts from switching to pure electric cars, and abandoning their expensive fossil fuel powered vehicles.

It is in this context that embodiments of the invention arise.

SUMMARY

In some implementations, methods, systems, computer readable media, and combinations thereof are provided, for locating charge for electric vehicles, automatic syncing with charging units, automatic vehicle identification by charging units and wireless charge pad systems, and method for interfacing with charging data usage, payment, availability and sharing via cloud system or systems, are provided. Some implementations describe ways of identifying vehicles that are able to receive charge, so that charge can be automatically transferred to such vehicles without further user input.

This automatic transfer of charge to vehicles, such as when a vehicle arrives at a parking spot equipped with wireless charging pads and/or wireless charging surfaces and/or structures, can be controlled based on user definitions in a user account. For example, a user account can have user configuration settings, which may be made using any device having access to the Internet. The user account can present user interface screens by way of a web browser and/or mobile app, and/or vehicle app; such that the user can configure preferences of when automatic charging is to occur.

Customized settings and logic can be defined by the user, such that charging is automatically carried out when the user parks in specific locations, specific parking spots, specific geo-locations, specific branded locations, and/or when the user parks near specific merchants or locations. In some embodiments, the user account is also provided with discount notifications or offers, which are provided, based on user's predefined preferences or learned preferences. The discounts can be contextually selected, such that the discounts are presented when the user is expected to need a good or service and/or when the user arrives at some specific parking location or is determined to be near a geo-location of a merchant that can provide the discount for a good or service, such as when or during a time when the vehicle is charging.

The charging of the vehicle can be for a short amount of time (e.g., minutes or seconds, or for hours or factions of hours, or for days or months), or until the charge level is full. In some embodiments, by allowing automatic charging can enable processes where a vehicle is charged in increments, such as when a vehicle parks in one or more parking spots that have wireless charging capabilities. An example of incremental charging can include a user driving a vehicle around town and stopping at various locations during a period of time of errand running.

At each stop, even if brief, some amount of charge can automatically be transferred, if the user account has pre-defined the particular charging pad/CU as one that the user wishes to use. Other detailed examples are provided herein as implementations, and various implementations can be defined by combining one or more of the specific examples.

In the following embodiments, several example configurations are disclosed, which relate to claimed embodiments. It should be understood, however, that implementations are envisioned that are defined by combined parts or features of the various embodiments disclosed herein. The combination of parts or features can define implementations that include fewer or more features than those described with specific embodiments.

In one embodiment, a cloud system is configured to execute method operations for communicating with connected vehicles of users having user accounts with the cloud system. The method includes receiving a signal from of an electric vehicle that is associated to a user account. The signal of the electric vehicle is received in response to the electric vehicle parking over a charging pad of a charging unit, and the charging unit is one of a plurality of charging units located in various geo-locations. The method includes sending instructions to the charging unit to enable initiation of charge transfer to a battery of the electric vehicle upon the cloud system confirming that the user account for the electric vehicle is enabled for automatic charging upon parking over said charging pad of the charging unit. The method includes receiving data from the charging unit indicative of a discontinuing of the charge transfer by the charging pad responsive to detecting that the electric vehicle is no longer parked over said charging pad.

In one embodiment, a cloud system is configured to execute method operations for communicating with connected vehicles of users having user accounts with the cloud system. The method includes receiving an identification of an electric vehicle that is associated to a user account. The identification of the electric vehicle is received in response to the electric vehicle parking over a charging pad of a charging unit. The charging unit is one of a plurality of charging units located in various geo-locations. The method includes initiating charge transfer to a battery of the electric vehicle upon the server confirming that the user account for the electric vehicle is enabled for automatic charging upon parking over said charging pad of the charging unit. The method discontinues the charge transfer by the charging pad when the server detects that at the electric vehicle is no longer parked over said charging pad.

A method is provided in one example. The method includes receiving, from time to time, discounts published by merchants for presentation to a network of charging units (CUs), each of the CUs being associated to a geo-location. The method also includes receiving an identification of an electric vehicle that is associated to a user account. The identification of the electric vehicle is made upon detecting that the electric vehicle has parked over a charging pad of a particular CU, the charging pad being at a geo-location of the particular CU. The method also includes identifying at least one discount to be presented to a device of the electric vehicle. The identifying is a result of filtering discounts based on user preferences associated with the user account and a proximity of a merchant location to the particular CU having the charging pad over which the vehicle has parked. The method includes sending the at least one discount to the device of the electric vehicle upon receiving an indication that charge is transferred from the charging pad to a battery of the electric vehicle.

In some implementations the method also includes sending the at least one discount to the user account for access by a portable device, the discount being usable at the merchant location.

In some implementations the method also includes receiving data being indicative of identification of the electric vehicle as associated with the user account, and sending data to enable the transfer of charge to the battery of the electric vehicle upon processing data that indicates that the electric vehicle is associated with the user account and the user account is pre-authorized with payment data to enable the transfer of charge. Enabling the transfer of charge occurs automatically when the electric vehicle is identified to be parked over the charging pad of the particular CU and the electric vehicle is authorized to receive the charge based on the pre-authorization in the user account.

In some implementations the method also includes implementing one or more servers of a cloud system, the one or more servers having access to the network of charging units, the cloud system configured to: manage received discounts published by the merchants, the discounts being published with an identification of a geo-location or CUs for which the discounts are to be published and an expiration time for the discounts; manage receiving data to identify presence of electric vehicles over one or more charging pads; manage confirming that user accounts associated with electric vehicles present over charging pads are authorized with payment data to enable automatic charging, without user input at the charging pad or charging pad system; manage enabling the charging pads to transfer charge to electric vehicles; and manage server data for the user accounts to enable access to users of the user accounts to administer their accounts regarding their use of charge from charging pads over a period of time.

In some implementations the filtering is further performed by excluding discounts for merchants that are beyond a proximity of the particular CU, wherein the particular CU and the proximity are defined by the merchant when posting the discount.

In some implementations the user preferences associated with the user account are received as explicit preferences or are learned for use with the user account based on past actions made via the user account.

In some implementations the additional discounts are sent to the device of the electric vehicle, wherein selection of one of the discounts and use of the discounts are tracked to build learned preferences for the user account.

In some implementations the preferences for the user account are compared to other user accounts to identify similarities in preferences and/or actual use of discounts previously sent, the similarities being used to refine selection of discounts for the user account.

In some implementations the discount is validated or used when redeemed at the merchant location, the discount being accessible via a mobile device by access to the user account over the Internet, and wherein the discount is a reduced price of a good or service offered at the merchant location or a reduction in price for charge obtained by the electric vehicle at the particular CU.

In some implementations the discount is conditioned on transfer of an amount of charge to the electric vehicle as obtained from the predetermined CU, or conditioned on confirmation of purchase of a good or service from the merchant location.

In some implementations the proximity of the merchant location to the particular CU is within walking distance that is less than one mile.

In one embodiment, a method is provided. The method includes receiving from time to time, at a server, discounts published by merchants for presentation to a network of charging units (CUs). Each of the CUs is associated to a geo-location. The method further includes receiving, at the server, an identification of an electric vehicle that is associated to a user account and that is pre-authorized to obtain charge from CUs of the network of CUs. Also included is receiving, at the server, data indicative that the electric vehicle is positioned substantially over a charging pad of a charging unit (CU) of the network of CUs. The method also sends data, by the server, to the CU so that the charging pad transfers charge to the electric vehicle automatically if the user account is pre-authorized to obtain the charge from the CU. The transfer of charge from the charging pad to the electric vehicle occurring without user input at or directed to the CU to initiate a transaction to cause the transfer of charge. The method also includes sending, by the server, a discount selected from published discounts for the user account associated with the electric vehicle. The discount is provided by a merchant having a merchant location that is proximate to the CU. The discount is further selected based on user preferences associated with the user account, the method being executed by a processor.

In some implementations the method further includes sending the at least one discount to the user account for access by a portable device, the discount being usable at the merchant location.

In some implementations the method also includes implementing the server or multiple servers of a cloud system, the servers having access to the network of charging units, the cloud system configured to: manage received discounts published by the merchants, the discounts being published with an identification of a geo-location or CUs for which the discounts are to be published and an expiration time for the discounts; manage receiving data to identify presence of electric vehicles over one or more charging pads; manage confirming that user accounts associated with electric vehicles present over charging pads are authorized with payment data to enable automatic charging, without direct user input at the charging pad or charging pad system; manage enabling the charging pads to transfer charge to electric vehicles; and manage server data for the user accounts to enable access to users of the user accounts to administer their accounts regarding their use of charge from charging pads over a period of time, wherein the access is by way of an application of a mobile device or a website or the electric vehicle computer, or a combination thereof.

In some implementations the selecting the discount includes excluding discounts for merchants that are beyond a proximity of the CU, wherein the proximity is defined by the merchant when posting the discount.

In some implementations the user preferences associated with the user account are received as user entered preferences or are learned for the user account based on past actions made with association to the user account.

In some implementations the additional discounts are sent to the user account for access by the electric vehicle or mobile device, wherein selection of one of the discounts or use of the discounts are tracked to build preferences for the user account, and wherein preferences for the user account are compared to other user accounts to identify similarities, the similarities being used to select discounts for the user account.

Some implementations further include providing, to the user account, information regarding social network data commenting on the merchant associated with the discount and other merchants and discounts.

In some implementations the merchant location is proximate to the CU when a distance between the merchant location is proximate and the CU is within walking distance and the walking distance is less than one mile.

In another embodiment, a method is provided. The method includes receiving, at the server, an identification of an electric vehicle that is associated to a user account that is pre-authorized to obtain charge from a charging units (CUs) associated with a network of CUs. The method also receiving, at the server, data indicative that the electric vehicle is positioned at least partially over a charging pad of a CU of the network of CUs. The method also sends data, by the server, to the CU so that the charging pad transfers charge to the electric vehicle automatically if the user account is pre-authorized to obtain the charge from the CU. The transfer of charge from the charging pad to the electric vehicle occurring without user input at the CU and without user interface input associated with the CU to cause or initiate the transfer of charge. The method includes receiving data, by the server, regarding amount of charge transferred to the electric vehicle and billing the user account for the amount of charge transferred to the electric vehicle, the method being executed by a processor.

In one embodiment, assigning charge units (CUs) to a network of CUs is provided. Methods for allow suppliers of CU services to add the CU(s) to the network to allow consumers of charge for electric vehicles to obtain charge from the network. Charge can be obtained from various CUs, which may or may not be of the same brand or CU manufacturer.

A method is provided that includes receiving a request from a vehicle to identify charge unit install points (CUIPs) having at least one charge unit (CU). The method identifies a geo-location of the vehicle and identifying CUIPs within a proximity location of the vehicle. The method further identifies promotion options available at the identified CUIPs or any promotions available by businesses located proximate to the identified CUIPs. The method provides a list of one or more options for obtaining charge at CUIPs to the vehicle, and the list of options identifying the promotions; the method being executed by a processor.

In some embodiments, the list is arranged or filtered based on preferences of a user account used to cause the request from the vehicle.

In some embodiments, the method further comprises receiving a selection of one of the options.

In some embodiments, the selection of the option includes one of reserving of a CU at the CUIP, or reserving of the CU at the CUIP and paying for the charge via a user account used to cause the request from the vehicle.

In some embodiments, the promotions include discounts in charge, discounts in goods or services proximate to the CUIP, or combinations thereof.

In one embodiment, a method is provided. The method includes receiving a request, from a vehicle, to identify charge unit install points (CUIPs) having at least one charge unit (CU). The method includes identifying a geo-location of the vehicle and identifying CUIPs within a proximity location of the vehicle. The method includes identifying promotion options available at the identified CUIPs or any promotions available by businesses located proximate to the identified CUIPs. The method includes providing a list of one or more options for obtaining charge at CUIPs to the vehicle, the list of options identifying the promotions. The request is made via electronics of the vehicle (or via a portable device or computer) that has connection to the Internet. The request is processed by at least one server of a cloud service, and the CUIPs are associated with computers connected to the Internet to enable real-time access to determine availably of CUs, reservations of CUs at the CUIPs, determination of promotions or discounts at the CUIPs and association to any clustered promotion with businesses located proximate to the identified CUIPs. The method being executed by a processor.

In some embodiments, the list is arranged or filtered based on preferences of a user account used to cause the request from the vehicle.

In some embodiments, the method further comprises receiving a selection of one of the options, wherein the selection of the option includes one of reserving of a CU at a CUIP, or reserving of a CU at a CUIP and paying for the charge via a user account used to cause the request from the vehicle.

In one embodiment, a method is provided. The method, in one embodiment, will include receiving identifier information for a charge unit. This data may be received at a website or database. The method includes translating the identifier information for the charge unit to a charge unit ID (CUID). The method further includes associating the CUID to a charge unit install point (CUIP), and the CUIP defines an installation location of the CUID. The method includes receiving promotion data for the CUIP, where the promotion data is for charge rates charged at the CUIP or discounts for goods or services offered proximate to the CUIP. The method can also include publishing the promotion data for the CUIP to cloud services. The cloud services enable the promotion data to be discoverable to vehicles requesting charge location data from cloud services, the method being executed by a processor.

In one example, the method may include having a plurality of identifier information for a plurality of charge units, wherein as additional charge units are introduced into a charging infrastructure, the charge units' identifier information is translated to CUIDs.

In some embodiments, the CUIPs are locations where one or more CUs are installed or proximate thereto.

In some embodiments, the CUIP is one of a dedicated location for charging electric vehicles or a location proximate to a CU or proximate to a parking spot next to a CU.

In some embodiments, the CUIP is proximate to a business that provides goods or services other than charge for EVs.

In some embodiments, the cloud services push the promotion data to vehicles based on a level of current charge of the vehicle and location of the vehicle.

In some embodiments, the promotion data is matched to predefined likes of the user of the electric vehicle or historical actions of the user to other promotions.

In some embodiments, the promotion data is provided along a user predefined path of travel.

In some embodiments, the promotion data is provided based on a current level of charge of the electric vehicle and vehicle heading direction along a road or path.

In some embodiments, the charge consumption data at CUs is saved to a charge consumption database, the charge consumption database holds data that includes when EVs enter one power grid area and/or leave a second power grid area.

In another embodiment, a method is provided. The method includes translating identifier information for charge units to charge unit IDs (CUIDs). The method further includes associating particular CUIDs to a charge unit install point (CUIP), and the CUIPs define installation location of the CUIDs. The method includes receiving promotion data for the CUIP. The promotion data is for charge rates charged at the CUIP or discounts for goods or services offered proximate to the CUIP. The method includes providing the promotion data for the CUIP to cloud services. The cloud services make the promotion data discoverable to vehicles that require charge data from cloud services, the method being executed by a processor.

In some embodiments, the promotion data is for a period of time that expires, the period of time being published with the promotion, the period of time being set to the cloud services.

In some embodiments, a plurality of identifier information for a plurality of charge units is received, and as additional charge units are introduced into a charging infrastructure, the charge units' identifier information is translated to CUIDs.

In some embodiments, the CUIPs are locations where one or more CUs are installed or proximate thereto.

In some embodiments, the CUIP is one of a dedicated location for charging electric vehicles or a location proximate to a CU or proximate to a parking spot next to a CU.

In some embodiments, the CUIP is proximate to a business that provides goods or services other than charge for EVs.

In some embodiments, the cloud services push the promotion data to vehicles based on a level of current charge of the vehicle and location of the vehicle.

In some embodiments, the promotion data is matched to predefined likes of the user of the electric vehicle or historical actions of the user to other promotions.

In some embodiments, the promotion data is provided along a user predefined path of travel.

In some embodiments, the promotion data is provided based on a current level of charge of the electric vehicle and vehicle heading direction along a road or path.

In some embodiments, the charge consumption data at CUs is saved to a charge consumption database, the charge consumption database holds data that includes when EVs enter one power grid area and/or leave a second power grid area.

In another embodiment, a computer readable medium is provided. The computer readable medium includes program instructions for translating identifier information for charge units to charge unit IDs (CUIDs). Further provided are program instructions for associating particular CUIDs to a charge unit install point (CUIP), the CUIPs define installation location of the CUIDs. Program instructions for receiving promotion data for the CUIP are also provided. The promotion data is for charge rates charged at the CUIP or discounts for goods or services offered proximate to the CUIP. Also provides are program instructions for providing the promotion data for the CUIP to cloud services. The cloud services making the promotion data discoverable to vehicles that require charge data from cloud services, the method being executed by a processor.

BRIEF DESCRIPTION OF DRAWINGS

FIG. 1 shows a data acquisition model that includes a data acquisition interface 10 that includes an application-programming interface (API), in accordance with one embodiment.

FIG. 20 illustrates an example of a vehicle having multiple charge cells (e.g., batteries B1 and B2), in accordance with one embodiment.

FIG. 21 illustrates an example where multiple CUs can be connected to multiple charge units (e.g., segmented batteries) of an EV, in accordance with one embodiment.

FIGS. 23A and 23B show parking spots that have a vehicle-charging pad, for wireless charging, in accordance with one embodiment.

DETAILED EMBODIMENTS

Figure 2:
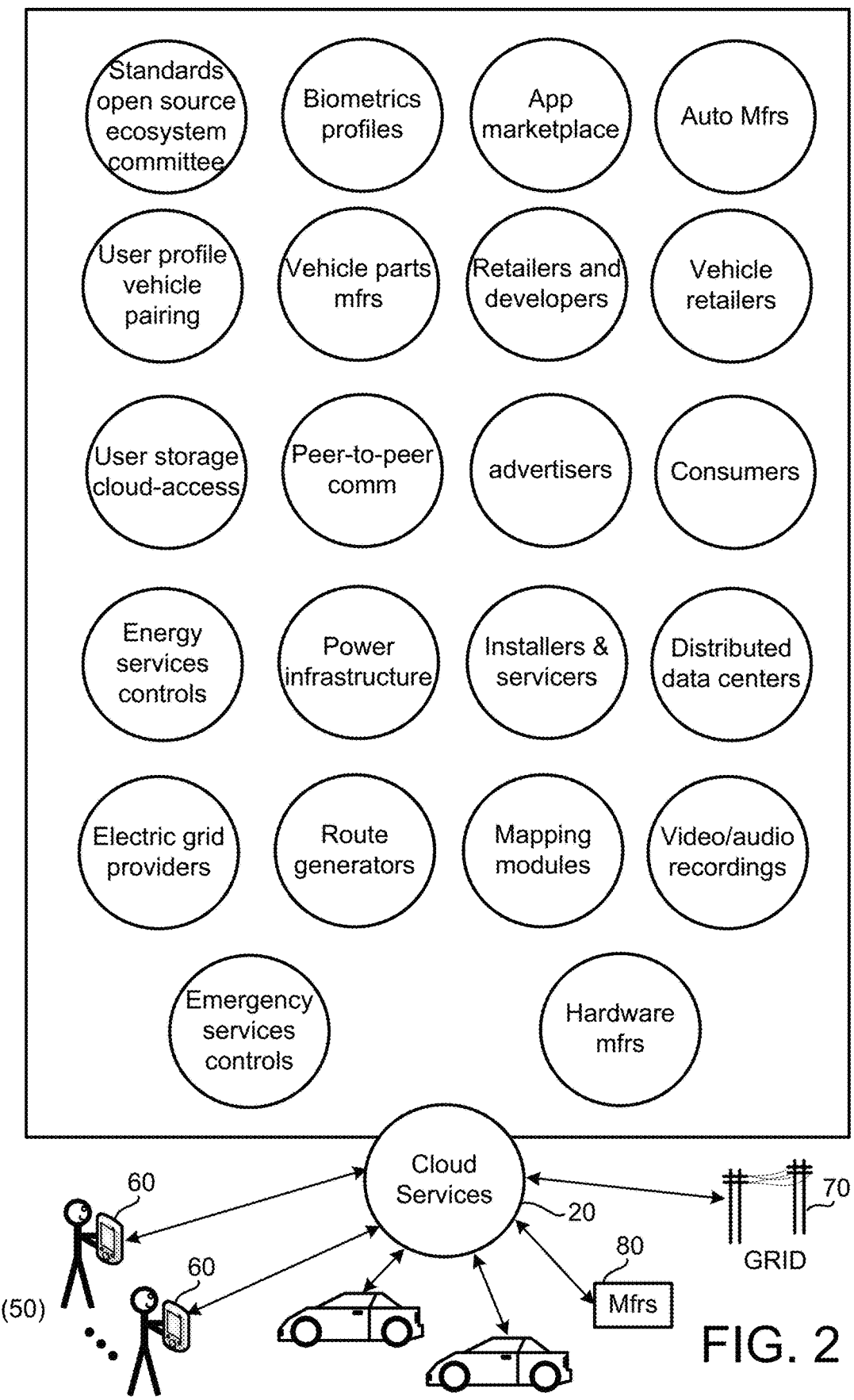
FIG. 2 shows examples of entities that can provide data to the infrastructure or can obtain data, on demand, in accordance with one embodiment.

In some implementations, methods, systems, computer readable media, and combinations thereof are provided, for locating charge for electric vehicles, automatic syncing with charging units, automatic vehicle identification by charging units and wireless charge pad systems, and method for interfacing with charging data usage, payment data, availability data and sharing via cloud system or systems, are provided.

In the following embodiments, several example configurations are disclosed, which relate to claimed embodiments. It should be understood, however, that implementations are envisioned that are defined by combined parts or features of the various embodiments disclosed herein. The combination of parts or features can define implementations that include fewer or more features than those described with specific embodiments. Thus, it is envisioned that many specific embodiments, claimed within the scope of this disclosure, can be defined by combining features described herein, such that implementations within the scope of this specification and incorporated by reference material can be defined, as will be appreciated by those skilled in the art.

In one embodiment, a method is provided. The method includes receiving, at the server, an identification of an electric vehicle that is associated to a user account that is pre-authorized to obtain charge from a charging units (CUs) associated with a network of CUs. The method further includes receiving, at the server, data indicative that the electric vehicle is positioned at least partially over a charging pad of a CU of the network of CUs. The server sends data to the CU so that the charging pad transfers charge to the electric vehicle automatically if the user account is pre-authorized to obtain the charge from the CU, the transfer of charge from the charging pad to the electric vehicle occurring without user input at the CU and without user interface input associated with the CU to cause or initiate the transfer of charge. The method further includes receiving data, by the server, regarding amount of charge transferred to the electric vehicle, and charging the user account for the amount of charge transferred to the electric vehicle.

In one implementation, in addition to providing charge at the CU, the method can include identifying user preferences for goods and/or services. Based on the location of the CU and merchants local to the CU, certain ones of the discounts are automatically selected and sent to the user, the vehicle display, vehicle computer, user smartphone, user smartwatch, or the like. In some cases, a discount is not shown to the user if the discount does not match the user's preferences or learned preferences, so as to avoid delivering clutter to the vehicle or device of the user. Example processing for executing the learning functions are described below, without limitation to various possible machine learning algorithms that can utilized user input over time to predict what a user may wish to input in the future or select in the future or set as a preference.

In some embodiments, the automatic transfer of charge to the vehicle when the vehicle parks over a charging pad can be controlled or custom set by a user. The settings can include turning off the setting so that charge is not automatically transferred, or providing the user with a notification to allow charging, or receiving a programming setting by the user that enables automatic charging only at select locations, areas, geo-locations, parking slots, brands of charge providers, or the like.

In one embodiment, methods, systems, computer readable media, and combinations thereof are provided, for assigning charge units (CUs) to a network of CUs, and methods for allowing suppliers of CU services to add the CU(s) to the network to allow consumers of charge for electric vehicles to obtain charge from the network.

In one embodiment, CUs owned by suppliers of charge can place the CUs in any location on their property, on commercial property, or shared commercial property, such as parking lots. Once the CUs are assigned to a location, the CUs are assigned to a charge unit install point (CUIP). The CUIP is identifiable by is geo location, proximity to roads, proximity to brick/mortar building. The CUIP can also be located by accessing a network, which may be managed by cloud services, such as to allow users to find CUs over a device that is connected to the Internet. The device can be, in one embodiment, electronics of a vehicle that includes displays and user interfaces to accessing applications. The Applications can be native to the vehicle or can be downloaded to the vehicle from an application site or portable. The applications run in the vehicle electronics include wireless communication logic and circuitry, memory and a processor.

In other embodiments, the same CU location identification can be accessed via any mobile device, such as a smartphone, a tablet computer, a laptop, a watch computer, or any device having access to the Internet. In one embodiment, when access is made to locate CUs proximate to the user, logic is executed to identify the current geo location of the request (e.g., the vehicle, a portable device, or non-portable device. In one embodiment, different manufacturers can produce CUs, and the CUs can be universally assigned to a network of CUs, no matter who the manufacturer is, and mapping logic allows assigning particular CUs to the network. Once the CUs are registered with a network, the CUs can then be assigned to a CUIP. Each CUIP can have a management module that allows owners of CUs to add more CUs to the CUIP, assign pricing to the services offered at the CUIP, offer promotions at the CUIP location, cluster promotions with other venders of goods/services that may be located proximate to the CUIP.

The promotions can include, for example, reductions in charge fees, free charge services, coupons, money back or credit, future discounts, current discounts, a mix of discounts for charge and discount in goods or services of a particular merchant, discounts to goods and services proximate to the CUIP, etc. In addition, when a consumer of charge is looking for charge, or logic in the vehicle determines that charge will be needed, an application in the vehicle or mobile device can identify proximate CUIPs, current waiting times at the CUIP, discounts at the CUIP, alternate paths mapped to CUIPs that provide more discounts than others, etc. In one embodiment, data of the user's past historical use of the vehicle and historical use of others that obtain charge can be analyzed to provide custom learned recommendations to the user. For example, if the user typically charges next to a coffee shop, the route to CUIPs can be recommended for CUIPs that are located near a coffee shop so the user can walk to the coffee shop while charging.

Another example may be a promotion by the CUIP owner and the coffee shop, which will provide a discount on one or both of coffee and charge. In still other embodiments, the charge services network can allow owners of CUIPs to dynamically add discounts for custom periods of times, or based on a set schedule. Users needing charge out in the field can access the network and obtain the best charge location availability and discounts based on user's predefined settings, or based on the profile of the user (e.g., including preferences set by the user and preferences that are leaned based on the user's past actions, or based on recommendations of similar drivers). In some embodiments, users looking for charge can be provided with several paths to CUIPs, where particular paths provide different types of promotions. Based on the type of promotion desired by the user, the path can be generated and presented to the user. In still another embodiment, if the user decides to accept a path, the CUIP can provide availability at the CUIP and the user can reserve a CU at the CUIP.

Still further, the user's profile can include predefined payment options, so that the user can reserve a CU, arrive at the CU, obtain charge, and pay for the charge or services automatically via an electronic transaction with the CU and the cloud services. The user's profile can therefore hold a history of past charge events, the user can then use the same to perform personal accounting, complete reporting for tax purposes, etc. In one embodiment, no matter who the CU maker is, the cloud services can enable payment to a unified service, and the owners of the CUs or CUIPs can be paid according to the services they provide, or can be debited for any promotions provided at or near the CUIP, stores, co-located business, etc.

A number of embodiments are described below, with reference to specific inventive topics and/or sub-embodiments that relate to electric vehicles, charging methods, wireless device synchronization to exchange information regarding charging events, cloud based processing technologies to share charge availability information, discounts across a charge supply grid, geo-location mapping and charge finding, user interfaces, charge unit identification systems, user interfaces to unify acquisition of charge, reservation of charge, charge units with color indicators to signal charge status and availability, charge supply systems and infrastructure for connecting charge to electric vehicles (EVs), cloud based databases and distributed data centers for tracking charge usage and sharing charge usage with charge providers, utilities, drivers of EVs, owners of charge units (CUs) and owners or managers of charge unit install points (CUIPs).

In one implementation, the listed embodiments may be viewed broadly to define separate defined embodiments. In other implementation, the listed embodiments may be combined with one or more of the respectively listed embodiments to define unified embodiments.

In one embodiment, methods and systems that provide a unified identification system for all charge units, is provided. Charge unit manufacturers register their units with an assigned universal identifier (UID); end users "charge unit install points (CUIP)" use the UID to register the charge unit when installed at the CUIP. Owners of the CUIPs can access a charge cloud service (CCS) to view their registered charge unit and enter any discounts or promotions to be provided at the CUIP at particular times. The CCS can then post, publish or distribute the discounts of CUIPs to a site. The site can be accessed via a smartphone, via a vehicle dash electronics interface (i.e., navigation system or car telematics). On one embodiment, an intelligent path generation unit (PGU) can collect information regarding the discounts or promotions offered by the various CUIPs, and based on that data, a route can be automatically generated for electric vehicle (EV) drivers based on their driving paths or mapped driving routs.

For instance, if a user has programmed their EV to reach a destination (e.g., Point B), from a current location (e.g., Point A), the mapping can population information concerning available CUIPs in the vicinity of the chosen path between A and B. In addition, the discovery of CUIPs and population as information to users regarding a path can be limited or filtered based on the status of the battery of the EV. If the EV is currently full of charge, the user will not be shown CUIPs near the beginning of the path between A and B. As the charge starts to get closer to a low state or state at which the driver should consider charging the EV, the CUIPs in the area can be populated to the display of the user's EV dash graphical user interface (GUI).

Alternatively, the CUIPs along a round can always be shown to the user, no matter what the level of charge is in the EV. EV users can therefore access an APP to view and find charge units (CUs) at CUIPs and, based on their desired path, various CUIPs are shown as options to the user, with any published discounts identified. In other embodiments, the published discounts or promotions can be displayed in rank order. For instance, the user can filter promotions or discounts in terms of reduced charge rates, products or merchandise offered based on purchased charge, etc.

Payment for charge can, in one embodiment, be unified by a process or application that shares charge activity and provides revenue back to the suppliers of the CU. Payment can further be unified by enabling wireless payment at a CU. In one example, when an EV reaches a location of a CU, an application can be surfaced to the electronics of the vehicle or to a user's portable device. The application can provide the user with options to login or simply accept to proceed with automatic payment for charge consumed at the CU. Cloud services, which may run one or more applications, can maintain logs for the user to show historical charge activities and costs.

On the CU side, the supplier of the charge can also receive payment from the EV drivers and can be provided with metrics of charge utilization at one or more CUs in a network of CUs owned or operated by the CU supplier.

Utility companies or power suppliers can also be provided with metrics of charge use at various CUs, historical charge loads, and times of peak and lows for the various geographically distributed CUs. Utilities can therefore manage power supplies and power rates more effectively and can further populate real time cost per charge rates to EV users, which may discourage EV users from seeking charge during peak or more expensive times of day.

FIG. 1 shows a data acquisition model that includes a data acquisition interface 10 that includes an application-programming interface (API), in accordance with one embodiment. The API, in one embodiment, is constructed to interface with a virtualization infrastructure 16 that stores data in data centers 18. The virtualization infrastructure 16 can be distributed throughout a region, such as by country, e.g., like the United States, or by multi-country jurisdictions, e.g., like Europe or Asia.

The API 12 allows various types of data creating entities or data consuming entities to share data in real-time or substantial real-time. In the provided example of FIG. 1, various entities can include, without limitation, charge unit install points (CUIPs). Broadly speaking, a CUIP is a location at which charge is provided to electric vehicles (EVs). A location can be where one or more charge units (CUs) are installed and can access charge from a charge-providing source, such as a local electric grid operator, solar producing panels or cells.

When a CU is installed, the corresponding location is the CUIP. The CUIP can be a private location, such as a residence or business, or a public location that provides charge, such as at dedicated charge dispensing stations, parking lots, or businesses. CU will have an assigned identifier, such as a serial number that is universally assigned to the CU, once installed at the CUIP. Once installed, the CUIP is also registered with a serial number that is universally assigned. In one embodiment, the assigning of a universal serial number can be managed by, for example, by a universal serial number assigner module that interfaces with the API. By centralizing the assignment of serial numbers to CUs and CUIPs, it is possible to standardize the deployment of CUs from many manufacturers that that may not communicate with one another. Thus, once CUs are made, such as by CU manufacturers, that data can be shared through the API 12 to the data acquisition interface 10.

In the same manner as CUs are assigned standardized serial numbers across disparate manufacturers, other players in the electric vehicle (EV) ecosystem can also take advantage of the centralized assignments of identifiers, such as serial numbers, codes, names, etc. These players can include, without limitation, electric vehicle manufactures. Electric vehicles can be registered either at the time of manufacture or later after purchased by the end user. Registering of EVs can include allowing the owner of the EV to set its own personal level of privacy. For example, some users may not want to be tracked by location at all, while some may which to be tracked for location, but remain anonymous. Tracking a vehicle in anonymous mode will allow users to be notified of special deals or promotions in the vicinity of the vehicle as the user drives around. Yet, the identity of the user will not be disclosed or stored by any database. Thus, the level of tracking can be customized by the end user and changed at anytime on the fly. Tracking of location of the user can be managed as simply as users are tracked or as they navigate the Internet. If the user wishes to delete his or her history of travel or permanently delete history of driving, paths, speed, direction, stops, the user can simply login to the cloud service and delete the history. In some cases, the user can set full anonymous driving history mode, by simply clicking a button or setting on the EV's GUI display or by accessing the account via a computer or other personal electronic device (e.g., phone, tablet, etc.).

Another system to coordinate and transfer data with the data acquisition interface 10 is the electric grid. The electric grid can be a local grid supplier, such as an electric company. Because EVs move around and enter and leave new power grid areas, the power grid suppliers will need to know when more EVs enter their region or are purchased in their region. As more EVs start to reside in a particular region, the demand on the local grid can expand or decline. This information is important for grid operators, as the infrastructure can be better managed and forecasted. For example, if electric vehicles start to increase, say by 10,000 EVs per year, the grid can start to plan for the increase. However, in one embodiment, it is possible to track when each one of the EVs travel into a grid area or region and when they leave the grid area. The travel of EVs into and out of grid areas can also be tracked historically but still anonymously with respect to the identity of the user or owner of the EV. Tracking the travel of the EVs can also be modeled to make projections of growth and can facilitate grid owners to project the need to expand the infrastructure in advance of the need, which reduces emergency expansion costs for grid operators. In addition, it is possible to project when more EVs enter or leave the number of operating EVs.

The inflow or outflow of EVs into particular regions can be important information that can be used by CU manufacturers. As more EVs enter the market, the CU manufacturers can plan to expand the deployment of CUs into markets with a growth in EVs and EV use.

Traffic data concerning the paths taken by EVs, where EVs are stopping for charge and where charge is needed. For instance, if particular roads are busier than others, it can be estimated that more CUIPs may be needed along those path locations. Mapping data can also be obtained from mapping entities, and data can be provided back to the mapping entities. For example, accurate mapping data is needed by the EVs, but the EVs can also provide critical mapping data back to the mapping entities.

The data acquisition interface 10 is also shown in communication with a cloud based charge service ("cloud services"), which communicates with entities, such as EVs, smart devices, computers, etc. For example, a driver in an EV can access the services to identify CUIPs, map closer CUIPs, map or find CUIPs that have deals or promotions, etc. The driver of an EV can also access these services via any device, whether or not the user is in the vehicle. These services can also intelligently provide data back to drivers based on historical driving actions. For example, if a user drives a particular path or approximate route between points A and B frequently, that historical driving can be used to provide the user with options of new routes or CUIPs that provide better charge options. The cloud-based services can also be accessed by any one of the entities that interface with the data acquisition interface. Access to particular data can be filtered based on the user identification and password, or an authentication method.

FIG. 2 shows examples of entities that can provide data to the infrastructure or can obtain data, on demand Cloud services 20 can provide the interface to the disparate entities, and infrastructure can be unified by identifier assignments, as noted above. By way of an Internet accessible interface, user can access the data via smartphones, portable electronics, vehicle electronics, computers, etc. As shown, the cloud services may provide access to power grid suppliers 70, vehicle manufacturers 80, and users with any type of computing device 60.

Figure 3:
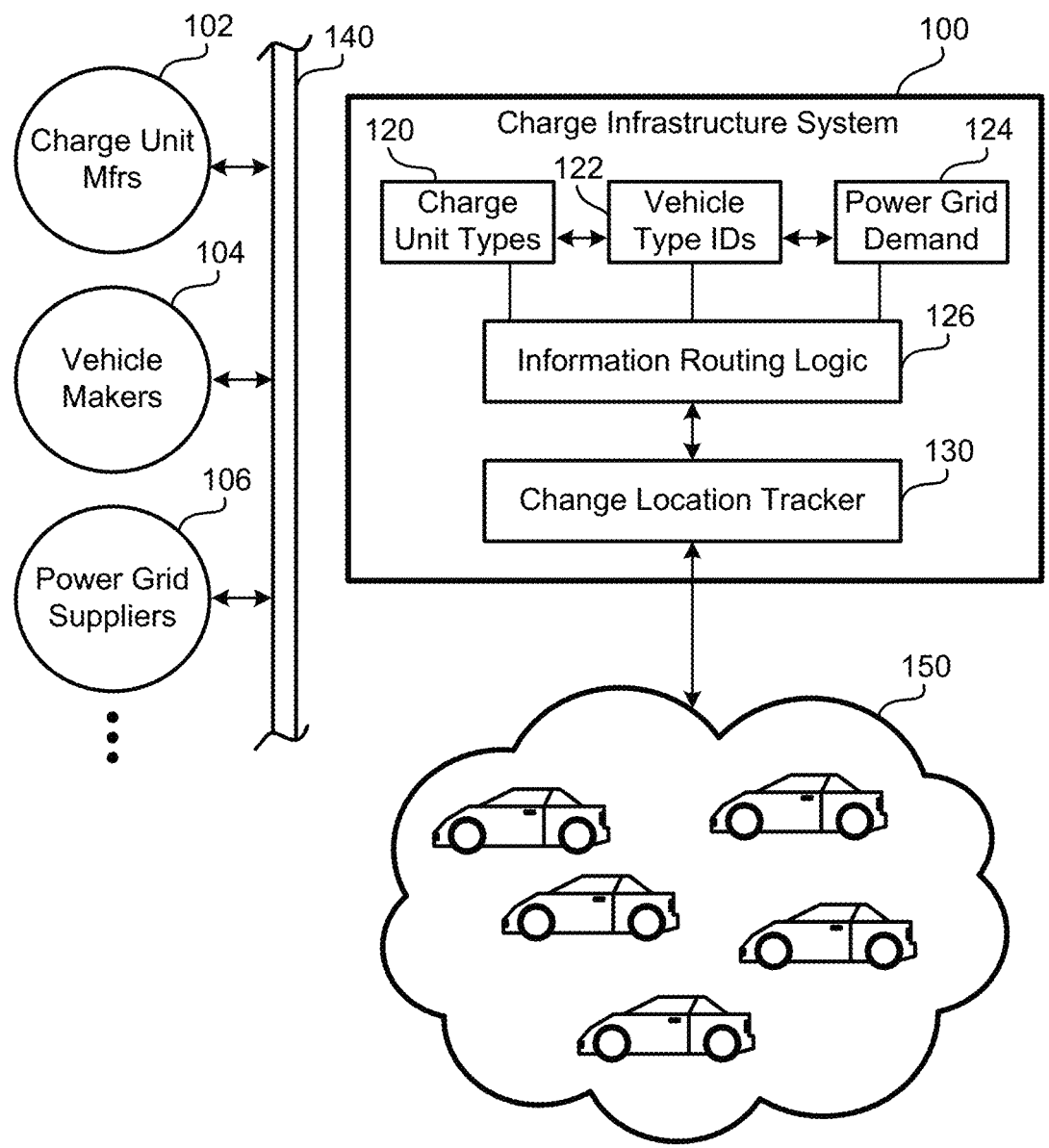
FIG. 3 shows an example of a charge infrastructure system (CIS) that can communicate with various entities via charge services, in accordance with one embodiment.

FIG. 3 shows an example of a charge infrastructure system (CIS) 100 that can communicate with various entities via charge services 20. The entities can include, for example, charge unit manufacturers 102, vehicle makers 104, power grid suppliers 106, etc. Communication can be hand, in one embodiment, via a network 140. The network 140 can include internal private networks and/or the Internet. In one implementation, the CIS can include information regarding charge unit types 120, vehicle type identifiers 122, power grid demand 124 and information routing logic 126. The charge location tracker 130 is a module that collects location data from EVs, which defines an EV grid 150. The EV grid is a map that shows the location of EVs and the paths taken by EVs over time or in real time. In some embodiments, if the user of the EV allows for more data to be disclosed to entities, the information can be filtered at the request of the EV owner/driver, to restrict personal information. However, the user may wish to disclose travel or charge event information to enable the cloud services to provide richer data back to the user, either by way of a mobile application, internet browser, vehicle interface, etc.

Embodiments are defined that enable owners of the charge units (CUs) to register their CUs with a cloud service. The cloud service adds the CU to the network of CUs that can be discovered by users that search for charge as they drive around in the electric vehicle (EV) or any other vehicle or when the user walks around with a portable device having access to the internet.

The owners of the CUs can, on demand, post the price they wish to provide charge at the CU. In some cases, the owners of the CU can sponsor free charge at their CU, which may bring traffic to the CU and if the CU is in proximate to the CU's business (e.g., a big box store, or any other business), the EV driver may stop by and purchase goods while the vehicle is charging.

Figure 4:
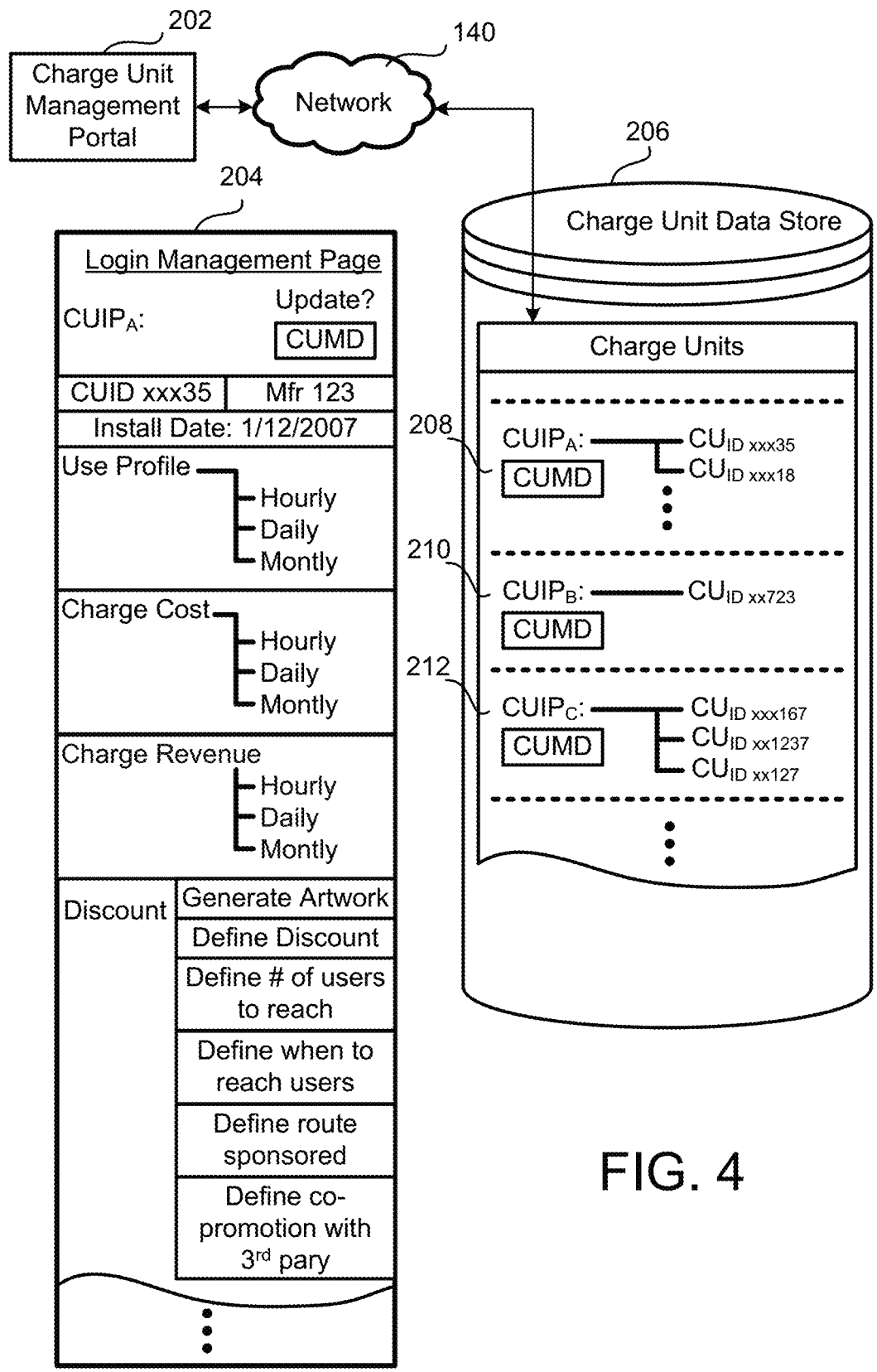
FIG. 4 shows a system diagram, where a CUIP owner can login and access a management module, in accordance with one embodiment of the present invention.

FIG. 4 shows a system diagram, where a CUIP owner can login and access a management module, in accordance with one embodiment of the present invention. As shown, a charge unit management portal 202 is provided with access to network 140, such as the Internet. Through the network 140, access is provided to Login management page 204 and the charge unit data structure 206 database. As shown, by way of example, CUIP_A 208, CUIP_B 210, CUIP_C 212, each show a number of CUs that are associated with the particular CUIPs. The owner of the CU, who sets up a CUIP, can login to cloud services to register the CU or CUs of it owns to a CUIP. In the process, the user can register the serial numbers of the CUs, such as ID xxxx, and this data is associated with the CUIP of the user. At the management module, the owner of the CUIP or the person having access to the CUIP, can login and set up a profile for the CUs. The profile can be used to identify the charge cost to be offered at particular times of day or based on other factors, such as charge cost from the grid. The programming of prices and rewards can be set ahead of time and can be set to dynamically adjust over time, based on real-time conditions and preset rules.

In one embodiment, based on the charge cost, the charge revenue based on user's accessing the CUs can be tracked, including metrics of when the CUs are most profitable. In addition, the operator of the CUIP can define custom attributes for the CUs, including artwork to be computer generated for user interfaces (UIs). The specific discount parameters can be programmed by for each CU, the number of users that should be reached with discounts, if the discounts are to be published by the cloud services. The publishing can including, for example, by displaying the CUIP at the top of lists when users search for CUIPs, or based on advertising funds spent for higher promotion of the CUIPs to users of EVs.

The owner or manager of the CUIP can also set when they desire to get more people to visit the CUIP. This can be done, for example, by publishing discounts at particular times. Still further, if CUIP is made available to users of particular routs, those parameters can be provided by the CUIP owner. This data can then be used to publish the availability of the CUs at the CUIP, based on the parameters set by the owner or manager of the CUIP. The data that is programmed in can be updated at any time by the owner, so that the data published about the CUIP (i.e., availability of charge and rates) can be made available to EV drivers when the owners of the CUIP want.

For example, if the CUIP is placed next to a coffee shop and coffee sales are slow at 3 pm, the owner of the CUIP can change the rates of the charge to a lower value, which may influence some people to choose the CUIP for charge. If the person stops for charge at the CUIP, the user of the EV may simply walk to the coffee shop while he/she waits for charging to progress. In some embodiments, the CUIP owner can also program discounts to the coffee shop, in addition to the charge. Blended discounts can also be provided, such as if the user spends X at the coffee shop, the price of the charge can go down. The cloud services will be able to store the data about the CUIP in a charge unit data store, which is accessible throughout via the charge services connected applications. Thus, as more CUIPs are added to the network, richer profiles can be made based on the data and filtering users of EVs needed to make decisions on where to charge.

Methods and systems for unifying identification of charging units (CUs), is provided. Example methods enable charge unit manufacturers to access a cloud services system to register their CU or CUs. The CU is provided an ID by the manufacturer and the ID is unified by cloud services. Once installed at charge unit install points (e.g., CUIPs A, B, C, etc.), the owner of the CUIP (i.e., the owner of the location at which the CU is installed). The owner of the CUIP can register the CUs to the CUIP, and assign various status details to the CUs, such as discounts, advertisements, etc. The CU metadata is information about the CU (e.g., where the CU was made, model, use time, status, etc.), the CUIP (e.g., the address at where the CUIP is located, the businesses proximate to the CUIPs, discounts provided at the CUIPs, historical pricing for charge and other services at or near the CUIP, etc.).

The metadata about CUIPs and the CUs can be maintained in user accounts on storage of a cloud services system. The data, in some cases, is personal to the owner of the CUIP and CU, and that data can be securely separated to enable better unification and to provide improved sharing of data that is not confidential or has been indicated private. Thus, the cloud services, in one embodiment, will provide privacy controls to protect privacy of all of the entities sharing data via cloud services, from CU manufacturers, CUIPs, owners of CUs and CUIPs, EV owners and users.

Once CUs are registered with a cloud service, the cloud service can deliver ads from local businesses to users of the EVs; users of the EVs can provide their wish lists, and the cloud service can match the best CUs based on promotions or display ads best targeted to user likes and charge history. In one embodiment, the cloud service will be an ad service, which non-CU owners may post to if their business is proximate to a CU.

Figure 5:
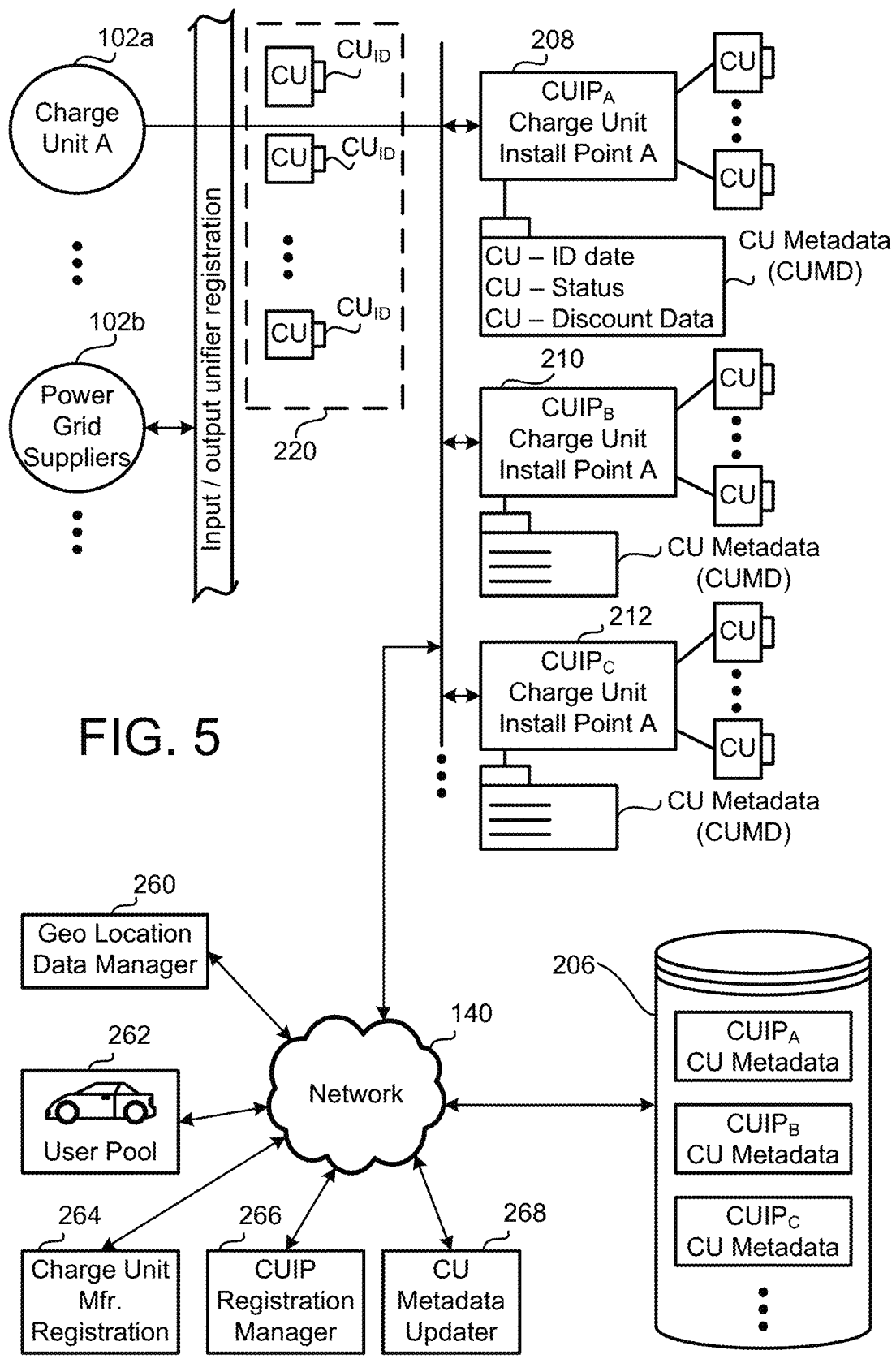
FIG. 5 shows an example of CU manufacturers providing registration of new CUs as they are introduced into the market, in accordance with one embodiment.

FIG. 5 shows an example of CU manufacturers providing registration of new CUs as they are introduced into the market. The CUIPs can access the cloud services to register CUs to CUIPs. The network 140, in one embodiment, performs the cloud services noted herein. In one embodiment, the network 140 can communicate with geo location data managers 260. The geo location data managers can include third party mapping services, GPS providers, tracking services, mobile phone services, and other internet services. The CU manufacturer data can be storage in a registration database, as well as the CUIP and CU data and metadata updating logic. As shown, the network 140 can also be in communication with user pools 262, charge unit manufacturer registration data bases 264, CUIP registration manager 266, CU metadata updater 268, and charge unit data store 206.

A charge unit data store 206 can hold the various information from CUs, CUIPs, and associated metadata. The various information can be stored in various locations and in a distributed manner at different data stores and processing can be accomplished via virtualization processing systems that enable load balancing across large geographic areas.

In one embodiment, when information regarding EVs historical use, paths taken during the life time of EVs, maintenance called for EVs, maintenance for CUs, etc., is collected, the data can be used to plan for future events. Future events can include, for example, upgrades to CUs, improved data distribution to drivers of EVs, etc. Historical use of "notifications" can also be used by EV makers and CU makers to improve the performance of CUs and data mine the information to enable improved deployment of new CUs and EVs.

As further shown in FIG. 5, charge unit manufacturers 102a and 102b are shown connected to input/output (I/O) unifier registration interface. This provides a method and process by which CU manufacturers can introduce CUs to the market or to third parties that will sell and install the CUs. The CUs will be provided with an ID 220. The ID provided to the CUs will be a unified ID. Thus, no matter what the manufacturer that provides the CU, the ID is unified or standardized. In this manner, the CU ID can be associated to CUIPs 208. CUIPs 208 will therefore have one or more CUs associated therewith. The CU metadata shown in FIG. 5 will be mapped to the CU, which includes mapping back to the manufacturer of the CU, its history of use in the field, and performance for the owner of the CU that added it to a CUIP. This data, as noted above, will be accessible to the network 140.

A data acquisition model that universally communicates and translates charge data to and from entities. Entities can include electric vehicles (EVs), electric charge units (CUs), charge producers, charge grid managers, charge unit install point (CUIP) owners, charge unit (CU) manufacturers, traffic data producing sources, map producing sources, advertisers, and custom interfaces to each entity. Each entity is provided a view into the data acquisition model based on who the entity is and what is relevant to the requesting entity.

Figure 6:
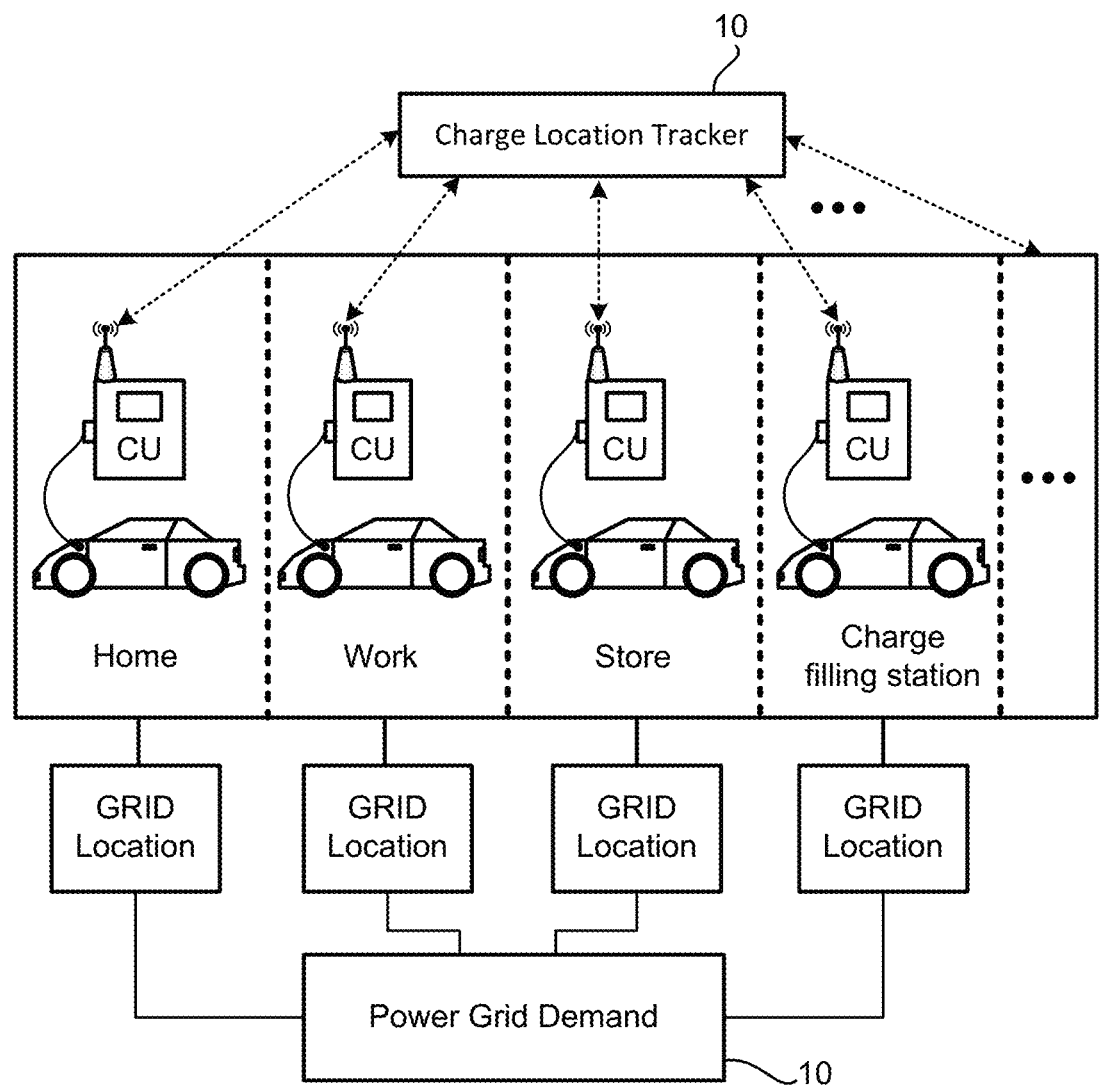
FIG. 6 shows an example of CUs at different locations for tracking of charge consumption to the power grid, in accordance with one embodiment.

FIG. 6 shows a diagram of various locations at which the EV may be charged. For example, the EV can be charged at home, at work, at a store, at a charge filling station, etc. The CUIP can be private (e.g., like a home), or public. The CU will have an ID that is assigned by the manufacturer. The ID that is originally assigned by the manufacturer, in one embodiment, is translated into a universally assigned serial number. In one embodiment, the translation can occur at if the manufacturer registers the CU for a particular CUIP. In another embodiment, once the CU is installed at a location, the owner of the CU can register the CU to obtain the universal serial number. The universal serial number can then be used by the cloud services. The cloud services can provide data regarding available CUIPs when the user of an EV wishes to obtain charge away from home. Power grid operators, such as power companies, can also identify the demand of power pulled by the CUIPs. Depending on the demand coming from the grid locations, the grid demand can be calculated and used to monitor investments in power producing infrastructure. In one embodiment, it is also possible to identify if more than one EV is charging at a particular CUIP. This is particularly important if the CUIP is a private residence. This information can be used by grid operators to plan for the increase in power use by the CUIP location. Likewise, if certain CUIPs have fewer EVs charging at that location, whether private or public, it is possible that the CUIP is a poor location for a CU.

Broadly speaking, the power grid operator can be one that produces power via one or more ways. Such ways can include fossil fuels, nuclear fuels, solar fuels, wind-power fuels, or combinations thereof.

Methods are provided for tracking locations where charge is obtained by users and the progress of charging. In one embodiment, applications connected to cloud services allow user to optimize selection of locations to obtain charge based on occupancy and progress of charge for electric vehicles (EVs) already charging. The vehicles that are in process of being charged are, in one embodiment, in process of a charge event (CE). The charge event can be indicative of a fill state of the EV while the EV is connected to the vehicle. As vehicles are charged, the CE data can be collected by power grid operators. The grid operators can be, for example, the local power stations that provide power to the charge units (CU) that are in process of a CE.

Figure 7:
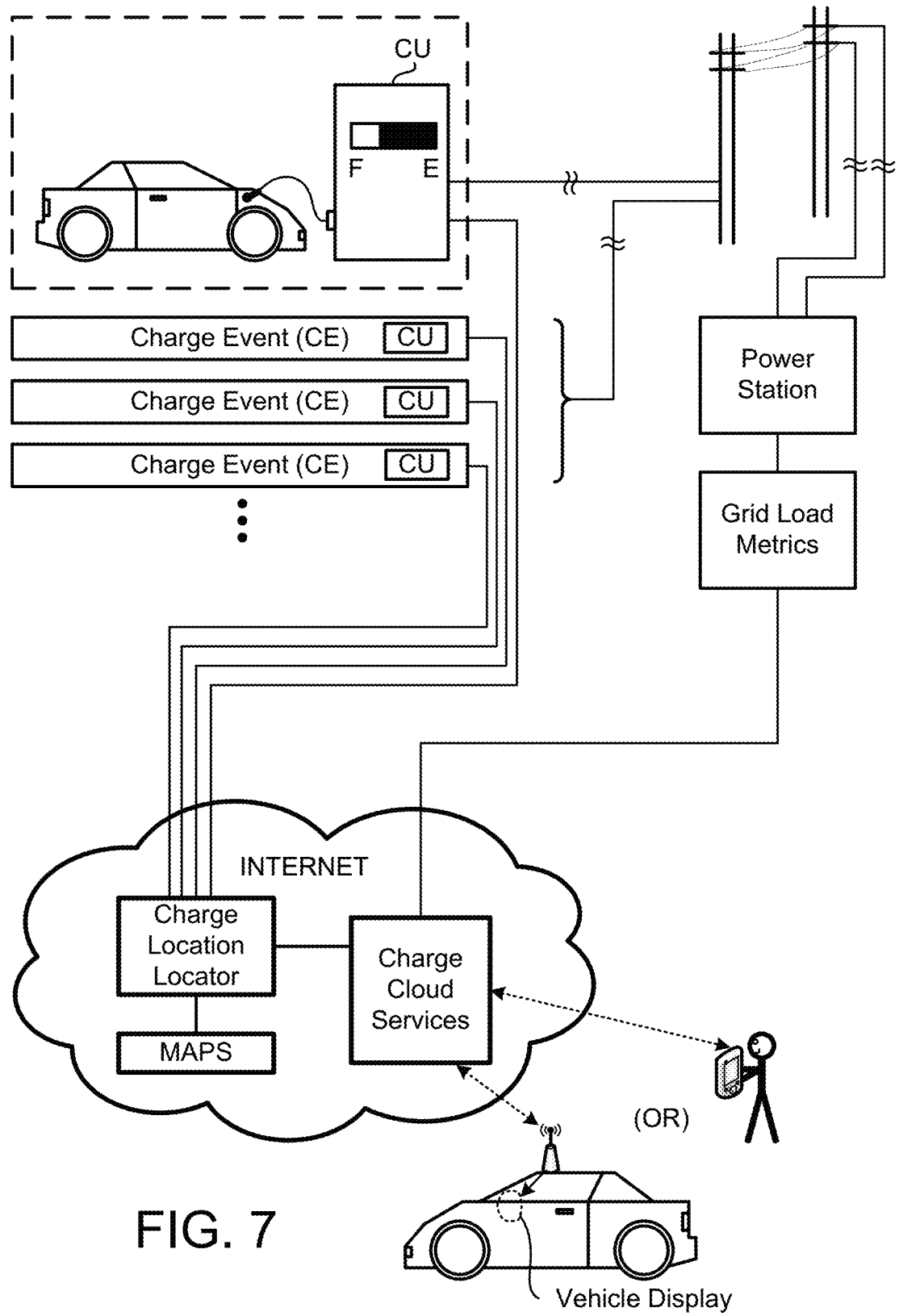
FIG. 7 shows an example of charging events CEs for various EVs and CUs, and cloud services for locating charge and discounts, in accordance with one embodiment.

FIG. 7 shows how tracking the CEs, the data can be monitored by power stations to calculate grid local metrics. This data is also stored or exchanged with charge cloud services, which use this data to provide information to the gird operators as well as to operators of EVs. Operators of EVs can access the charge cloud services using their vehicle displays or via electronics (e.g., computers, smart devices, phones, tablets, etc.).

Synchronizing data between the consumers and the providers of charge enables for efficient distribution of charge and associated consumption by EV drivers. For example, grid operators can provide data regarding energy costs at different times of day, which will also enable real-time changes in electric rates charged at the CUs. In the same way, if the charge rates are high at particular times, users of EVs can find or be informed of better times to charge. This information from grid operators back to consumers in real time provides feedback mechanisms so consumers know of changing rates or more optimal times to charge at particular CU locations. In a way, the grid operators are no longer passive one way suppliers of power, but can also influence the consumption by users by providing real-time data back to the CUs and the cloud services that provide the information to user's mobile applications and on-board vehicle applications.

Figure 8:
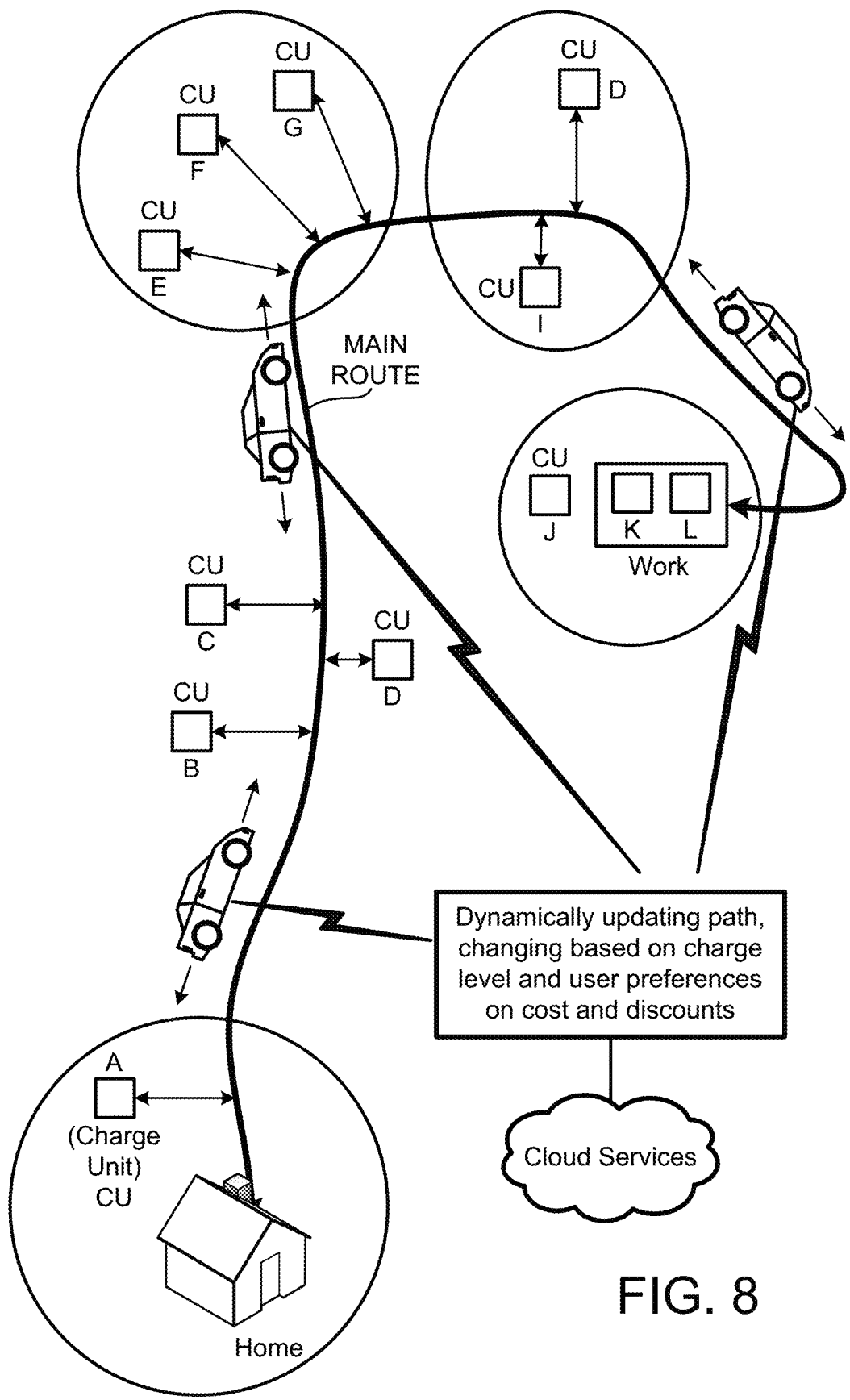
FIG. 8 illustrates a path and CUs located along a path and various discounts along the path, in accordance with one embodiment.

FIG. 8 illustrates a route providing to a user that drives a common route from home to work. This route may be defined by a user by entering the route into a smartphone or into the vehicle's on-board display-electronics. In one embodiment, when the user traverses the main route, the user could be provided with various charging options along the way. The route can be dynamically adjusted overtime, so that different charge point install points (CUIPs) having charge units (CUs) will be marked along the route. The route can change, such that different days the route will be different, depending on occupancy of the CUs, the cost of charge at the CUs, or the promotions by businesses that may be proximate to the CUIPs.

In other embodiments, if a user takes a similar route between home and work, on a regular basis, the historical routes taken can be stored to a database. If the user chooses, the route information can be provided to a database. The route information can, in one embodiment, be maintained anonymously. Providers of charge and related merchants where the CUs are proximate thereto, can access the database so that charge discounts can be provided to drivers. For example, the fact that the user, who may be registered, drives a particular path will be used by a CU provider to populate discounts to the user. In one embodiment, CUs may not be directly along the path, such as CUs E, F and G, but if one of those CUs provide enough incentive, the time to go off-path will be a benefit. Further, as the user drives along and the charge level changes, certain ones of CUs can populate discounts or prices to the user, as the user drives near a CU that is in proximity to the user who needs charge. Other dynamic updates on available CUs and discounts, based on the position of a user along a path are possible.

In one embodiment, a method for clustering promotions is described. When businesses are proximate to each other, the owners are able to cluster promotions to charge units (CUs). In one embodiment, clustering promotions can drive traffic from EVs to stop and get charge at particular CUs. An example is a coffee shop next to a big box store; both can offer discounts for their charge stations, and the discounts can be joined/shared to increase EV traffic to area.

Cloud services can, in one embodiment, assist in managing the clustering. For example, if one business that provides charge via a CU, can be notified of other businesses that have opted or would like to join in on a cluster promotion program. Thus, participants in providing charge and discounts can be paired based on proximity.

Figure 9:
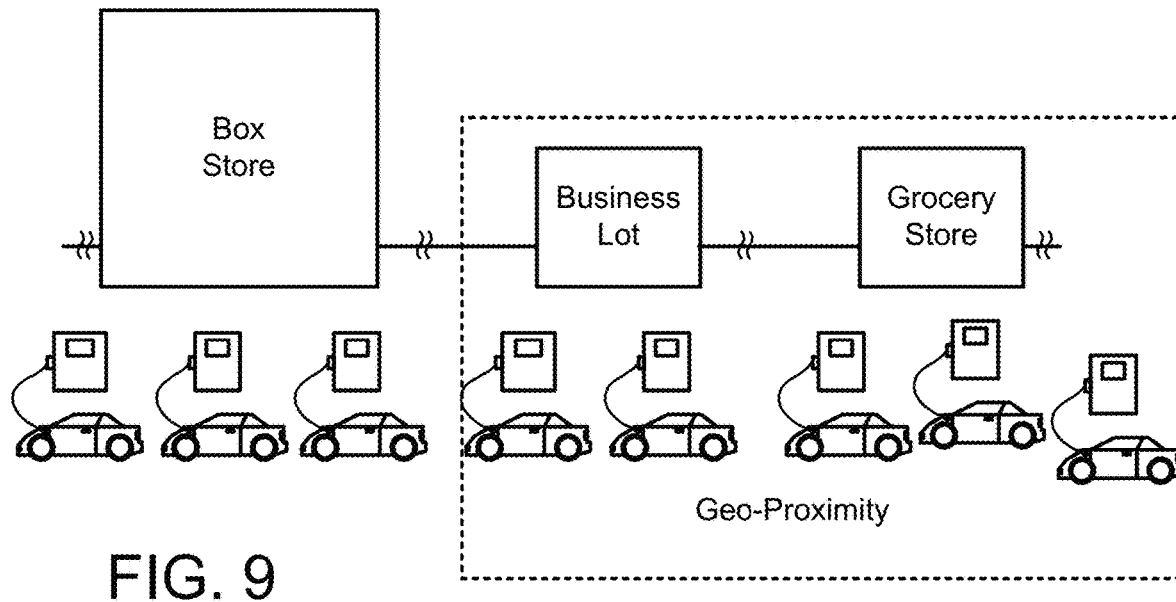
FIG. 9 illustrates a clustering of discounts for proximate located businesses that provide discounts, promotions, or deals to CUs next to the businesses, in accordance with one embodiment.

FIG. 9 illustrates an example, where multiple businesses may be located proximate to certain CUs. In one embodiment, it is shown that business lot and grocery store each have CUs located proximate to their businesses. It is also shown that box store, having respective CUs is not located sufficiently close to business lot and grocery store.

Figure 10:
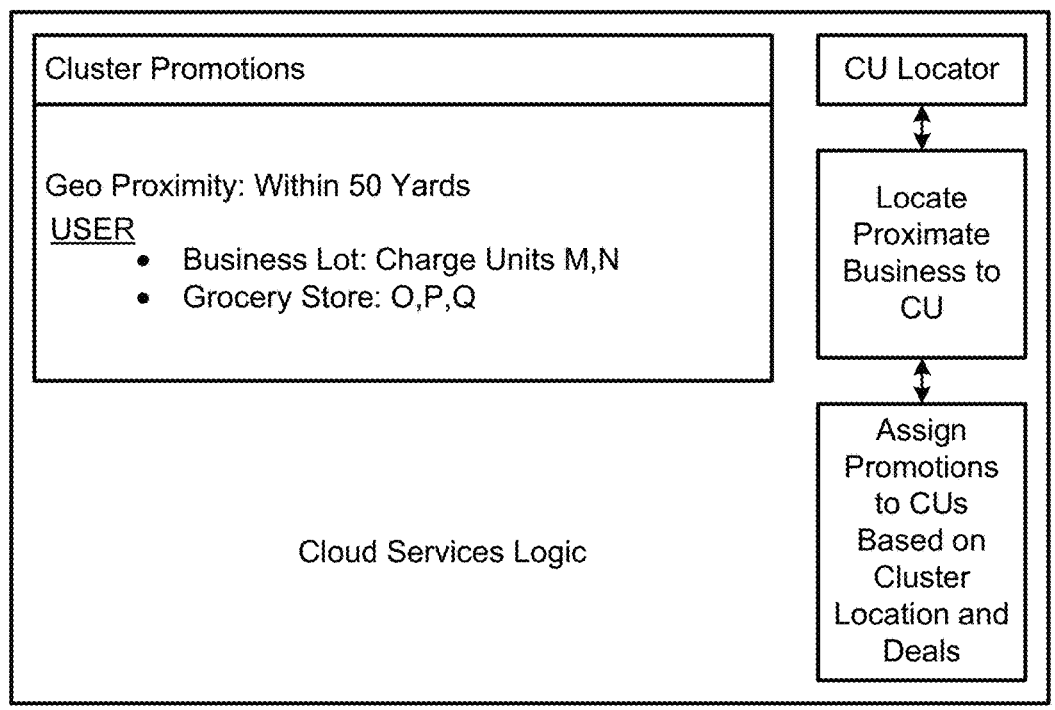
FIG. 10 illustrates an example of a GUI screen to allow businesses to establish clustered promotions, by locating CUs and defining promotions, in accordance with one embodiment.

FIG. 10 shows, an example graphical user interface and logic that may be executed to find CUs and propose clustering. The proximity can be user selected. A user can login (e.g., the owner of grocery store) to find any other businesses that may be proximately located and may be providing charge via CUs. Once the proximity is set, on a user interface by a user, a set of stores may be populated to the user interface. For example, business lot and its CUs may be shown (e.g., CUs M and N). Also shown is a proximate business, such as grocery store, which has CUs O, P, Q. The data regarding the available or proximate CUs can be found using cloud services which may communicate with a geo-location program as well as a database of CUs and user preferences for the CUs.

For example, if the owners of the CUs post their willingness to offer clustered promotions, those businesses and CUs will be shown. This will allow various owners to arrange a clustered discount. The clustered discount can be, for example, a discount on price of charge, or a discount at business lot and grocery store, or a combination thereof. The owners of the businesses may increase their sales simply by providing discounts to the CUs and EV owners can be notified of such discounts. Notifications can be provided to the EVs in real time, as drivers drive their EVs around. Notifications can also be provided digital devices of users, such as smartphones or other mobile devices.

In one embodiment, a driver can arrive at a parking slot and a sign or some indicator may be provided. The sign can be digital or not, and can provide information as to how charge is purchased or enabled. The sign may include, for example, a QR code that can be scanned via the user's device, or a URL that can be typed in, or an application can be accessed, or a near field communication (NFC) connection can be established, etc.

Via a user interface, a user can identify how much charge is needed, or identify the vehicle or account of the user. An auto-plug (AP) can then lift up and automatically connect to a plug on the car. The plug on the car can have a door (under the vehicle) that will automatically open when the AP gets in proximity or reaches the appropriate position. The door or area around the door can include sensors or identifying markers that can be identified by the AP to enable efficient or accurate plugging by the AP. The user (e.g., via a device or in-vehicle electronics/displays), once connected to a site for enabling charge, can access his or her account, pay for services, set notification services, access discounts, maps, advertisements, etc. The charge cloud services can, in one embodiment, communicate with a CMS (charge management system) of the charge unit install point (CUIP) where the charge unit (CU) is located.

In an alternative embodiment, the charge access protocol can be initiated by the vehicle, which communicates wirelessly with the parking slot to establish a pairing. The paring can provide the user with information as to how to connect with services of the charge cloud services. The charge cloud services can be connected other services or data over the Internet. Examples can include connection to user account services, charge unit CUIDs, CUIP, Ad servers, maps, discount services, notification services, and/or payment services.

In one embodiment, charge events detection and session management can be abstracted. In one embodiment, the system can maintain charge allowance separately from the actual hardware of the CU. For example, the user can pay for 10 hours, for example, and use the 10 charge hours at any CU that will provide access to the charge account. In one embodiment, the user's account can have a password to enable access to any number of CUs.

In addition, if charge is purchased by one user, the charge can be shared or transferred to another user. The purchased charge that is not used, in one embodiment, is credited to the user's account. The sharing of charge credit can be made via any device. One some examples, sharing of charge can be by way of wireless device, e.g., by accessing an account on the internet, or simply emailing a friend an amount of free charge to selected CUs or CUs on a particular network.

In some embodiments, charge purchasing can be made via a collective account, where multiple users join a group to purchase charge. In some embodiments, the group can be a public group and in other embodiments a private or semi-private group. By joining a group, charge may be purchased at reduced rates relative to purchasing charge individually. Purchased charge can, in one embodiment, be defined by a unit of charge at a unit of cost. Thus, charge can be purchased in advance and/or in bulk by a group to receive favorable pricing. Once charge is purchased, users can use the charge units from one or more CUs over time. In one embodiment, each contributing member would have their own account, wherein the purchased units of charge are managed. Each user can obtain access to their account and view how many units they have available or remaining. Members of the group can also trade or sell charge to each other.

In one embodiment, the charge units can also be shared with other users, e.g., who are not members of the group. For instance, a user can transmit or share charge units with other users via mobile applications (or any internet connectable device). In one example, mobile applications have access to servers that manage cloud services. In some embodiments, the groups can be family groups, wherein a family purchases an amount of charge for use during a period of time. In some cases, families can purchase charge at lower rates when rates are low and stock/save the charge for future use. As defined herein, use of charge may be when users access CU to charge or fill a vehicle with charge. As vehicles of the group or a family charge their vehicles with charge, the credit or bank of charge owned by that group or family will be respectively depleted.

In some cases, groups can purchase charge at various times, such that a cost averaged charge value is presented for charge purchased over a period of time (e.g., when charge was purchased at different rates). The cost average of the charge purchased can then be calculated or displayed on a user interface of a device. In some embodiments, charge purchased in advance may be restricted based on one or more rules. In one example, charge use of purchased charge can have geographic restrictions. For instance, if charge is purchased in a geographic region that is remote from where charge will be used (e.g., accessed to fill a vehicle), the rate of charge may be adjusted or changed based on where the user actually fills the vehicle. At the time of purchase of charge, the user can be provided with a geographic region in which the charge of the lower rate/cost can be used. If the charge is used in regions outside of the geographic area, different rates may apply. These rules can be pre-set or can be dynamically set over time as the cost of charge changes (e.g., the cost of producing the charge).

In one embodiment, methods for plugging in a vehicle to obtain charge and syncing a device to pay for charge are provided. For example, methods and systems are provided to synchronize user devices with charge units (CUs) to begin a charging session.

Figure 11:
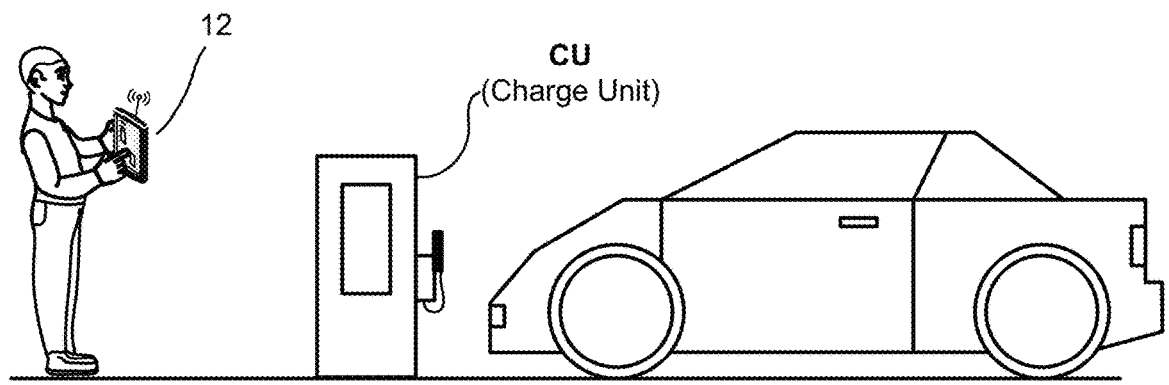
FIGS. 11-13 illustrate examples of connecting a CU to an EV and interfacing with the CU via a mobile device, in accordance with one embodiment.

FIG. 11 provides an example of a user arriving to a CU (charge unit) 10 with a device 12. The CU can have a display, which can provide instructions for adding charge to the electric vehicle (EV).

Figure 12:
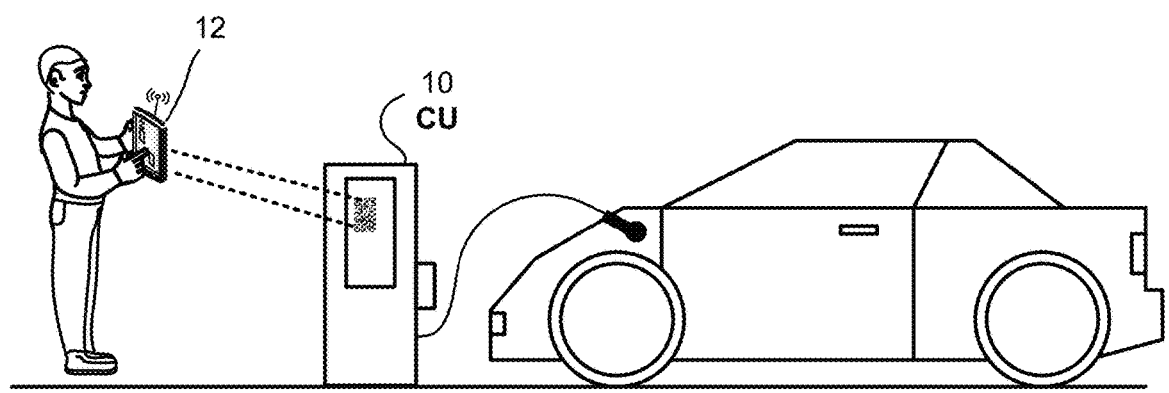

FIG. 12 shows that the user has plugged the charging cord to the vehicle, and has scanned a QR code. Although QR codes are described, other ways to sync the device to a CU to establish a charge session are possible. For example, the CU can provide a phone number, a credit card reader, a password input, a user input interface or touch screen, a bar code, a wireless link via WiFi, internet, or Bluetooth, or other connection interfacing methods and protocols.

Figure 13:
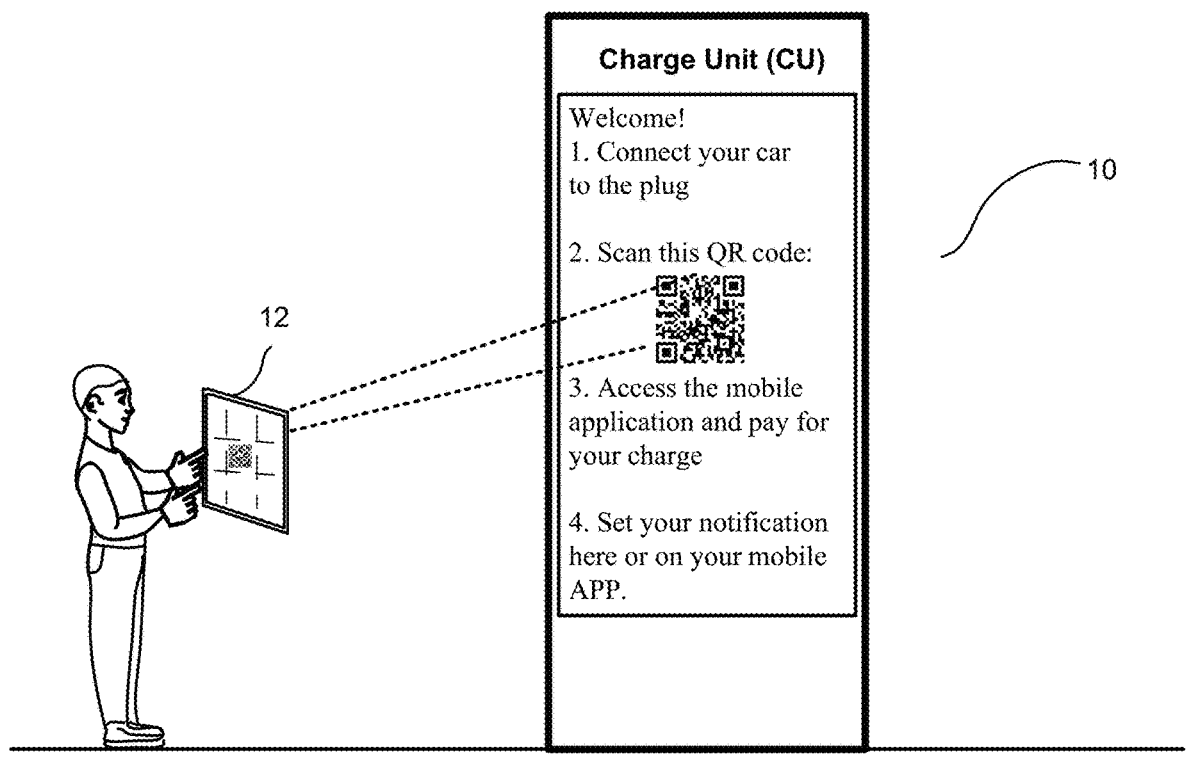

FIG. 13 shows an example screen with instructions, so the user can sync with the device and select the level of charge (e.g., to fill a vehicle). The sync operation can also be by way of accessing an app over the internet or entering a code of the CU into an app, which is connected to the internet. Notifications for the user, once charge has begun can also be set, either at the CU or on the user's device (e.g., on screens of graphical user interface).

Figure 14:
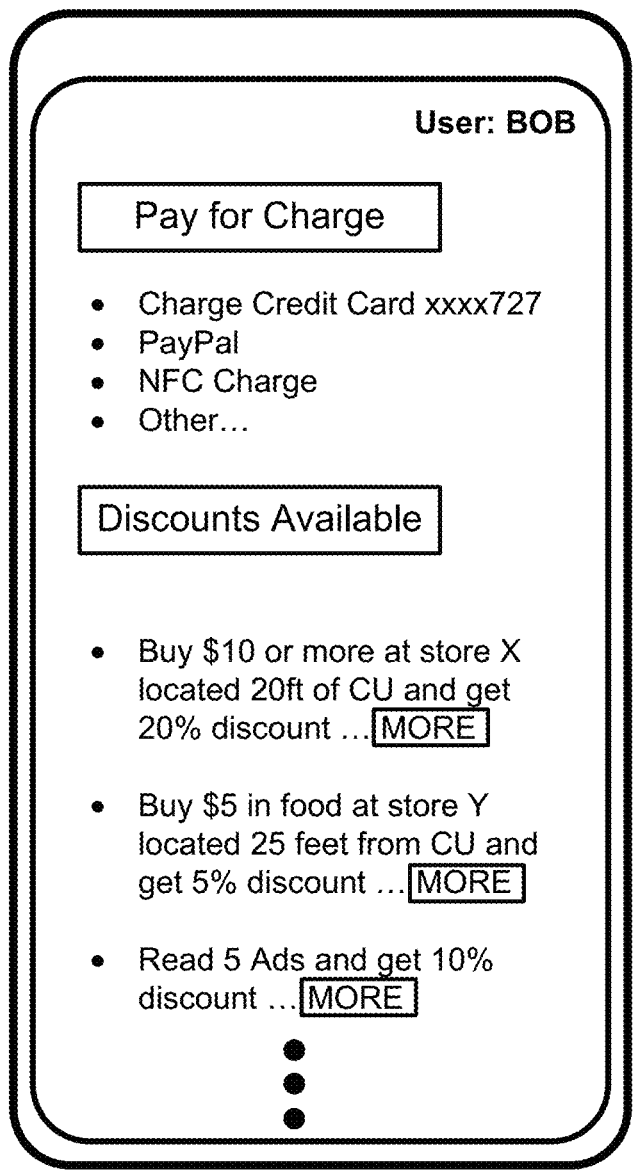
FIG. 14 shows an example of access to a user account, and payment options and discounts provided or associated with local merchants proximate to the CU, in accordance with one embodiment.

FIG. 14 shows an example where a user named "Bob," has an established user account, on the screen of a device. The methods of payment, which may have been established earlier or can be established at any time, can be noted on the user interface (UI). The discounts available for the CU can also be shown to the user on the screen of the device. The discounts may be obtained from cloud services, where the suppliers of charge and local merchants are able to provide discounts. In one embodiment, the suppliers and local merchants can identify where discounts are to be provided, e.g., such as which CUs will provide discounts and the type of discounts.

For instance, if a local merchant has a CU local to their store, the local merchant may provide discounts for their business at that CU, as that may drive foot traffic to the merchant's business. In this manner, merchants can identify CUs to provide discounts. For example, while a vehicle charges, a user may visit the local merchant. The discounts can be assigned to specific geo-locations, instead of specific CUs. Thus, geo-fencing can be used to identify discounts from select CUs. The selection can by via any device, including by a touch screen where a user circles some area on a map. For example, a business with multiple locations can advertise by providing discounts at certain CUs located within a geo-location area. Users, in a similar manner, can scan or find or search geo-locations for CUs, and CUs that offer discounts can be presented to the user. In one example, discounts may be provided when a user visits the local merchant or buys a good or service at the local merchant. Once the user visits or buys at the local merchant, the merchant may validate the discount to the user. Validation may occur by, for example, sending data to a server confirming that the discount is valid, or that the merchant will pay or sponsor part of the charge paid to charge the electric vehicle.

As shown in the figure, "Available Discounts" may be provided in a user interface of a device, such as when the user finds a charging unit and decides to obtain charge. A user account of the user may already have a payment process in place, such as stored credit card, Paypal™, NFC charge, or some other e-commerce payment. One discount example may be, "Buy $10 or more at store X located within 20 feet of the charge unit and get 20% discount," "Buy $5 in food at store Y located 25 feet from charge unit and get 5% discount," "Read 5 ads and get 10% discount."

In one embodiment, discounts are not necessarily general advertisements, which may not provide a direct or local or immediate benefit to a reader. In general, however, a discount may be considered an advertisements, however, discounts described herein are specific to a charge unit or charge units at a particular geo-location, and such discounts are targeted toward individuals that may more likely make use of the discounts at a local merchant that may be located proximate to the particular charge units. To validate the discount, users can visit the local merchant while the vehicle charges. The discounts can be credit for actual charge bought, discounts on goods or services offered by the merchant, or a combination thereof. In one embodiment, the merchant can validate the discount by emailing the buyer, providing a credit to the buyer's charging account or user account, providing credit to the user via a service network that provides/sells charge, or provide some other benefit for visiting the merchant's business (e.g., while the electric vehicle charges).

In one embodiment, a user can take an action at the merchant's location, e.g., store. The action, as shown in the examples, can be to buy something from a local merchant, visit a location merchant, read ads from or about a local merchant, etc. In one embodiment, the discount can be directly tied to the charge used, and because the merchant offering the discount is near or proximate to the charge unit, the user is likely willing to at least visit the merchant while the user waits for the electric vehicle to charge. In some embodiments, the discount can also apply to goods or services provided to the merchant, such that the discount can be a hybrid of discount for charge used and discount for goods and services of the merchant. In these examples, charge used may be considered used when the user is in progress of filling charge. For example, the merchant may provide the discount while the user is in the merchant's store, and the discount may be conditioned on the user completing to buy a certain amount of charge and/or buying a certain amount of good or services and/or visiting the merchant. The dynamic adjustment of discounts can occur based on a preset number of rules (e.g., what discount, where offered, when offered, how long it lasts, incentives for fast buy, logic for combining discounts, logic for sharing costs of discounts with others, logic for reducing the cost of the charge, etc.), as set by the provider the charge and/or the sponsor.

Figure 15:
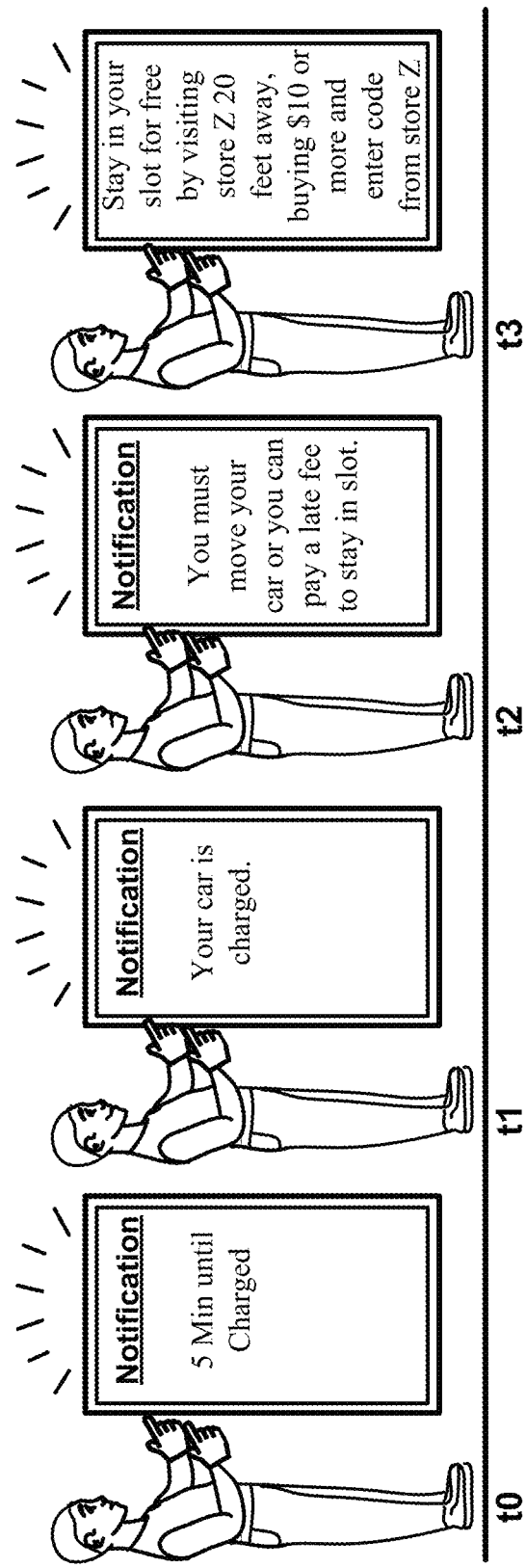
FIG. 15 shows an example where a user can receive notification during charge sessions and ways of paying or buying goods to say in the slot when charge is complete, in accordance with one embodiment.

FIG. 15 shows an example where a user, e.g., Bob, can receive a notification at time to, where the system notifies Bob that his car will be charged in 5 min. If the user gets this notification, the user can return to his car timely (e.g., so the user avoids a penalty for occupying a charging spot beyond when the vehicle is actively charging). At time t1, the user can receive a notification on his device (e.g., smartphone or portable device having access to the internet) that his car is charged. At time t2, if the user has not yet returned to his car, the user can be provided with a notification that the user must remove his car from the charging spot or else pay a fine or pay a fee to stay in the spot for some time.

If the user decides at time t3 that the user wants to stay in the slot, the user can pay a fee to remain in the slot instead of getting a fine. In one embodiment, if the user is visiting a local store while at time t3, the user can be provided with a notification or data that the user can purchase some items at the store, e.g., 10, and the user will be allowed to stay in the spot longer. In one embodiment, the CU can have a light indicator that shows the level of charge of the vehicle. If the vehicle charge is near empty (but starting to fill with charge) or low, the light can be green or orange or some other indicating color or lighting, indicating that the user is correctly parked and paying for charge. If charging is done, the light can turn to red (or some other color to indicated charge complete or finished). This will signal to others in the area that this slot is just holding a car that is full and the user of the EV may return soon.

If the user gets the notification and decides to pay for time to say in the slot, the light on the CU may be changed to a color other than red (or change the indicator to not finished or charging is in progress), so that nearby people will not get annoyed that the vehicle is taking up a CU spot when fully charged.

Figure 16:
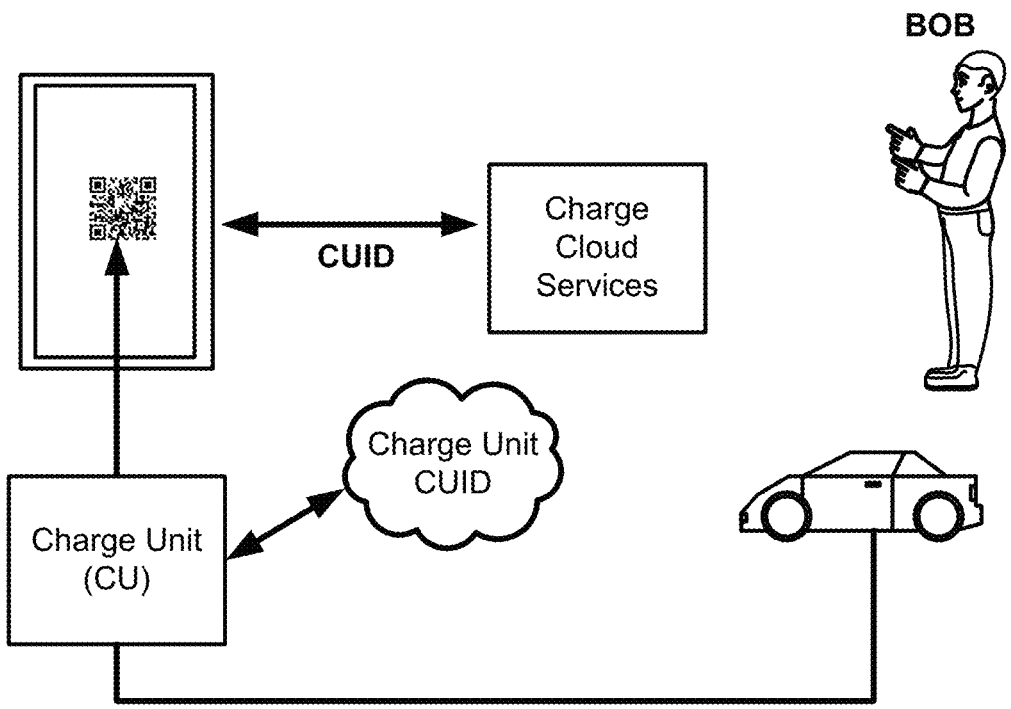
FIG. 16 illustrates an example of a user's device obtaining a code from a CU at a charge unit install point (CUIP), in accordance with one embodiment.
Figure 17:
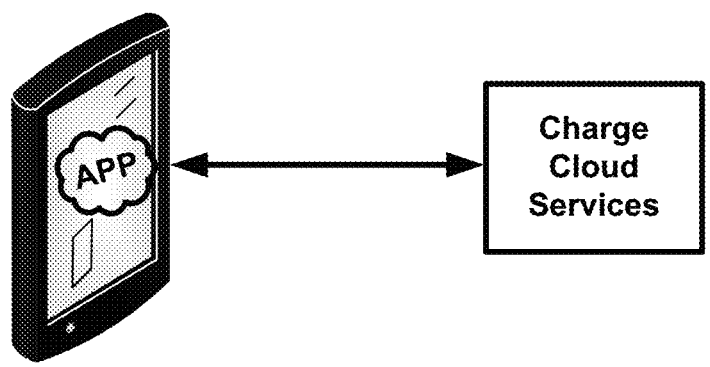
FIG. 17 illustrates an APP of a device making connection to charge cloud services, in accordance with one embodiment.
Figure 18:
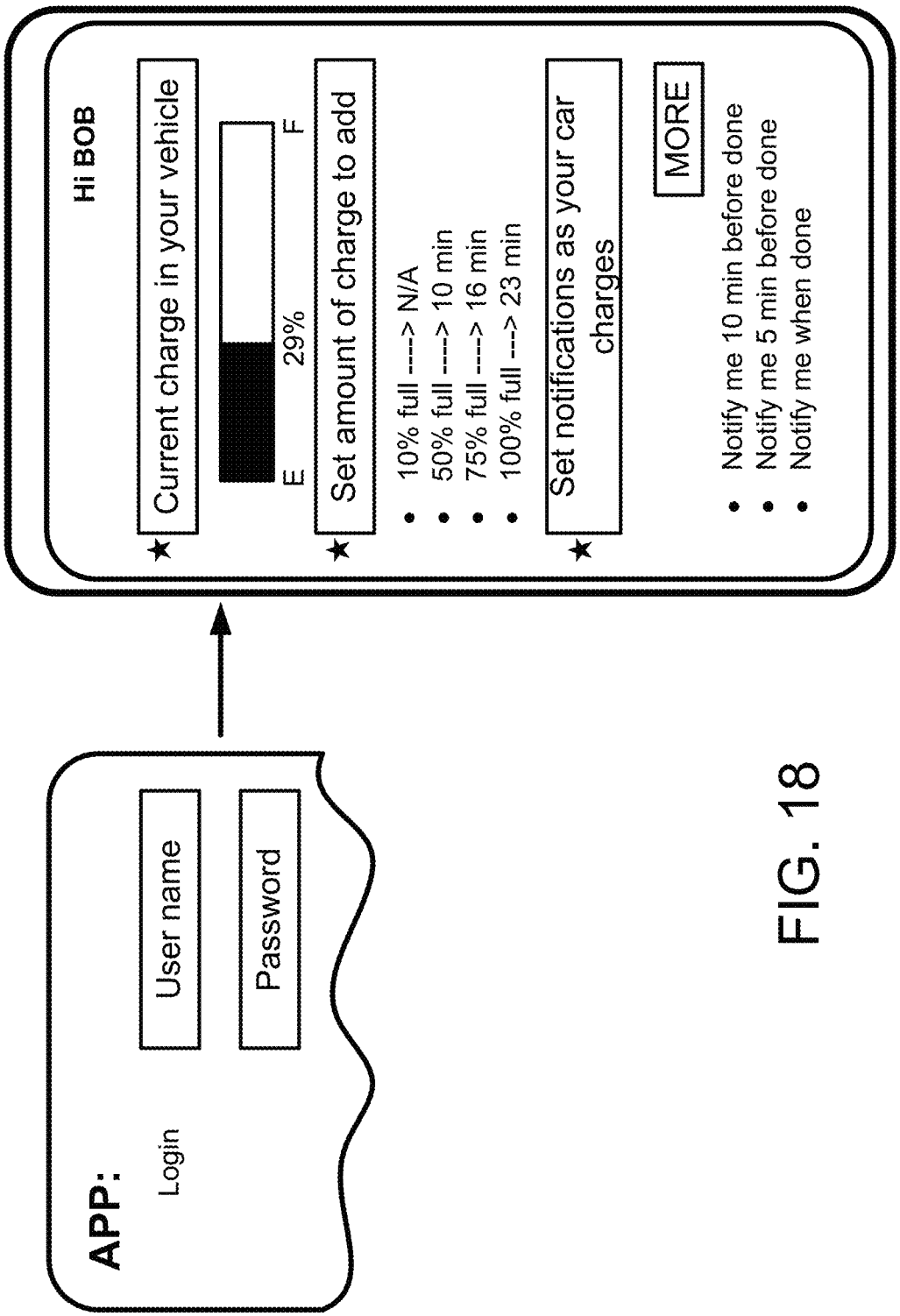
FIG. 18 illustrates an example process when a user logs in to an App, and the App provides the user, Bob, with information about his vehicle, in accordance with one embodiment.

FIG. 16 illustrates an example of a user's device obtaining a code from a CU at a charge unit install point (CUIP). Cloud services can then allow the user to access his or her account to setup the charge services. In FIG. 17, it is shown that an App of a device or EV can automatically connect to the charge cloud services. FIG. 18 illustrates an example process when a user logs in to an App, and the App provides the user, Bob, with information about his vehicle. This information can be obtained wirelessly by way of the EV sending its info to the cloud services (or via an App on a user device).

In one embodiment, the App can allow the user to set an amount of charge to add, which may be based on estimated time to fill. The estimate can be calculated dynamically, based on the charge in the car and/or based on a charging rate capability of the CU that the user connects to for charge. Thus, the time estimate can be accurately determined to allow selection of the charge amount. The selection may be made, for example, based on the amount of time that the user has available for charging. This information can also be translated in terms of miles or distance. For example, the user can be provided with information as to how much time it will take to add charge and how much distance that charge may provide the EV.

Notifications can also be set for the charge. This allows the user to specify how many and what type of notifications he or she wishes to receive. More settings are also available, such as for the car, the CU, or a combination of car and CU.

In one embodiment, a user can plug in a car, and then sync his phone to the CU. The CU may display a QR code (or other ways as noted above) that sync to a phone, or the phone (or device) can capture an RFID tag from charge station (CU). Once the car starts charging, the phone can display a progress indicator changing as the charge is ongoing. Once complete, the user may be provided a text (or any other type of message—i.e., to user's device). While the car is charging, the user may get warnings, e.g., 5 minutes till fully charged or till filled up to a point. This way, the user can go back to the car and drive away or move the car out of the charge station parking spot.

Figure 19:
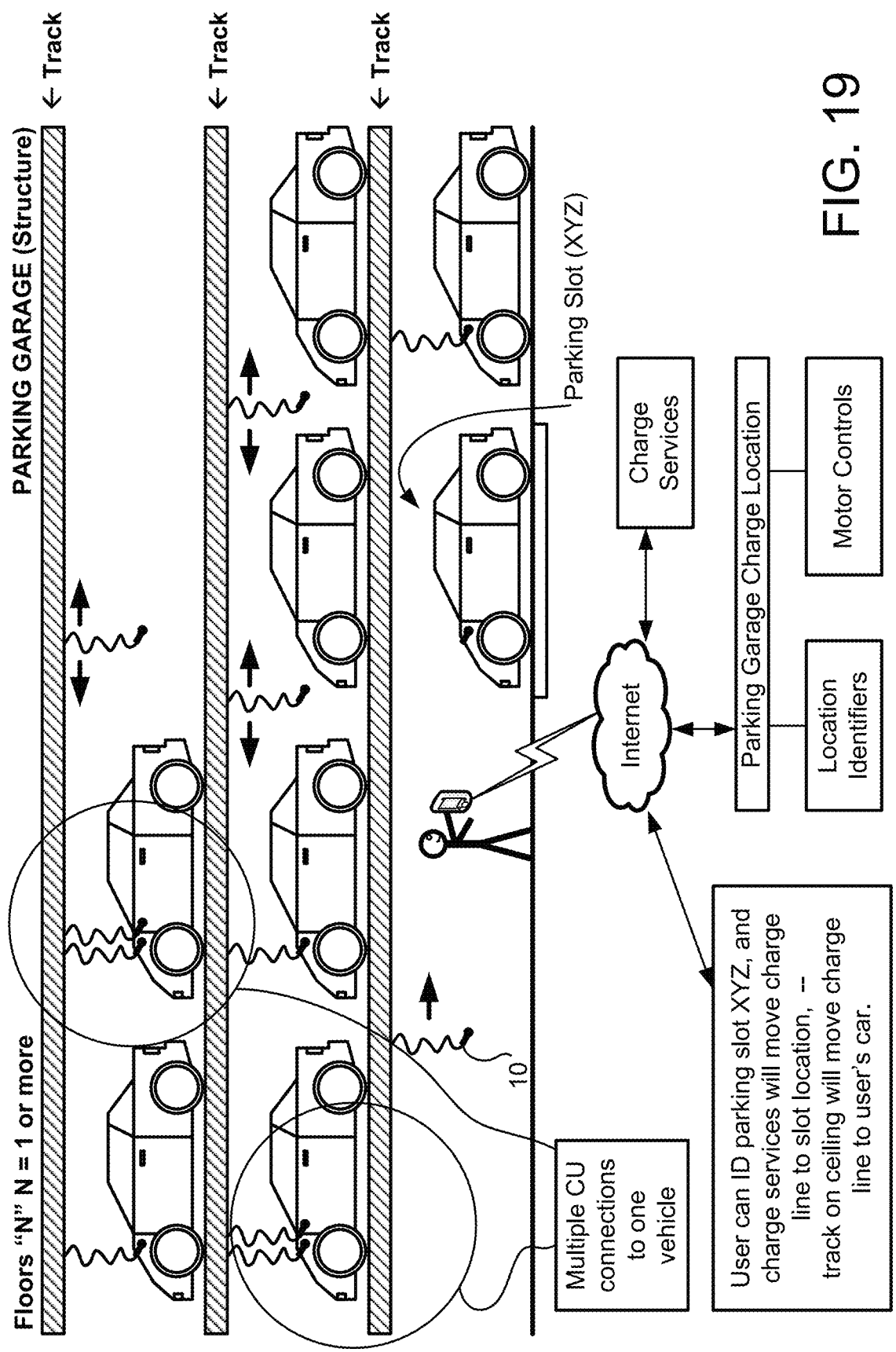
FIG. 19 further shows a parking structure, which can include one or more floors and ceiling charge cords, in accordance with one embodiment.

Methods and systems for charging vehicles in structures or areas are also disclosed. Systems and structures are provided, which can include ceiling mounted charge cords, as shown in FIG. 19. When the user parks, the ceiling mount cord can drop down for charging the car. In one example, if the user parks in a spot, the user can look up (or in the proximity) and see a parking slot number above the car. The user can punch in the number into the phone/or car display (or sync to the local communications interface) to release the cord that is lowered or provided so the user can plug in the car. This will give the user charge for the car for a fee and the user can be notified when the charge is done or its progress.

FIG. 19 further shows a parking structure, which can include one or more floors. In one embodiment, the structure has cords that connect to the ceiling and can move along a track. The cords can be delivered to the user's parking spot, and the user can connect the cord to the vehicle. The user can also have a vehicle that includes more than one charge cell, and each cell has external connectors to allow more than one charge cord to connect to the vehicle. This is a multi-charge cord connection embodiment, which can also provide notifications to the user's device via charge services. In the example shown, a user may connect to the internet to access charge services. The charge services may provide access to a parking garage charge location, which includes location identifiers and motor controls. The location identifiers may define where the vehicle is in the garage, so that the charge cord can be delivered or dropped, or made accessible at the location where the vehicle is parked. This provides for flexibility in charge delivery, as parking spots need not be fully dedicated to only charge EVs, but can also be used by non-EVs.

FIG. 20 illustrates an example of a vehicle having multiple charge cells (e.g., batteries B1 and B2). Each battery can be connected to a different CU, e.g., CU1 and CU2 (or one CU with multiple connectors). In one embodiment, this may allow the vehicle to charge faster. In one embodiment, the charge units are segmented, to allow faster charging, such as to battery segments B1 and B2, which are connected to a power manager (MGR). CU1 and CU2 are shown connected, respectively, to B2 and B1, for example. The method provides for separately connecting one charge unit (CU) to each battery segment. In one embodiment, charge time is reduced by connecting two or more CUs to two or more battery segments of one vehicle. In the illustrated example flow, segmented batteries are provided for one vehicle.

FIG. 21 illustrates an example where multiple CUs can be connected to multiple charge units (e.g., segmented batteries) of an EV. This provides for even faster charging, when multiple CUs (or cords of a CU) can connect up to a single vehicle. As shown, multiple CUs (e.g., CU #1, CU #2, CU #3, . . . , CU # n) are connected to different batteries or segments of batteries B of a single vehicle, which may reduce charge time of a vehicle.

Figure 22:
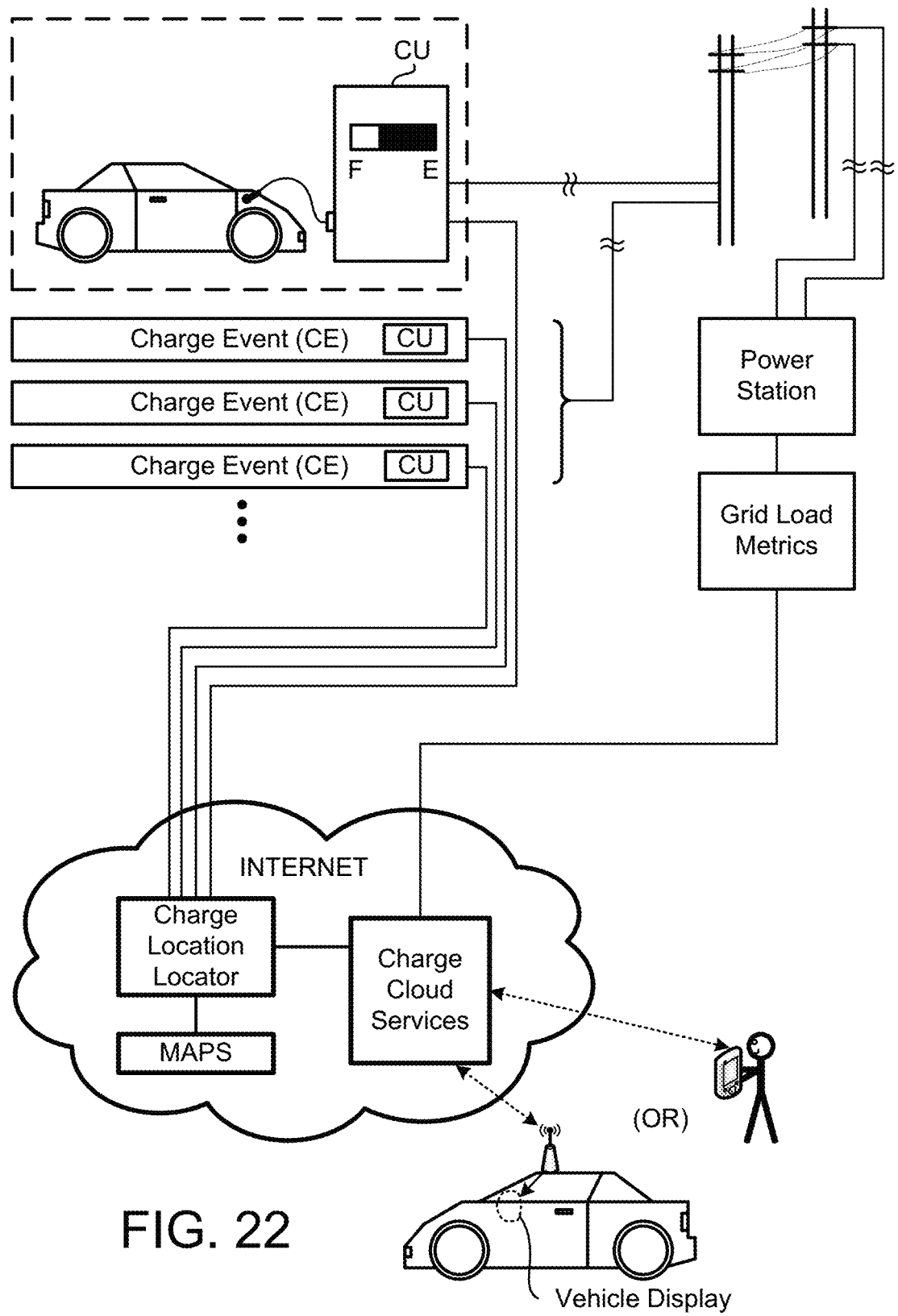
FIG. 22 shows how tracking the CEs, the data can be monitored by power stations to calculate grid local metrics.

FIG. 22 shows how tracking the CEs, the data can be monitored by power stations to calculate grid local metrics. This data is also stored or exchanged with charge cloud services, which use this data to provide information to the gird operators as well as to operators of EVs. Operators of EVs can access the charge cloud services using their vehicle displays or via electronics (e.g., computers, smart devices, phones, tablets, etc.).

Synchronizing data between the consumers and the providers of charge enables for efficient distribution of charge and associated consumption by EV drivers. For example, grid operators can provide data regarding energy costs at different times of day, which will also enable real-time changes in electric rates charged at the CUs. In the same way, if the charge rates are high at particular times, users of EVs can find or be informed of better times to charge. This information from grid operators back to consumers in real time provides feedback mechanisms so consumers know of changing rates or more optimal times to charge at particular CU locations. In a way, the grid operators are no longer passive one way suppliers of power, but can also influence the consumption by users by providing real-time data back to the CUs and the cloud services that provide the information to user's mobile applications and on-board vehicle applications.

In one embodiment, a method for clustering promotions is described. When businesses are proximate to each other, the owners are able to cluster promotions to charge units (CUs). In one embodiment, clustering promotions can drive traffic from EVs to stop and get charge at particular CUs. An example is a coffee shop next to a big box store; both can offer discounts for their charge stations, and the discounts can be joined/shared to increase EV traffic to area.

Cloud services can, in one embodiment, assist in managing the clustering. For example, if one business that provides charge via a CU, can be notified of other businesses that have opted or would like to join in on a cluster promotion program. Thus, participants in providing charge and discounts can be paired based on proximity.

In one embodiment, charging parking spots, reservation system and localization systems are provided. Usually, when users drive to destinations, they are unaware of where to park their vehicle. Users may also be unaware of where they may find a charge unit to plug in their vehicles. If a destination is popular restaurant, a busy part of town, or a location where parking is scarce, the chances of finding an open parking spot are low. Moreover, the chances of finding a parking spot with vehicle charging capabilities are lower.

In one embodiment, parking spots are configured as "smart" parking spots. A parking spot is smart, when electronics and software are provided to enable users to access spots for a remote reservations, to assist drivers in finding open spots, to identify spots with vehicle charging capabilities, to assist in finding parking spots close to particular destinations. The parking spots are smart, also because they will assist users to be more efficient with their time, as spots can be made available or reserved for users, whether they need charge or just need to park, or both. The parking spots are also configured to interface with cloud services, so that users can communicate with one or more servers, websites, apps, or the like to receive real-time updates on parking availability and charge availability or both.

In one embodiment, driver can input their destination, destination time, destination length of stay, among other metrics either from a computer, or any networked device. This information is then processed by a charging parking spot reservation system. The system will then search a radius around the user's destination and return a listing of charging parking spots, time of availability closest to the user's arrival time, charge pricing, length of time available, among other information. In one embodiment, the inventory of charging parking spaces may be similar to the inventory of meeting rooms in an office environment. For example, just as an office worker can browse a listing of open meeting rooms and book them in advance, so can user pre-book a parking spot close to where they will be needing to park for their destination (e.g., dinner reservation, event reservation, next to their place of work, next to the next errand location, etc.).

A user can book their charging parking spot in advance and pre-pay not only the parking fee for the amount of time the car will be taking up the space, but also pre-pay the amount of charge time the user will be using.

In one embodiment, the amount of parking stay and the amount of charge time do not have to be the same. For example, a user can book an hour in a charging spot but may only need, e.g. 30 minutes of charge. As an example, the charging parking spot will either stop charging when the 30 minutes are up or when the vehicle is full of charge. If the vehicle charge becomes full before the 30 minutes of charge are up, the user can receive a credit for their next "park and charge" or a refund to the financial institution of their choosing, or simply only charged for charge used. In one example, the remaining time up to the one hour can be charged to the user as a prorated parking fee. Using the example, if the user reserves one hour, and only charges for 30 min, the user will be charged for the 30 min of charge (depending on charge consumed), and 30 min of parking time, as the user will continue to occupy the space.

If the user occupies the space for 30 min past the charge time, the charge unit (CU), in one embodiment, may indicate in-use, so that persons local to the charge unit will not feel that the vehicle is taking up a charge space without actually charging. In accordance with embodiments defined herein, the user may also get notifications regarding charge status and parking status. The notifications can provide a breakdown of the cost associated with charging and parking. The notifications can also show a user's charge account and remaining balances, if the user has a pre-paid or pre-payment authorization account with a charge service.

The reservation of parking time and parking charge time may be done in advance or may be done by "single touch" and/or "voice command." If a user has not pre-booked a charge parking spot, they can do so on-the-fly. For example, a user drives to their intended location but is unaware of the closest park and charge location. Instead of driving around to visually find the park and charge spot, the user can ask the system to find and reserve the closest spot on-the-fly. The user can browse through locations that fit the user's needs, cost, and convenience.

For example, three results may return for park and charge spots near the user. Two of them are only available for 30 minutes; one of them is available for 1 hour. If the user needs one hour, the user can reserve and pre-pay park and charge time for the spot. The charge and park locations may be incentive based. The user may be presented with the latest deals and incentives to park at certain locations. In one embodiment, user may choose to park and charge at the location that offers the best deal or coupon. Once a park and charge spot is reserved and confirmed, either in advance or on-the-fly, the user is sent a confirmation as well as automatically sent navigation and address information which can be integrated or sent to the vehicle to aid in finding the reserved spot.

In some implementations, the park and charge reservation system will have a mobile application component that may alert the driver when their park and/or charge will be expiring as well as provide periodic reminders of their expiration time. If expiration time is approaching, if available, the system will present park time extensions, if not, the user will need to move their vehicle to avoid overage charges and/or fines. These overage charges may be automatically charged to the reservation system user's account or mailed to the address on file.

Park and charge locations that have been reserved by another user will not allow parking or charging to another user. If a user attempts to park or charge at a location already reserved by another user, audio, visual (e.g., sign/indicator) and/or mobile alerts will be sent to the driver to remove their vehicle or face penalties. If an infracting user does not remove their car, a notification will be sent to the original user that reserved the spot with alternatives such as a new list of park and charge locations to transfer to, or refund options.

Once a user has parked at their reserved and paid park and charge location and the user has paid for charge time, the vehicle may be charged. The type of charging method may vary depending on the local system. Some charging systems require cables and plugs, while others can charge wirelessly via a charging mat that may be installed or placed on the ground. In one embodiment, wireless charging can be by way of induction or inductive coupling between inductors disposed on the underside of the vehicle and inductors on the charging mat, pad or structure. In one embodiment, inductive charging systems may include a primary coil in the charger induces a current in a secondary coil in the device being charged, e.g., such as the batter of the electric vehicle. In other embodiments, the wireless charging is enabled with electromagnetic communication devices, which are capable of transferring charge and/or current to a receiving structure of the vehicle. Other charging systems may include resonant inductive coupling, to allow for wider proximity separations for wireless charging, e.g., for taller vehicles. In other embodiments, a retractable conductor or by manual or robotic charging systems may be used.

In one embodiment, the wireless charging pad may be disposed in parking spots, which can function to receive vehicles with or without wireless charging capabilities. If a vehicle with capabilities parks in the spot, and if the vehicle is determined to have an account for charging, the charging will take place automatically without user intervention. For example, a user may have a credit card on account, so that whenever the user parks in a spot having wireless charging services, the charging occurs automatically. The charging can also stop automatically when the vehicle battery is determined to be full. The user is then, using cloud services, provided with an account summary of any or all uses of the one or more charging pads in a network, and billed for such charge automatically. Thus, the pad will have access to a network to transmit data regarding use by various vehicles, to identify vehicles, to provide charge services, and communicate with one or more servers. The pad electronics, software or hardware or servers, can thus communicate with cloud services, the Internet and users and vehicles. The communication can provide information regarding use of the charging pad services, discounts, and other promotions.

In some implementations, the park and charge location may be a smart pad or mat, which has its charging mechanism embedded in the concrete or asphalt. It may also be a modular bolt-on solution, or movable system. In either scenario, the smart park and charge location will be able to communicate and identify the vehicle and user so that the system knows how to dispense charge, how to bill and when to update its records. For instance, if the vehicle is added to the account of a user, the vehicle can be automatically identified to the user's account, for efficient pairing and use, without having to manually enter user account data.

FIG. 23A shows two conventional parking situations. One situation is a conventional parking lot where vehicle parking spaces are arranged in a variety of fashions next to each other. Each parking spot was arranged at the time when the parking lot was constructed. In one embodiment, vehicle-charging pads can be constructed to reside at each parking spot. In another embodiment, vehicle-charging pads can be retrofitted to include overlay or underlay, so that vehicles can move over the pads and interface for wireless charging. In still another embodiment, this arrangement can be applied to conventional street parking locations, so that vehicles can obtain wireless charging via charge pads. As mentioned above, a wireless charging pad is one that can communicate charge wirelessly to a receiving pad or surface of the vehicle (e.g., on the underside, a side, or sides, or top, or inside, and/or combinations of areas of the vehicle), so as to charge one or more batteries of the electric vehicle.

Figure 23B:
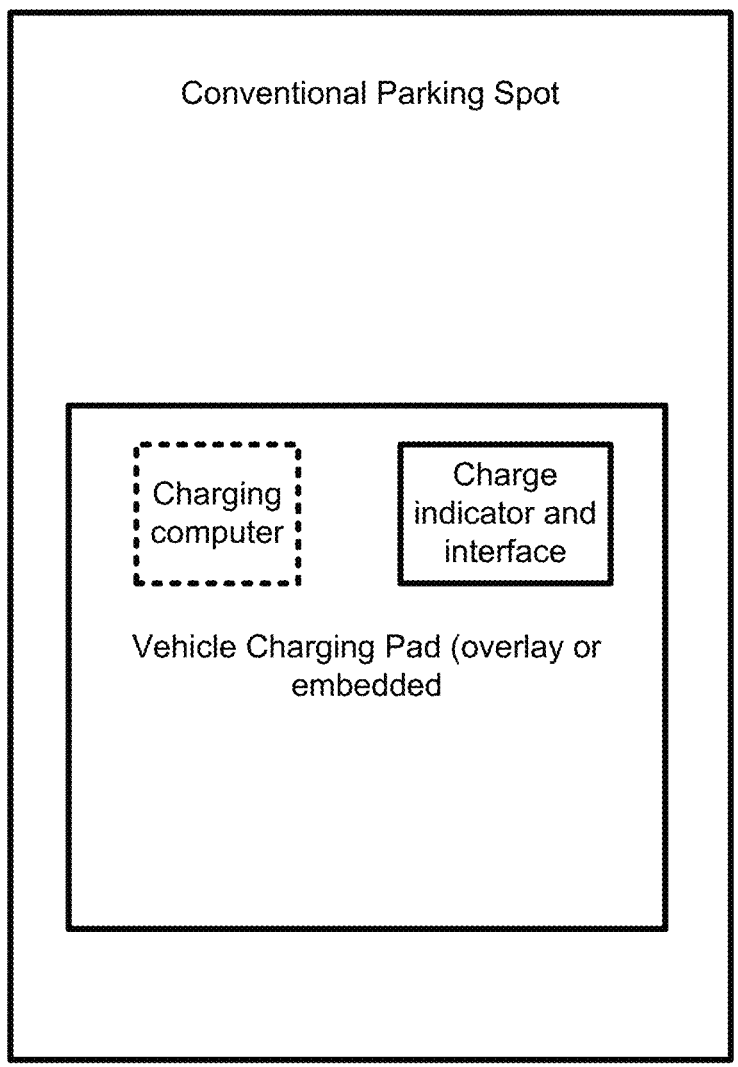

FIG. 23B shows a parking spot that has a vehicle-charging pad. In one embodiment, each charging pad may be associated with a charging computer (e.g., electronics and a current supply (i.e., power). The charge pad may include a charging surface. The charge pad, in one embodiment, may be associated or connected to a display or interface, which allows communication of status. The status may be communicated using a charge indicator and/or interface. In one embodiment, the charge status may be communicated to the vehicle electronics or smartphone of the user, in addition to the interface of the charge pad.

Figure 24:
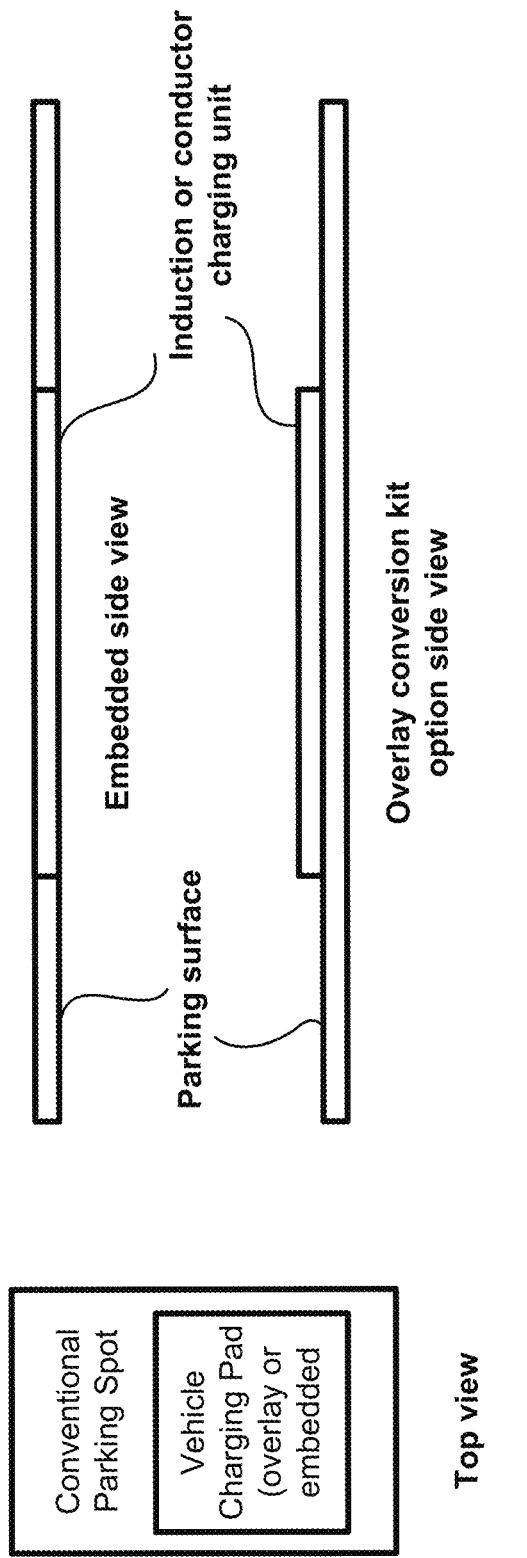
FIG. 24 shows an example conventional parking spot from a top view, showing a vehicle-charging pad in relation to a conventional parking spot and a side view, in accordance with one embodiment.

FIG. 24 shows an example conventional parking spot from a top view, showing a vehicle-charging pad in relation to a conventional parking spot and a side view. The side view shows the relation of the vehicle-charging pad to the conventional parking spot in either an embedded or overlay fashion. A conversion kit may be utilized in order to convert an ordinary conventional parking spot into a parking spot with vehicle charging capabilities. In one embodiment, the charging pad may be coupled to a power supply, and electronics. The electronics can detect when a vehicle has approached and/or the charging plate of the vehicle has been placed over the charging pad.

In one embodiment, the charging pad may include self-aligning mechanisms that may move at least part of the charging pad or surface of the charging pad so it is better aligned with a charging plate or surface of the vehicle, which may not have perfectly aligned over the pad. In one embodiment, a better alignment may enable more efficient or faster throughput of charge transfer from the power supply of the charging pad to the charge plate of the vehicle. As mentioned above, the charging pad may include electronics or a computer that can communicate with cloud services. Cloud services will enable users that wish to use the charging pads to find them when they need charge, reserve use of the charging pads, and allow merchants to provide discounts or promotions or advertisements to users of the charge pads.

Figure 25:
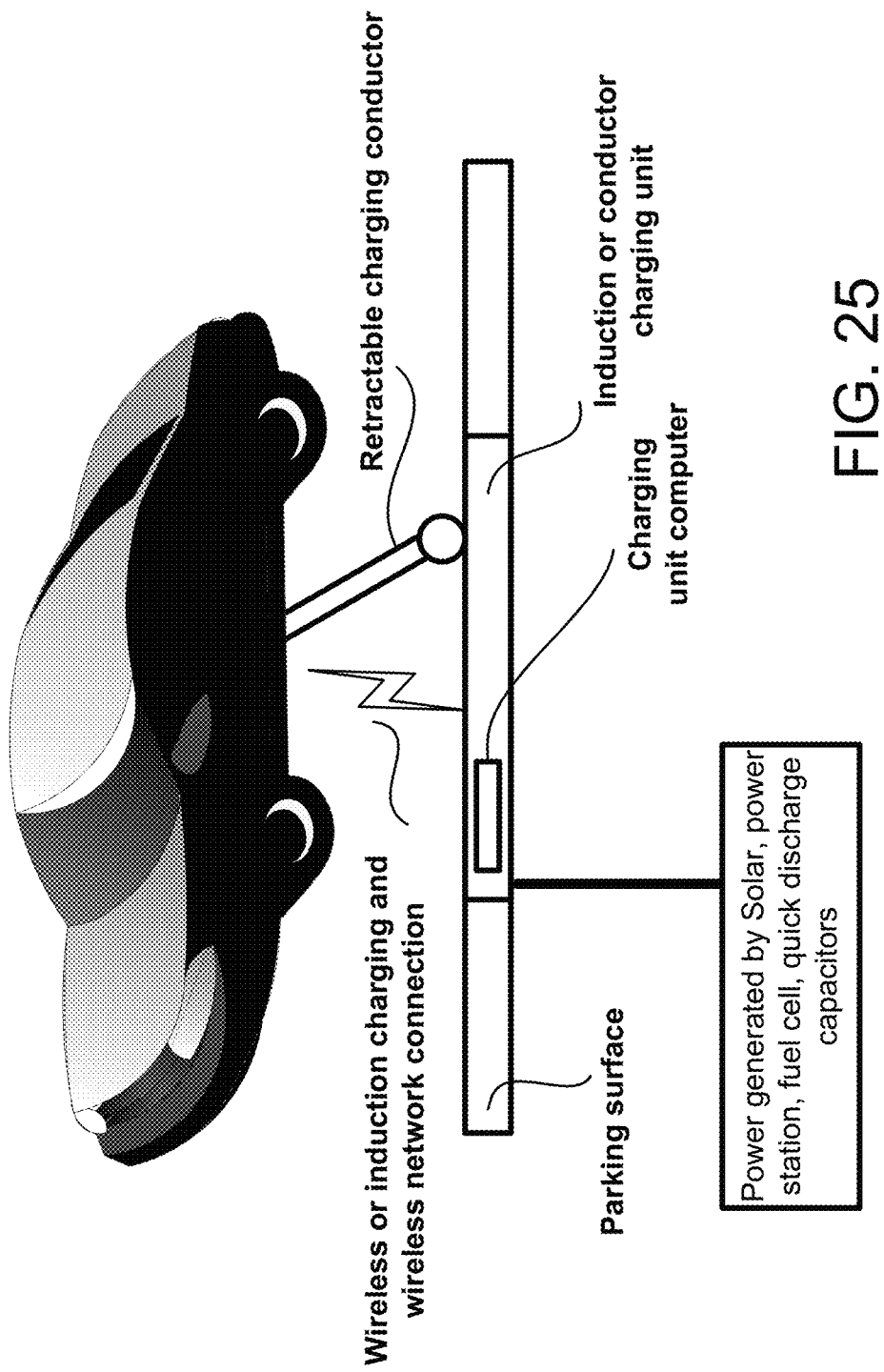
FIG. 25 shows the interaction between a vehicle and a charging pad located on a conventional parking spot, in accordance with one embodiment.

FIG. 25 shows the interaction between a vehicle and a charging pad located on a conventional parking spot. In this embodiment, the vehicle shown is interacting with the vehicle in two possible fashions. One such method is by retractable charging conductor and the second method (or alternate method) is wireless charging, e.g., charging by induction. This vehicle charging pad view also demonstrates one such charging computer location as well as the possible vehicle charging pad power sources.

In one embodiment, when a vehicle arrives at a charging spot, charging can occur automatically, if the vehicle is identified to be a member or paid subscriber of a charge providing service. For example, the vehicle is automatically identified, the vehicle and account are automatically verified and the charge can then be automatically triggered to start transfer to the vehicle. This provides for an intelligent way of charging, which can charge a vehicle over time or allow the vehicle to remain charged over time, e.g., during a day of errands or shopping around town.

That is, the vehicle may stop at several parking spots, and if some have charging pads, each time the vehicle stops, some charge can be transferred automatically to the vehicle, without requiring user input on interfaces of the charge unit (CU), or input to the vehicle user interface, or even without input to an app. Thus, if the vehicle is pre-signed up for the service, the vehicle can take advantage of getting charge each time it parks in various parking slots that may have charging pads that are part of the network of charging pads or CUs. In some embodiments, a user can place conditions on when to get charge in advance. For example, the user may not want to purchase charge from certain charge providers. Some charge providers may be too slow or too old of a system, or provide high rates.

In still further embodiments, logic can be provided to allow or automatically get charge from charging pads when the charge rate/cost is below some level (e.g., S/charge unit). If the charge is higher than that charge level or rate or cost, the system will disable automatic charging. Therefore, filters are provided to enable the user to apply logic of when charge should be transferred to the vehicle. The logic can be based on various or one or more conditions of "when this is true" then "charge automatically." Or, "when A and B are true", then "charge automatically only at charge units of brand X."

In one implementations, the logic can be provided by a user through a graphical user interface that is easy to understand. Thus, the user can place custom conditions on when to get automatic charge, when it is not desired to get automatic charge, and the like. Still further, adding or placing automatic charge conditions can be used for learning of the types of conditions the user likes or dislikes. The system or cloud system can use these inputs as part of a learning algorithm to provide recommendations. The recommendations can be regarding more setting for selecting when to obtain charge, or recommendations regarding specific conditions or sets of conditions, based on similarities or probabilities.

Vehicle charging pads can be powered by any of the following sources or a combination of the following sources, including but not limited to, solar power, a power station, a power grid, a fuel cell, quick discharge capacitors, among others. In solar technology embodiments, it is envisioned that it is possible for some Charge Unit (CU) to be supplied with all or part solar power, to reduce the strain on the conventional power utility grid.

Figure 26:
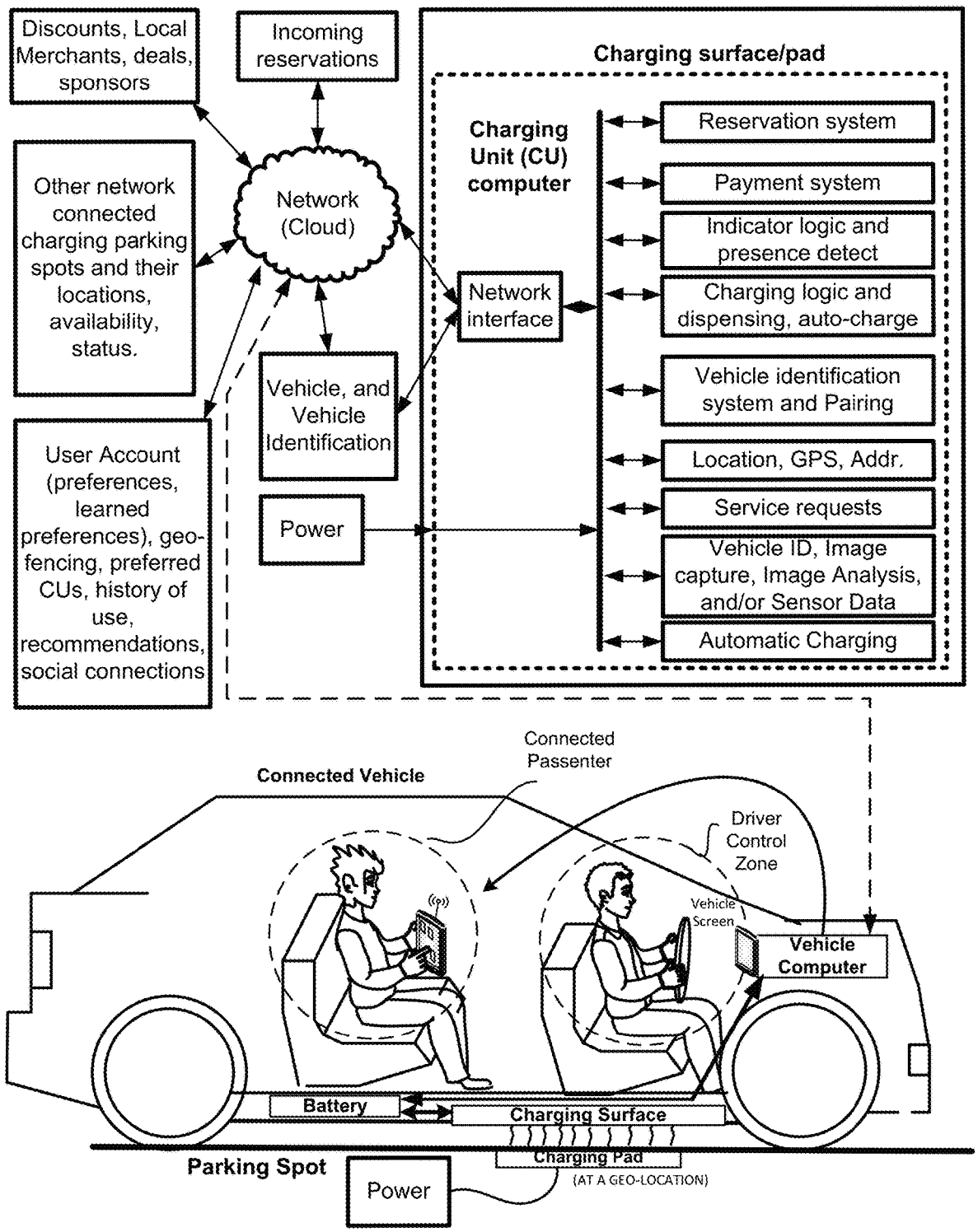
FIGS. 26-27 show vehicle charging pad embodiment having the ability to interact via a network interface, in accordance with one embodiment.

FIG. 26 shows one vehicle charging pad embodiment having the ability to interact via a network interface with other vehicle charging pads or vehicle charging parking spots, reservation systems, payment systems, charge indicator interfaces and logic, charging and dispensing logic, vehicle identification systems, location and GPS information, service requests, cloud services, among others.

In one embodiment, the vehicle that may arrive to a CU, and park over a charge pad, can be identified in a number of ways. One way is for the charge pad or electronics near the charge pad to communicate with a wireless system of the vehicle. The wireless system can communicate a code, a vehicle ID, and identifier, a serial number, an encrypted message, a token, or some of other data that can be used for identification. In a like manner, the pad or electronics can receive the data wirelessly and perform a lookup on one or more services, to determine if the vehicle is associated with a user account that has been pre-registered to use the charge pad. If the vehicle is not pre-registered, the user may be provided with the option to register or use the services in guest mode (e.g., by providing information and billing data). In one embodiment, the wireless communication can be by way of a WiFi signal, a Bluetooth signal, an NFC signal, a shore-wave radio signal, or a type of radio link. In one embodiment, pairing and/or a link may be established (e.g., for a session), in case the vehicle and the charge pad (or electronics associated on or near the charge pad) needed to communicate data during a period of time.

In some embodiments, identification of the vehicle and/or that the vehicle is arriving at a parking spot having a charging spot and/or CU, can be carried out using various ways. Such ways can include using a camera or cameras located proximate to the parking spot. The cameras can identify a vehicle by capturing images of the vehicle and identifying and/or tracking a license plate. The image data of the license plate can be read and identified to determine the numbers and/or letters. Once the alphanumeric data of the license plate is identified, it can be communicated to an online server to perform a lookup. The lookup can be a request to a server or service or API, to identify the vehicle. In some cases, the lookup can be to a public agency or to a private firm or entity, which can have the plate data pre-stored for future lookup to identify the user and/or user account. In another embodiment, the vehicle can be detected entering a parking spot using sensors.

The sensors can be, for example, installed in the ground or surface over which the vehicle will reside. The sensors can be of various types. Some sensors can be weight sensors to determine when a vehicle is physically over at least part of the parking spot. Some sensors can also be motion sensors located in, around or next to a parking spot. The motion sensors can determine movement in or around the parking spot, to determine when a vehicle arrives. In other embodiments, the sensors can include infrared sensors, which can be used to identify when an object having a shape or size of a vehicle is located in the spot. Other sensors can include accelerometers or gyroscopes that may be connected or placed on or near a surface of the parking spot, such that motion of a vehicle entering the parking spot can cause the motion, which can be detected. Audio sensors can also be used, to determine when sound has entered a zone of the parking spot. In some embodiments, combination of one or more of the sensors can be used, such that multiple points of data can be used to determine when a vehicle is present or is approaching a parking spot. Other sensors can also be used, such that the sensors can identify presence.

Once the vehicle is identified to be present, the vehicle can be identified. As noted above, the identification can occur using communication between the vehicle and the electronics of the CU or a smart device of the user (e.g., who may be in the vehicle) and the electronics of the CU. The communication can be used, for example, to establish a pairing, e.g., after the vehicle has been identified to have arrived or is approaching the parking spot and/or garage, and/or structure, and/or parking lot, and/or geo-location or geo-fence area.

In some embodiments, a vehicle can be identified using a tracking device of the vehicle. For example, a vehicle can be equipped or can be configured with a plug-in device (e.g., to the vehicle data port), which enables vehicle tracking. Thus, if the vehicle is being tracked, e.g., using GPS and/or other tracking sensors or system, the plug-in device can be used to determine that the vehicle is positioned over a parking spot. The plug-in device can also communication with a website or server. Thus, multiple devices, system or electrics can communicate with a server or servers of cloud systems, so as to identify vehicle locations. Once the vehicle has been identified, the CU can automatically provide charge to the vehicle, without further user input. If the user settings dictate that user approval is required or limitation on which CUs provide automatic charging, that information can be provided to the user's device, the vehicle electronics, the user's smartphone, and/or the user's smart watch.

In some embodiments, data collected by plug-in devices and/or stored on servers, and/or stored in cloud systems based on data obtained from a vehicle and/or a device associated with a user account (e.g., user device, smartphone, smart watch, etc.), can be communicated to CUs. This information can be used by a CU to provide various charging rates. For example, a user that is a frequent user of a CU, or a CU supplier, or a CU location, can be provided with different rates, e.g., as a frequent purchaser or buyer of charge at that location. Thus, loyalty plans can be automatically triggered and provided to users of CUs, in an automatic form.

In one embodiment, the plug-in device is useful for vehicles that are not already equipped with connected technologies. In some cases, even if a vehicle is equipped with connected technologies, the plug-in device can provide additional data. In such configurations, the plug-in device can provide data that is in supplemental to the electronics of the connected vehicle or can provide different data.

In one embodiment, the charging unit computer may control the operation of the charging surface or pad and it's systems and interfaces. In this example, the vehicle charging spot has the ability to take incoming charge/parking reservations remotely via network, send responses back to the reservation system via network and communicate in an asynchronous fashion.

Figure 27:
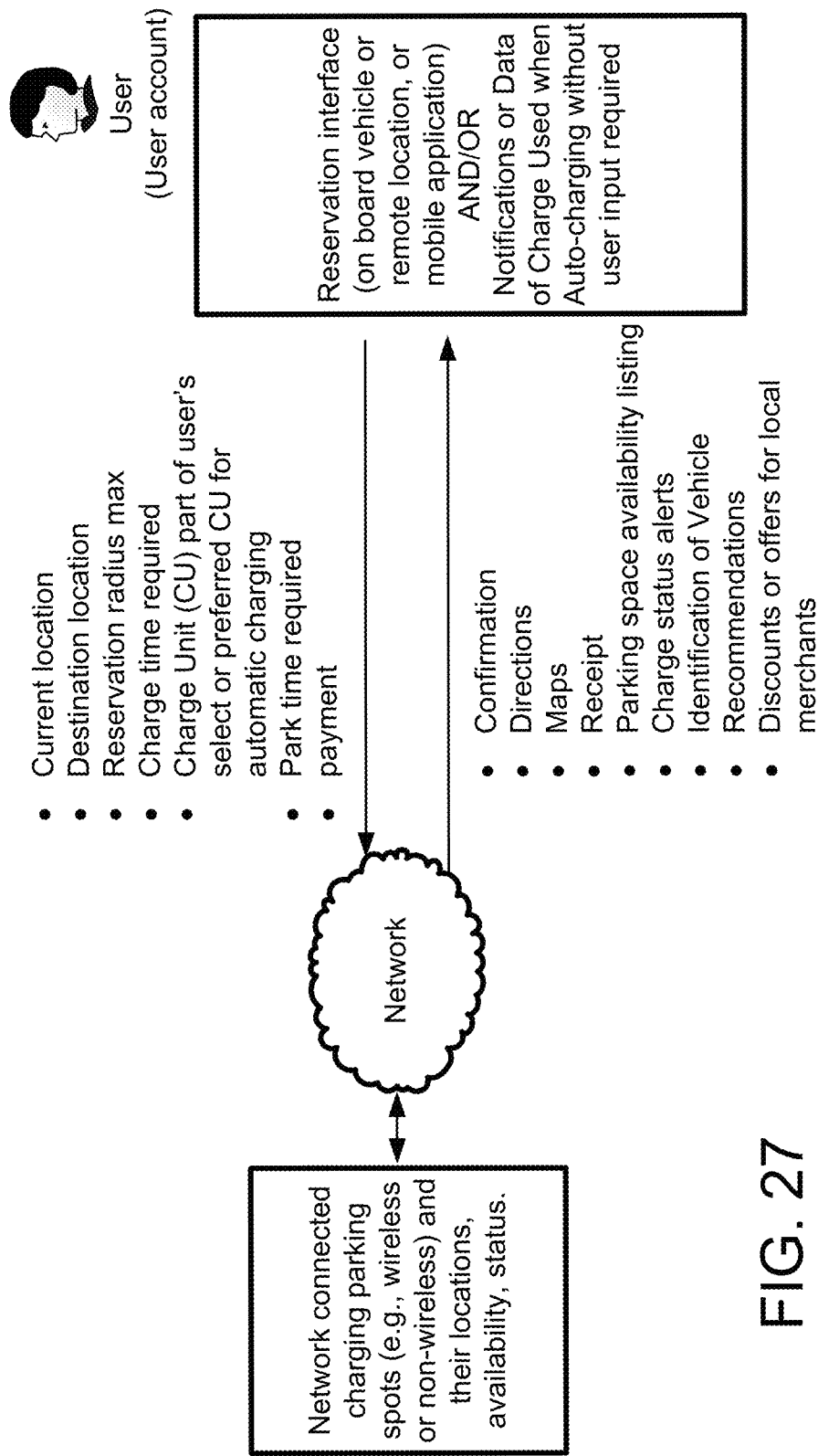

FIG. 27 shows one example scenario where a user, through a reservation interface (on board or remotely via any networked connected device) can send their current location, destination location, reservation search radius max, charge time required, park time required, payment information among other metrics to a park and charge reservation system.

The reservation system queries available park and charge locations using the criteria provided by the user and responds to the user with confirmations, directions, maps, receipts, parking space availability listings and maps, discounts, deals, credits, ads, charge status alerts, among other metrics, data and/or indicators. Accordingly, cloud services will provide access to charging pads/mats in a similar way as a charge unit (CU). For more information on wireless charging pads associated technology, reference may be made to U.S. Pat. No. 5,498,948 issued Mar. 12, 1996 to Bruni et al., and U.S. Pat. No. 8,008,888 issued Aug. 30, 2011 to Oyobe et al., each of which are incorporated herein by reference.

In one embodiment, a charge pad/mat is viewed as just another type of CU, and services provided to users for finding, use, discounts, access, user accounts, cloud services, and the like for conventional plug CUs applies to wireless charge pad CUs.

In some embodiments, a method can provide one or more user interfaces to enable a user to make settings, inputs or commands to a charging application or interface. For example, the automatic charging system that detects when a vehicle arrives in a parking spot with a wireless charging pad can look up preferences. The preferences may be to automatically start charging every time the vehicle arrives at a slot with a wireless charging pad and the pad is part of a network of CUs that the user has an authorized user account.

In some embodiments, the user may select to only enable automatic charging when the vehicle parks over certain types of wireless charging pads, pads made by specific manufacturers, or pads that are services by particular companies or charge providing entities. In some embodiments, a user can select a geo-fence, to define where automatic charging is allowed and where automatic charging is not allowed.

In some embodiments, a user can circle or outline some area on a map to identify where the user wishes to use charge pads. In some cases, the user can identify where not to use charge pads, e.g., if rates are too high a particular times, or when service is poor or when the charging rate or speed is too slow. Thus, rating information can be populated or shared to other sites, so that richer data can be crowd-sourced and utilized to provide recommendations of where to find charge pads, charge pads that work best, charge pads that don't work, broken charge pads, or service requests to charge pad providers.

In still other embodiments, applications (e.g., Apps) can be defined to provide access to the user's account, e.g., via any device and/or the computing system of the vehicle and displays of the vehicle. In still more embodiments, users may be able to notify friends of a social network where charging pads are most useful, faster in charging, provide best discounts, or are less busy or times of less use. The social data can be by way of any social network, a text message, a group of users, post to a news feed, or the like.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smart phones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing. Other methods can include providing Wi-Fi communication to local Wi-Fi transmitters and receivers, which communicate with cloud processing 120. Other types of communication can include radio frequency communication, such as Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

In one embodiment, at a remote location, a user is able to access a user interface for an application, which provides users access to their user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard etc.

In one embodiment, vehicles can maintain information regarding where they are, where they are heading and their destination maintained which is maintained by GPS and navigation systems on board. The information collected and maintained by every vehicle may be mutually exclusive, meaning that only each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing provide data concerning the locations of the vehicles and activities that occurred to the vehicles when at particular locations. The cloud processing can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most important information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another. This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

In other embodiments, examples are described with reference to methods and systems for providing auxiliary charging mechanisms that can be integrated or coupled to a vehicle, to supplement the main battery of a vehicle. The auxiliary charging mechanism can be in the form of an auxiliary battery compartment that can receive a plurality of charged batteries. The auxiliary battery compartment can be charged without the vehicle, and can be installed or placed in the vehicle to provide supplemental charge to the vehicles main battery. Thus, if the main battery becomes drained/used, the auxiliary battery compartment, having a plurality of charged batteries, can resume providing charge to the vehicle.

In one embodiment, the auxiliary battery compartment is configured to hold a plurality of smaller batteries, referred to herein as "volt bars." A volt bar should also be interchangeably viewed to be a "charge unit." The charge unit is a physical structure that holds charge, as does a battery. A charge unit can also be a fraction of charge, which may be contained in a physical structure.

Broadly speaking, a volt bar is a battery that can be inserted into an auxiliary battery carrier. The auxiliary battery carrier, or compartment, can be lifted by human and placed into a vehicle, such as the trunk of the vehicle. The auxiliary charging carrier can then be removed from the vehicle to provide charge to the volt bars contained within the auxiliary battery carrier. For instance, owners of electric vehicles can purchase an auxiliary battery carrier and fill the auxiliary battery carrier with a plurality of volt bars.

In one embodiment, the user will charge all of the volt bars by charging the auxiliary battery carrier before the auxiliary battery carrier is placed into the vehicle. In one embodiment, the auxiliary battery carrier, and its volt bars can be charged utilizing the charge provided from the main battery. For instance, if the vehicle is charged overnight utilizing the primary charging receptacle, and the auxiliary battery carrier is connected to the vehicle (containing volt bars), the volt bars in the auxiliary battery carrier will also be charged. In one embodiment, once the main battery and the vehicle are charged, the charge will then be transferred to the volt bars contained in the auxiliary battery carrier. As such, charging the vehicle will accomplish the task of charging the main battery as well as the auxiliary battery carrier that includes a plurality of volt bars. In another embodiment, the volt bars can be directly inserted into slots defined on the vehicle itself. In this example, manufacturers will design compartments that can accept one or more volt bars, thus eliminating the need for an auxiliary batter carrier. The compartments can be on the side of a vehicle with or without a door, in the trunk, in the passenger compartment, etc. So long as volt bars can be accepted into a receptacle and the volt bar(s) can provide charge to the vehicle or axillary charge to the main battery, the placement of the volt bar(s) is, in one embodiment, a design configuration.

In one embodiment, the volt bars utilized in the auxiliary battery carrier can be replaced with fresh batteries purchased while the user of the electric vehicle is on a trip or a distance from the user's home base. For instance, volt bars can be sold utilizing a kiosk system. The kiosk system would, in one embodiment, store available volt bars that can be purchased by drivers of electric vehicles while away from their home base. For example, the kiosk system will provide one or a plurality of receptacles for receiving volt bars that are depleted in charge, and dispense charged volt bars to users desiring to extend the range of their trip. The kiosk, in one embodiment, will be coupled to a power source that can then recharge the volt bars and make them available to other users that trade in their charge de-pleaded volt bars.

If the user wishes to purchase volt bar without first returning a charged the depleted volt bar, the user can be charged a separate fee that is higher than if the user had returned a depleted volt bar. The kiosk system would preferably be connected to the Internet so that users of electric vehicles could access an application that would identify locations of kiosk systems with available volt bars. In one embodiment, the application would include software that communicates with an application sitting in a central hub that manages all of the kiosk systems deployed in the field. The kiosk systems will also report the status of available volt bars, volt bars returned and in charging mode, available charging slots, inventory of volt bars, discounts available at particular kiosk systems, and potential damage to volt bars that have been returned. By compiling this information, the kiosk system can interface with the central hub, which provides information to users accessing an Internet application (mobile application), so that users can locate the closest kiosk system or the closest kiosk system having discounts.

In one embodiment, the discounts provided by the specific kiosk systems can be programmed based on the desire to sell more volt bars at certain kiosk systems with excess inventory, or to encourage virtual routing of volt bars throughout geographic regions. For example, if trends are detected by software operating on the central hub that volt bars are migrating from East to West, a depleted inventory may be found in the East. To encourage load balancing of inventory, discounts can be provided in the West, which would then cause migration of volt bars toward the east. In one embodiment, each of the kiosk systems would be enabled with software that communicates with the central hub, and the software would be utilized to provide the most efficient information regarding inventory, and operational statistics of each kiosk system deployed throughout a geographic region (e.g., geo-location)

In another embodiment, each kiosk system may be configured with an interface that receives payment data from the users. Example payment receipts may include credit card swiping interfaces, touchscreens for facilitating Internet payment options (PayPal), coupon verification, and communication of deals with friends through a social networking application. These applications can be facilitated by software operating at the kiosk station, or by software executing on the users mobile device, or a combination of both. In still another embodiment, each of the volt bars that are installed in the various kiosk stations will be tracked using tracking identifiers. In one embodiment, without limitation, the tracking can be facilitated using RFID tags. The RFID tags can be tracked as users purchase, return, and charge the depleted volt bars at the various kiosk stations.

Additionally, the volt bars will include memory for storing information regarding number of charges, the health of the battery cells, the current charging levels, and other information. Additionally, the volt bars can store information regarding the various kiosk stations that the volt bars have been previously been installed in, or received from. All of this information can be obtained by the software running at the kiosk station, and communicated to the central hub. The central hub can therefore use this information to monitor the health of the various volt bars and can inject new volt bars into the system at various locations when it is detected that the inventory is reaching its end of life.

In still another embodiment, the central hub can direct maintenance vehicles to remove damaged volt bars from kiosks, or insert new volt bars at certain kiosk locations. Because the central hub will know the frequency of volt bar utilization at each of the kiosk locations, the central hub can dispatch maintenance vehicles and personnel to the most optimal location in the network of kiosk stations.

In another embodiment, a system for providing auxiliary charge to a main battery of an electric vehicles is provided. The system includes an auxiliary battery for holding a plurality of charge units, the auxiliary battery being connectable to the main battery of the electric vehicle, the plurality of charge units being rechargeable and being replaceable from within the auxiliary battery, such that replacing particular ones of the plurality of charge units with charge units with more charge increases a total charge of the auxiliary battery. Also provided is a kiosk for storing a plurality of charge units, the kiosk having, (i) slots for storing and recharging the plurality of charge units; (ii) control systems for communicating over a network, the control system includes logic for identifying inventory of charging units in the kiosk and logic for processing payments and fee adjustments for charge units provided or received in the slots of the kiosk. The system also includes a display for providing an interface for enabling transactions to provide or receive charge units to customers. The system further provides a central processing center that communicates with, (i) a plurality of said kiosk over a network, the central processing center configured to provide for centralized rate changes to prices to charge for the charge units at each of the plurality of kiosks, wherein changing the price of the charge units is specific to each of the kiosks and is based on a plurality of metrics, including availability at each kiosk and discounts, and (ii) a plurality of vehicles, the plurality of vehicles being provided with access to availability information of charge units at each of said kiosks, the availability information being custom provided to the plurality of vehicles based on geo-location.

Another embodiment is for a method for providing charge options to drivers of electric vehicles. The method includes receiving data concerning charge providing availability from charge locations, receiving a request from processing logic of an electric vehicle, the request identifying a desire to obtain charge, and determining a current location of the electric vehicle. The method further includes determining identification of charge locations in proximity to the electric vehicle and determining any sponsored rewards offered by the charge locations. The method communicates to the electric vehicle a path to one of the charge locations, the path identifying a sponsored reward offered at the charge location for the path.

In one embodiment, merchants are considered proximate or in close proximity to a CU when the distance is within walking distance. Walking distance can be a location that is less than one mile. In another example, walking distance can be a location that is less than 0.25 miles. In another example, close proximity may be when the CU is within a city block, or in a same parking lot, or in a same building complex, or in a shared parking lot of one or more stores, or in the same block, or when the CU is at a designated parking lot or spots of a merchant or group of merchants. In general, close proximity is a measurable parameter, that is within walking distance, or the walking distance is not further that a time needed to charge a vehicle. In this way, a human user can walk to the merchant while the electric vehicle is being charged at the CU. In one embodiment, the proximity can be a set value, data, a number, a range, a distance, a radius, a parking lot, a drive way, a number of parking slots. In one example, the proximity can be defined by the merchant that provides the discount. For example, a merchant can define the proximity be 100 feet, e.g., between the CU and the merchant location. The proximity value can be dynamically set by a merchant, can be set by a service, or can be a combination thereof.

Yet another embodiment, a computer processed method for providing charge options to drivers of electric vehicles is provided. The electric vehicles have wireless access to a computer network. The method includes receiving data concerning charge providing availability from charge locations and receiving data concerning sponsored rewards offered by the charge locations and rules for offering the sponsored rewards. The method receives a request from processing logic of an electric vehicle, and the request identifies a desire to obtain charge in route between a current location of the vehicle and a destination location. The method includes generating a plurality of paths that can be traversed by the electric vehicle between the current location and the destination location, where each of the paths identify possible charge locations at which the electric vehicle can be charged. Each of the possible charge locations identifying any sponsored rewards offered if the electric vehicle obtains charge at the possible charge locations. The method includes forwarding the plurality of paths as options to the user of the electric vehicle via a user interface. The sponsored rewards are identified to the user to enable tradeoffs between length of path and reward obtained.

Methods and systems for providing charge options to drivers of electric vehicles are provided. One example method includes receiving data concerning charge providing availability from charge locations and receiving a request from processing logic of an electric vehicle, the request identifying a desire to obtain charge. The method includes determining a current location of the electric vehicle and determining identification of charge locations in proximity to the electric vehicle. The method further includes determining any sponsored rewards offered by the charge locations and communicating to the electric vehicle a path to one of the charge locations, where the path is identified with a sponsored reward offered at the charge location if the path is selected and charge is obtained. The method can be processed by a server and paths are communicated to vehicles to alert drivers of the electric vehicles of rewards or discounts if charge is obtained from certain locations. Other embodiments that compliment sponsored paths for obtaining charge are described below, and relate to electric vehicle charging and reduction of range anxiety.

Embodiments are also described for methods and systems for providing auxiliary charging mechanisms that can be integrated or coupled to a vehicle, to supplement the main battery of a vehicle. The auxiliary charging mechanism can be in the form of an auxiliary battery compartment that can receive a plurality of charged batteries. The auxiliary battery compartment can be charged with or without the vehicle, and can be installed or placed in the vehicle to provide supplemental charge to the vehicles main battery. Thus, if the main battery becomes depleted, the auxiliary battery compartment, having a plurality of charged batteries, can resume providing charge to the vehicle.

In other embodiments, the auxiliary battery can be one compartment that has multiple smaller compartments for receiving volt bars (charging units), or other battery type charging devices. Further, the auxiliary battery is shown interconnected to the main battery of the vehicle, or to a battery distribution or charge distribution-handling unit. In other embodiments, the auxiliary battery can be inserted into side panels of the vehicle, in the front compartment of the vehicle, the floorboard of the vehicle, the site support structure of the vehicle, etc.

Cloud processing technology is also provided, which provides processing resources to connected vehicles through a distributed network. In one embodiment, the cloud processing can communicate with various charging stations using Internet connections, where charge Station metrics can be uploaded to the cloud processing system. The charge Station metrics can include availability of charge pumps, charge handles, charge plugs, charge mats (for wireless chagrining), volt bars, or other charge providing facilities.

Examples of such metrics can include the number of charge pumps available at particular period of time, historical availability times of the charge pumps, typical charge time estimates at particular charging stations, prices associated with the charge at the particular charging stations, feedback from customers through social networks, concerning the charging stations, and the like. The cloud processing can then process the charge Station status, traffic information associated with locations around or between charging stations and a user's current location, and provide specific suggested routes. The route generator can provide guided routes to the various charging stations (e.g., charge locations), based on the users immediate needs, desire for discounts, sponsored rewards, or the amount of time it will take to obtain access to a charge pump at a particular point in time. Broadly speaking, a discount is a reward and a reward is a discount, and a sponsored reward is a discount that is at least partially paid by another party for a the benefit of the recipient of the reward.

The driver location processor can communicate the information concerning drivers to the cloud processing logic, so as to provide the most effective information concerning charge availability to the various drivers. For example, users in their particular vehicles may have a connected display or a portable device having access to the Internet. Based on the users' location and charging needs, (and optionally the destination) the user can be provided with route options (e.g., one or more optional paths). The route options can be, for example, the fastest and most available charge Station (or charge providing devices) to the users current location, the cheapest charge available at a particular point in time, or information regarding charge prices for a particular future point in time.

Once the user selects a route option, the route generator can provide information concerning the charging station, and can also prepay or book a charging station slot. A charging station slot can include, for example a parking spot in front of a charging station. The charging station slot can be reserved if the user decides to prepay for the charging station, as a convenience. For example, if charging slots at a particular charge Station appear to be heavily used, a user can pre-reserve a charging slots ahead of time, so that when the user arrives at the charging station, the charging slot will be immediately available. This could be considered a convenience fee associated with pre-reserving of a charging slot, along a particular route. In another embodiment, the charging station can provide incentives to users to come to the particular charging station.

In one embodiment, when a vehicle arrives at a charging spot, the vehicle can be automatically identified. The identification of the electric vehicle occurs in response to a communication system associated with charging pad negotiating a link (e.g., WiFi link, Bluetooth link, or a radio link) with a communication system of the electric vehicle. In one example, negotiating the link occurs when the electric vehicle is within a charging distance to the charge pad. The charging distance may be, for example, within a 10 feet separation of the vehicle and the charging pad, or within 5 feet separation of the vehicle and the charging pad, or within 2 feet separation of the vehicle and the charging pad, or when the charging pad is within 2 feet of the charge capturing unit of the vehicle (e.g., the charge receiving plate or structure located under the vehicle). In one implementation, it is desired that the vehicle start communicating with the charging pad, a computer of the charging pad, a computer near the charging pad, or the like, so that the vehicle can get identified quickly, and charge can start to occur soon after the vehicle comes to rest, if the vehicle is associated with a user account that is pre-authorized to receive charge from the network of charging units (CUs), such as the current charging pad. In one embodiment, charge is transferred to the battery of the electric vehicle automatically after the link is established and a status of the user account is validated.

For example, if the user prepays for charge at a particular charging station, the charging station can provide a discount on the charge provided. For example, if the charging station wishes to fill a plurality a charging slots during a particular slow time, the charging station can communicate with the cloud processing and publish availability of its charging stations per particular period of time. A database associated with cloud processing will hold this information so it can be dynamically updated and accessed in real-time by users to fill their charging needs of their electric vehicles. During that particular period of time, the charging station can offer discounts or rewards to users so that drivers can decide to visit the charging station instead of another charging station. Still further, charging stations can offer discounts for users to use the particular charging station, and the discounts can be offered by more than one party or entity. For instance, if the charging stations are located near a particular business, that particular business can sponsor discounts or rewards at the charging station to drive traffic to or near that particular business. When users are charging their vehicles at the particular station near the particular business, users can spend their time at the particular business while their vehicle is being charged.

Potentially, the owners of the particular business that sponsored the discounts can increase traffic to their business and increase sales. In another embodiment, the owners of the particular business can offer discounts to their business products or services, if the business products or services or located near or beside the charging station. As will be described below, other embodiments can include having charging station pumps or handles or plugs, located in nontraditional charging station configurations. For example, charging plugs can be installed at various nontraditional locations, such as parking lots of retail stores. Other examples locations can include, without limitation, parks, city streets, parking garages, post offices, government areas, schools, offices complexes or campuses, coffee shops, malls, strip malls, box store parking lots, beach parking, homes, public roads, etc. If a large retail store has a large parking lot, a portion of that parking lot can be dedicated for charging plugs, which can be used by customers while the customers shop at the retail location. In such a situation, the owners of the retail store that have charging plugs assigned to particular parking spots, can publish availability of those charging plugs through the cloud processing network.

The cloud-processing network can then publish availability and prices for users that may be driving around, or may be passing by the retail store along a particular path or route. In some embodiments, the retail store can offer significant discounts for charge, if users charge their vehicles at the charging plugs of the retail store. While the users charge their vehicles, the users may visit the retail store and purchase goods or services, which is a reward for the retailer that is offering the discount for the charge. In still another embodiment, retail stores having charge plugs can advertise availability of the charge plugs (and parking spots) in real time, and provide discounts or deals to users that may wish to charge at the particular retail location.

The discounts can be for the goods and services of the retail store, or simple discounts on the charge provided by the charge plugs of the retail store. As noted above, one embodiment would allow the parking spots having the charge plugs to be reserved and advance, to provide additional convenience to users. In such a configuration, the parking spots can include mechanical barriers that lift and close to allow vehicles to come into and leave the particular parking spots. Thus if a parking spot is reserved, the mechanical barrier can remain closed until the vehicle having the code can communicate access to lift the mechanical barrier so that charging can commence immediately upon arriving at the reserved parking spot. In another embodiment, the charging station or plug can include a monitor or display that indicates whether or not the charging plug is reserved.

If the charging plug is reserved, no other user can park in front of the parking spot, or else received a ticket or fine for parking in a parking spot that's been reserved. The parking spot reservation for charge can be made in advance; such as while user is driving around smart phone, or an integrated device of the vehicle that has access to the Internet makes looking for charge and the reservation. The transaction can also allow a user that is searching for charge to pre-pay for the charge using a graphical user interface or other exchange mechanism, associated with the route and reservation of a particular charge station or slot. In some embodiments, the charge stations or plugs can be placed in shared parking lots or locations where multiple retail outlets reside.

In such a case, multiple retailers can provide discounts to users to come and use the charging stations located at the retailer's locations. These discounts can then be published to the cloud processing logic. These discounts can also be published dynamically at the request of the provider of the charge, using an Internet portal that allows the user to participate in a network of charge stations that provide discounts. In such embodiments, the discounts can be provided by multiple retailers for their goods and services, and the plug can be located in the shared parking lot. Having this information, the cloud processing can communicate with a route generator to generate various routes (e.g., paths) that are optimized to the user's desired outcome.

The optimization can be to route a user for charge along a plurality of charge stations or plugs that provide discounts. If this is the goal of the user, the route may be longer than other routes, but the discounts may be greater. Such routes may be viewed as a sponsored path that requires a user to traverse a particular route in order to obtain charge for their vehicle. The sponsored routes can change dynamically over time, as sponsors decide to add or remove discounts. Thus, a user that finds a good path may wish to buy now, to avoid losing the discount. If a particular charge station or chart plug has a lot of customers during a particular period to time, the discounts may drop dynamically. If the charge plug for station experiences low activity, the discounts may be increased dynamically. The dynamic adjustment of discounts can occur based on a preset number of rules (e.g., what discount, where offered, when offered, how long it lasts, incentives for fast buy, logic for combining discounts, logic for sharing costs of discounts with others, logic for reducing the cost of the charge, etc.), as set by the provider the charge and/or the sponsor.

The cost for the charge can also be provided with a green rating, which signifies how efficient the charge station is in supplying charge, and the location and source of the charge provided by the charging station. If the charging station obtains charge from wind power, the green rating would be high. If the charge station receives its charge from fossil fuels, the green rating may be lower. If the charging station receives is charge from a variety of different sources, whether solar, wind, or fossil fuel, the green rating can be adjusted. This metric information can then be provided to the cloud processing to allow users of electric vehicles to decide whether or not to visit a particular charge station or charge plug.

In some embodiments, the price of the charge may be more expensive if the green rating is very high, but the charge value to the user may be high, if the user wishes to obtain a very high green rating, and a lower carbon footprint.

For example if the user wishes to replace the vehicle, the user can simply click a button, select an icon, touch a screen, speak a command, gesture an input, etc., to figure out what his vehicle value is, the cost of a replacement vehicle, and the total cost after exchange. This information can be useful to the user in deciding whether or not to trade in the vehicle or remain with the current vehicle and make investments in repairs. As shown, the data exchange between vehicles and the vehicles and the cloud processing can be extensive, but such information can be made available to drivers of those vehicles to make informed decisions.

The drivers can also be provided with information of the duration of the discount, so that drivers can obtain the discount if they have the time to traversed the path, or avoid the path if the discount will not be present when the driver arrives at that application. In another embodiment, the logic in the vehicle or the processing system in the cloud processing can determine whether or not the user would be able to arrive at each of the charging stations or plugs to receive the sponsor discounts. This analysis can include, for example, reviewing traffic patterns, travel speeds and estimates to traverse the different distances, time of day, etc.

In some embodiments, the discounts are provided by a combination of the charge station and retail shops nearby. In other embodiments, the retail shops and plugs/charge providers can provide combined packages of discounts, which could drive users to their location. Accordingly, it should be understood that the dynamic generation of paths could be sponsored, such that the user can be provided with identification of charging locations along a particular path, and the discounts that may be provided along those particular paths.

Again, the information displayed to the user can be displayed in the vehicle's display screen or can be displayed on the users display device (e.g. smart phone, computer, tablet, etc.).

Broadly speaking and without limitation, obtaining charge will include plugging the vehicle into a charging receptacle so as to charge the native battery of the vehicle. In another embodiment, obtaining charge can also include refilling on volt bars to replenish volt bars that have been used during the vehicle usage. In other embodiments, charge can be transferred to a vehicle wirelessly (e.g., without plugging in an outlet or receptacle). Examples can include a transfer surface that the vehicle parts over, and the charge can be transferred wirelessly to the vehicle via conductors on the underside of the vehicle. The vehicle can simply part in the slot and once payment is made; the charge can start to flow capacitively or wirelessly to the electric vehicle.

As can be appreciated, the sponsored path process can provide a quick and efficient manner for allowing the user to identify their desired endpoint, and provide options for traversing a path to that and point. Along that endpoint, the user can be provided with discounts for charge by sponsors, which can influence or drive people to their charging outlets. The discounts can also be provided in a hybrid manner, such as providing discounts for the charge and discounts with in the retail outlets that are located proximate to the charging stations.

Providing this information to drivers in real time is efficient for both drivers and the retail locations. Drivers in their electric vehicles will need charge, and providers of the charge will benefit from driving users to their location. If the user is still progressing along their desired path, the providers of the discount are simply providing a service and driving customers to their location, where the drivers may purchase other goods and services while the vehicle is being charged.

In one embodiment, the sponsored paths may be generated on electronics and circuitry of the vehicle or by processing in the cloud processing system (e.g. networked Internet systems). In some embodiments, the sponsor paths may be processed partially on the vehicle and partially on the cloud processing system. In some embodiments, the sponsored paths would be dynamically generated on the cloud processing system, and the vehicle or smart phone of the user would simply connect to the cloud processing system.

The data exchange can therefore be dynamically set to be real time, such that providers of the discounts, providers of the charge, and drivers of the vehicles can exchange information. In this example, the provided to the charge can provide discount information, incentives, etc., and the drivers of the vehicles can provide information concerning their desired paths. The processing system can then generate a plurality of options for the user to traverse from point A to point B. For example, the user can select to traverse a sponsored path, to a particular address. The display the vehicle can then requested the user identify whether or not a sponsored path is desired.

It will be obvious, however, to one skilled in the art, that the present invention may be practiced without some or all of these specific details. In other instances, well known process operations have not been described in detail in order not to unnecessarily obscure the present invention.

In some implementations, features from one disclosed embodiment may be combined with features of another disclosed embodiment to define specific configurations, methods, system or apparatus.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or vehicle state, in real-time), logic for identifying or recommending a result or a next input, a next screen, a suggested input, suggested data that would be relevant for a particular time, geo-location, state of a vehicle, and/or combinations thereof. In one embodiment, use of machine learning enables the vehicle to learn what is needed by the user, at a particular time, in view of one or more operating/status state of the vehicle, in view of one or more state of one or more sensors of the vehicle. Thus, one or more inputs or data presented to the user may be provided without an explicit input, request or programming by a user at that time. In one embodiment, reference is made to learning and prediction, wherein both terms may be referencing the same or similar function, e.g., looking at user interactions, preferences, tendencies, etc., in order to identify or select a particular type of data that may be useful for the user based on the learning or prediction. In other embodiments, learning may be defined closer to the traditional sense of machine learning, pattern learning, historical data input analysis, etc., while prediction is may be defined closer to the traditional sense of identifying some data, which is predicted to be relevant based on analysis of the context in which the data is predicted. In still other embodiments, prediction and learning may be hybrids, used in conjunction for providing contextually relevant supplemental content to a vehicle, user account, user device, or some target associated with a user account or profile.

Overtime, machine learning can be used to reinforce learned behavior, which can provide weighting to certain inputs. For instance, the more times a user turns on the windshield wipers when it is raining, and within two minutes of turning on the car, may signal that this patterns is likely to happen again. In another example, if a user stops to charge his vehicle at a particular charge station, which is 20 miles from his home, repeatedly on Tuesdays, at 6 pm, when nobody is a passenger in the vehicle, and the vehicle had less than 5% charge, may be used as a strong pattern that this may occur again in the future. This data, combined with other data, may be used to recommend data regarding the charge station in advance, so that the user need no look up the charge station to reserve a spot, or the like. It should be understood that these are just simplified examples to convey examples of recommendations which may be based on some learning, preferences or pattern analysis, or likelihoods.

Thus, context awareness across multiple dimensions will allow for more accurate predictions, learning (e.g., by building and refining behavior models), and surfacing/suggesting recommendations of supplemental content or settings, when it is most probable or likely or useful, or needed by the user or vehicle and user, or relevant at a current or proximate or near or destination geo-location.

For purposes of providing example ways of processing learning algorithms, machine learning methods, predictions, data analysis, and the like, without limitations to any specifically claimed embodiment, reference may be made to a book entitled "*Introduction to Machine Learning*", Second Edition, by Ethem Alpaydin, The MIT Press (ISBN 978-0-262-01243-0), Cambridge, Mass., London England (2010), which is herein incorporated by reference for all purposes.

In one embodiment, a display of a vehicle can include one or more displays. For example, a display screen of the vehicle may include any one or more of a main dashboard display, or a center console display, or a combined main dashboard and center console display, or a surface display, or a glass surface, or a windshield display, or a window display, or a touch surface display, or a headrest display, or a movable display, or a wireless display, or a wire-connected display, or combinations thereof.

In one embodiment, biometrics may be associated to the user account. The biometrics may be used to monitor use of the vehicle and determine if the custom user interfaces is to be enabled, or if a guest custom user interface is to be enabled, or if public custom user interface is to be enabled, or identify an interaction mode. The user account may include profile data defining when particular custom user interfaces are to be enabled or interactions modes are to be used. The biometrics may include one or more of image data of a driver's face, a passenger's face, a finger print, a retina scan, a signature, a gesture, a user input, a login, a key, a paring device, or combinations of two or more thereof.

In some embodiments, passengers may be able to connect to a Wi-Fi or Internet connection provided by the vehicle. This connection can identify the other devices are contained or located within the vehicle. This information can be used to provide those specific devices access to certain controls of the vehicle. The controls provided can be based on learning associated with previous privileges granted by the primary user account in the vehicle, which is typically the driver. For more information on sharing vehicle controls to user devices, reference may be made to U.S. application Ser. No. 14/222,670, entitled "Methods and Systems for Providing Access to Specific Vehicle Controls, Functions, Environment and Applications to Guests/Passengers via Personal Mobile Devices," which is incorporated herein by reference.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

The invention claimed is:

1. A cloud system configured to execute method operations for communicating with connected vehicles of users having user accounts with the cloud system and charging units, the method comprising,
receiving a signal from of an electric vehicle that is associated to a user account, the signal of the electric vehicle is received in response to the electric vehicle parking over a charging pad of a charging unit, the charging unit being one of a plurality of charging units located in various geo-locations;
sending instructions to the charging unit to enable initiation of charge transfer to a battery of the electric vehicle upon the cloud system confirming that the user account for the electric vehicle is enabled for automatic charging upon parking over said charging pad of the charging unit; and
receiving data from the charging unit indicative of a discontinuing of the charge transfer by the charging pad responsive to detecting that the electric vehicle is no longer parked over said charging pad;
wherein a server of the cloud system is configured to identify at least one discount to be presented to a device associated with the electric vehicle, the identifying being a result of filtering discounts based on user preferences associated with the user account and a proximity of a merchant location to said charging unit having the charging pad over which the electric vehicle has parked; and
sending the at least one discount to the device associated with the electric vehicle upon determining use of the charging pad by the electric vehicle.

2. The cloud system of claim 1, wherein said automatic charging is further enabled to occur when the signal from the electric vehicle received by the cloud system includes information indicative that a conductor of the electric vehicle is oriented over the charge pad to enable inductive transfer of power to said battery of the electric vehicle from a power supply connected to the charging pad of the charging unit.

3. The cloud system of claim 1, wherein the cloud system includes one or more servers for communicating with said plurality of charging units, wherein said user account is configured for pre-authorization of payment data to enable said charge transfer.

4. The cloud system of claim 1, wherein the charging pad is configured to transfer power via inductors disposed on an underside of the electric vehicle and inductors associated with the charging pad.

5. The cloud system of claim 1, wherein one or more servers of the cloud system have access to a network associated with said plurality of charging units, the method processed by the cloud system is configured to,
receive data to identify presence of electric vehicles over one or more charging pads and track said automatic charging during a period of time when specific ones of electric vehicles are present over the charging pads of the charge units.

6. The cloud system of claim 1, wherein the filtering excludes discounts for merchants that are beyond the proximity of the charging unit.

7. The cloud system of claim 1, wherein one or more servers of the cloud system have access to a network of charging units, the method processed by the cloud system is configured to,
manage received discounts published by the merchants, the discounts being published with an identification of a geo-location or charge units for which the discounts are to be associated and an expiration time for the discounts.

8. The cloud system of claim 1, wherein the user preferences associated with the user account are received as explicit preferences or are learned from use with the user account based on past actions made via the user account.

9. The cloud system of claim 1, wherein additional discounts are sent to the device associated with the electric vehicle, wherein selection of one of the discounts and use of the discounts are tracked to build learned preferences for the user account; and
wherein preferences for the user account are compared to other user accounts to identify similarities in preferences and/or actual use of discounts previously sent, the similarities being used to refine selection of discounts for the user account.

10. The cloud system of claim 1, wherein the device associated with the electric vehicle is a computer integrated with the electric vehicle and uses a display of the electric vehicle or is a portable device.

11. The cloud system of claim 1, wherein the discount is validated or used when redeemed at the merchant location, the discount being accessible via the device by access to the user account over the Internet, and wherein the discount is a reduced price of a good or service offered at the merchant location or a reduction in price for charge obtained by the electric vehicle at the charge unit.

12. The cloud system of claim 1, wherein a discount is conditioned on transfer of an amount of charge to the electric vehicle as obtained from one of the charge units, or conditioned on confirmation of purchase of a good or service from a merchant location.

13. The cloud system of claim 1, wherein the proximity of the merchant location to the charge unit is within walking distance that is less than one mile.

14. The cloud system of claim 1, wherein the transfer of charge is via inductive coupling between a conductive plate disposed in an undersurface of the electric vehicle, the conductive plate being oriented over the charging pad to enable said inductive coupling, the inductive coupling being optimized when the conductive plate is more aligned than not with the charging pad of the charge unit.

15. The cloud system of claim 1, wherein the user account includes a setting for a personal level of privacy, the personal level of privacy sets limits on tracking of the electric vehicle.

16. Non-transitory computer readable media having computer executable program instructions for communicating with connected vehicles of users having user accounts with a cloud system, the computer readable media comprising, program instructions for receiving a signal from of an electric vehicle that is associated to a user account, the signal of the electric vehicle is received in response to the electric vehicle parking over a charging pad of a charging unit, the charging unit being one of a plurality of charging units located in various geo-locations;

program instructions for sending instructions to the charging unit to enable initiation of charge transfer to a battery of the electric vehicle upon the cloud system confirming that the user account for the electric vehicle is enabled for automatic charging upon parking over said charging pad of the charging unit; and program instructions for receiving data from the charging unit indicative of a discontinuing of the charge transfer by the charging pad responsive to detecting that the electric vehicle is no longer parked over said charging pad;

wherein a server of the cloud system is configured to execute, program instructions to identify at least one discount to be presented to a device associated with the electric vehicle, the identifying being a result of filtering discounts based on user preferences associated with the user account and a proximity of a merchant location to said charging unit having the charging pad over which the vehicle has parked; and program instructions for sending the at least one discount to the device associated with the electric vehicle upon determining use of the charging pad by the electric vehicle.

17. The non-transitory computer readable media of claim 16, wherein said user account is configured for pre-authorization of payment data to further enable said charge transfer and said automatic charging occurs when a conductor of the electric vehicle is detected to be oriented over the charge pad, and the transfer of charge is via inductive coupling between a conductive plate disposed in an undersurface of the electric vehicle, the conductive plate being oriented over the charging pad to enable said inductive coupling, the inductive coupling being optimized when the conductive plate is more aligned than not with the charging pad of the charge unit.

18. The non-transitory computer readable media of claim 16, wherein one or more servers of the cloud system have access to a network associated with said plurality of charging units, and the computer readable media having program instructions for receiving data to identify presence of electric vehicles over one or more charging pads and further enable at least part of said automatic charging.

19. The non-transitory computer readable media of claim 16, wherein the device associated with the electric vehicle is a computer integrated with the electric vehicle and uses a display of the electric vehicle or is a portable device.

* * * * *